(12) United States Patent
Roper et al.

(10) Patent No.: US 12,327,014 B2
(45) Date of Patent: Jun. 10, 2025

(54) DEVICES, METHODS, AND USER INTERFACES FOR EDGE AND CORNER INTERACTIONS

(71) Applicant: Apple Inc., Cupertino, CA (US)

(72) Inventors: Gemma A. Roper, San Francisco, CA (US); David H. Bloom, San Francisco, CA (US); Benjamin G. Jackson, Piedmont, CA (US); Steven J. Taylor, San Jose, CA (US); Megan M. Sapp, Napa, CA (US); Samuel L. Iglesias, Palo Alto, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/584,966

(22) Filed: Feb. 22, 2024

(65) Prior Publication Data
US 2024/0295959 A1 Sep. 5, 2024

Related U.S. Application Data

(60) Provisional application No. 63/617,740, filed on Jan. 4, 2024, provisional application No. 63/449,911, filed on Mar. 3, 2023.

(51) Int. Cl.
G06F 3/0487 (2013.01)
(52) U.S. Cl.
CPC .................. G06F 3/0487 (2013.01)
(58) Field of Classification Search
CPC ............... G06F 3/0487; G06F 3/04847; G06F 2203/04806; G06F 3/0488; G06F 3/04883
See application file for complete search history.

(56) References Cited

U.S. PATENT DOCUMENTS 9,082,269 B2 7/2015 Olsson et al.
9,916,073 B1 3/2018 Szeto et al.
(Continued)

FOREIGN PATENT DOCUMENTS

CN 101609383 A 12/2009
CN 104335146 A 2/2015
(Continued)

OTHER PUBLICATIONS

Hannon, "Sound Support—Add, Remove or Rearrange Items On Your Mac's Dock", https://soundsupport.biz/2017/02/19/add-remove-or-rearrange-items-on-your-macs-dock/, 6 pages.
(Continued)

*Primary Examiner* — Abhishek Sarma
(74) *Attorney, Agent, or Firm* — Morgan, Lewis & Bockius LLP

(57) ABSTRACT

An electronic device includes a display. The electronic device detects an input along a device edge. In response to detecting the input and in accordance with a determination that the input meets one or more criteria and is detected at a first input location, the device displays a user interface at a first display location on the display that corresponds to the first input location. In response to detecting the input and in accordance with a determination that the input meets the one or more criteria and is detected at a second input location, the device displays the user interface at a second display location on the display that corresponds to the second input location. While the user interface is displayed, the device detects another input and, in response, the device adjusts a parameter for a function represented in the user interface in accordance with the other input.

87 Claims, 53 Drawing Sheets

(56) References Cited

U.S. PATENT DOCUMENTS

| | | |
|---|---|---|
| 10,156,921 B1 | 12/2018 | Smith |
| 10,275,087 B1 | 4/2019 | Smith |
| 2004/0164973 A1 | 8/2004 | Nakano et al. |
| 2009/0284468 A1 | 11/2009 | Takaki et al. |
| 2010/0156818 A1 | 6/2010 | Burrough et al. |
| 2012/0023524 A1 | 1/2012 | Suk et al. |
| 2013/0201136 A1 | 8/2013 | Baard et al. |
| 2014/0049521 A1 | 2/2014 | Gil et al. |
| 2014/0055251 A1 | 2/2014 | Son et al. |
| 2015/0020109 A1 | 1/2015 | Higa et al. |
| 2015/0022564 A1 | 1/2015 | Zhang et al. |
| 2015/0058723 A1 | 2/2015 | Cieplinski et al. |
| 2015/0062052 A1 | 3/2015 | Bernstein et al. |
| 2015/0067495 A1 | 3/2015 | Bernstein et al. |
| 2015/0067496 A1 | 3/2015 | Missig et al. |
| 2015/0067497 A1 | 3/2015 | Cieplinski et al. |
| 2015/0067513 A1 | 3/2015 | Zambetti et al. |
| 2015/0067519 A1 | 3/2015 | Missig et al. |
| 2015/0067559 A1 | 3/2015 | Missig et al. |
| 2015/0067560 A1 | 3/2015 | Cieplinski et al. |
| 2015/0067563 A1 | 3/2015 | Bernstein et al. |
| 2015/0067596 A1 | 3/2015 | Brown et al. |
| 2015/0067601 A1 | 3/2015 | Bernstein et al. |
| 2015/0067602 A1 | 3/2015 | Bernstein et al. |
| 2015/0067605 A1 | 3/2015 | Zambetti et al. |
| 2015/0135109 A1 | 5/2015 | Zambetti et al. |
| 2015/0138126 A1 | 5/2015 | Westerman |
| 2015/0138155 A1 | 5/2015 | Bernstein et al. |
| 2015/0143238 A1 | 5/2015 | Jung et al. |
| 2015/0143273 A1 | 5/2015 | Bernstein et al. |
| 2015/0149899 A1 | 5/2015 | Bernstein et al. |
| 2015/0149964 A1 | 5/2015 | Bernstein et al. |
| 2015/0149967 A1 | 5/2015 | Bernstein et al. |
| 2015/0153929 A1 | 6/2015 | Bernstein et al. |
| 2015/0268752 A1 | 9/2015 | Ku et al. |
| 2015/0277564 A1 | 10/2015 | Saito |
| 2015/0348510 A1 | 12/2015 | Zhang et al. |
| 2015/0378519 A1 | 12/2015 | Brown et al. |
| 2016/0004427 A1 | 1/2016 | Zambetti et al. |
| 2016/0004428 A1 | 1/2016 | Bernstein et al. |
| 2016/0004429 A1 | 1/2016 | Bernstein et al. |
| 2016/0004430 A1 | 1/2016 | Missig et al. |
| 2016/0004431 A1 | 1/2016 | Bernstein et al. |
| 2016/0004432 A1 | 1/2016 | Bernstein et al. |
| 2016/0011771 A1 | 1/2016 | Cieplinski |
| 2016/0041750 A1 | 2/2016 | Cieplinski et al. |
| 2016/0210025 A1 | 7/2016 | Bernstein et al. |
| 2016/0225568 A1 | 8/2016 | Chen et al. |
| 2016/0259413 A1 | 9/2016 | Anzures et al. |
| 2016/0259497 A1 | 9/2016 | Foss et al. |
| 2016/0259498 A1 | 9/2016 | Foss et al. |
| 2016/0259499 A1 | 9/2016 | Kocienda et al. |
| 2016/0259517 A1 | 9/2016 | Butcher et al. |
| 2016/0259518 A1 | 9/2016 | King et al. |
| 2016/0259519 A1 | 9/2016 | Foss et al. |
| 2016/0259527 A1 | 9/2016 | Kocienda et al. |
| 2016/0259528 A1 | 9/2016 | Foss et al. |
| 2016/0259536 A1 | 9/2016 | Kudurshian et al. |
| 2016/0259542 A1 | 9/2016 | Chaudhri et al. |
| 2016/0291770 A1 | 10/2016 | Kocienda et al. |
| 2016/0306524 A1 | 10/2016 | Park et al. |
| 2017/0011624 A1 | 1/2017 | Guihot |
| 2017/0046024 A1 | 2/2017 | Dascola et al. |
| 2017/0046025 A1 | 2/2017 | Dascola et al. |
| 2017/0075520 A1 | 3/2017 | Bauer et al. |
| 2017/0075562 A1 | 3/2017 | Bauer et al. |
| 2017/0075563 A1 | 3/2017 | Bauer et al. |
| 2017/0212673 A1 | 7/2017 | Bernstein et al. |
| 2017/0357317 A1 | 12/2017 | Chaudhri et al. |
| 2017/0357319 A1 | 12/2017 | Chaudhri et al. |
| 2017/0357320 A1 | 12/2017 | Chaudhri et al. |
| 2017/0357358 A1 | 12/2017 | Teutschler et al. |
| 2017/0357430 A1 | 12/2017 | Lemay et al. |
| 2018/0024681 A1 | 1/2018 | Bernstein et al. |
| 2018/0039368 A1 | 2/2018 | Choi et al. |
| 2018/0046341 A1 | 2/2018 | Lee et al. |
| 2018/0059809 A1 | 3/2018 | McClendon et al. |
| 2018/0067554 A1 | 3/2018 | Chaudhri et al. |
| 2018/0067555 A1 | 3/2018 | Chaudhri et al. |
| 2018/0067622 A1 | 3/2018 | Chaudhri et al. |
| 2018/0074636 A1 | 3/2018 | Lee et al. |
| 2018/0074637 A1 | 3/2018 | Rosenberg et al. |
| 2018/0088896 A1 | 3/2018 | Olson |
| 2018/0188920 A1 | 7/2018 | Bernstein et al. |
| 2018/0217717 A1 | 8/2018 | Yasuda et al. |
| 2018/0224963 A1 | 8/2018 | Lee et al. |
| 2018/0275862 A1 | 9/2018 | Khoe et al. |
| 2018/0364883 A1 | 12/2018 | Khoe et al. |
| 2018/0364904 A1 | 12/2018 | Bernstein et al. |
| 2019/0018562 A1 | 1/2019 | Bernstein et al. |
| 2019/0187792 A1 | 1/2019 | Basehore et al. |
| 2019/0042075 A1 | 2/2019 | Bernstein et al. |
| 2019/0042078 A1 | 2/2019 | Bernstein et al. |
| 2019/0050055 A1 | 2/2019 | Chaudhri et al. |
| 2019/0065043 A1 | 2/2019 | Zambetti et al. |
| 2019/0065240 A1 | 2/2019 | Kong et al. |
| 2019/0073003 A1 | 3/2019 | Xu et al. |
| 2019/0138189 A1 | 5/2019 | Missig |
| 2019/0146643 A1 | 5/2019 | Foss et al. |
| 2019/0163358 A1 | 5/2019 | Dascola et al. |
| 2019/0171354 A1 | 6/2019 | Dascola et al. |
| 2019/0339804 A1 | 11/2019 | Gleeson et al. |
| 2020/0201472 A1* | 6/2020 | Bernstein ............ G06F 3/04817 |
| 2021/0081082 A1* | 3/2021 | Dascola ................ H04L 67/60 |
| 2021/0089182 A1 | 3/2021 | Sheng et al. |
| 2021/0165520 A1 | 6/2021 | Gleeson et al. |
| 2022/0053080 A1 | 2/2022 | Xu |
| 2022/0206741 A1 | 6/2022 | Xu |
| 2023/0012223 A1 | 1/2023 | Gleeson et al. |
| 2024/0053847 A1 | 2/2024 | Tyler |

FOREIGN PATENT DOCUMENTS

| | | |
|---|---|---|
| CN | 105847499 A | 8/2015 |
| CN | 106147580 A | 11/2016 |
| EP | 2 317 426 A2 | 5/2011 |
| WO | WO 2007/103631 A2 | 9/2007 |
| WO | WO 2013/169870 A1 | 11/2013 |
| WO | WO 2016/144975 A2 | 9/2016 |
| WO | WO 2017/218409 A1 | 12/2017 |
| WO | WO 2018/048547 A1 | 3/2018 |
| WO | WO 2022/046151 A1 | 3/2022 |

OTHER PUBLICATIONS

Pediredla, "Understanding 3D Touch From a Development Perspective", http://blog.hedgehoglab.com/understanding-3d-touch-development, Feb. 8, 2016, 10 pages.

Office Action, dated Apr. 16, 2020, received in U.S. Appl. No. 16/403,329, 29 pages.

Final Office Action, dated Sep. 22, 2020, received in U.S. Appl. No. 16/403,329, 31 pages.

Notice of Allowance, dated Nov. 27, 2020, received in U.S. Appl. No. 16/403,329, 5 pages.

Office Action, dated Dec. 15, 2023, received in Chinese Patent Application No. 202110516449.3, which corresponds with U.S. Appl. No. 16/403,329, 2 pages.

Office Action, dated Dec. 6, 2022, received in European Patent Application No. 19727184.4, which corresponds with U.S. Appl. No. 16/403,329, 17 pages.

Office Action, dated Mar. 31, 2021, received in U.S. Appl. No. 16/583,126, 22 pages.

Final Office Action, dated Jan. 11, 2022, received in U.S. Appl. No. 16/583,126, 23 pages.

Office Action, dated May 24, 2022, received in U.S. Appl. No. 16/583,126, 24 pages.

Notice of Allowance, dated Jan. 24, 2023, received in U.S. Appl. No. 16/583,126, 5 pages.

Notice of Allowance, dated May 17, 2023, received in U.S. Appl. No. 16/583,126, 5 pages.

(56) References Cited

OTHER PUBLICATIONS

Office Action, dated Feb. 1, 2022, received in U.S. Appl. No. 17/172,027, 24 pages.

Notice of Allowance, dated Jun. 30, 2022, received in U.S. Appl. No. 17/172,027, 9 pages.

Office Action, dated May 24, 2023, received in U.S. Appl. No. 17/947,037, 23 pages.

Final Office Action, dated Dec. 1, 2023, received in U.S. Appl. No. 17/947,037, 25 pages.

Invitation to Pay Additional Fees, dated Oct. 7, 2019, received in International Patent Application No. PCT/US2019/031078, which corresponds with U.S. Appl. No. 16/403,329, 30 pages.

International Search Report and Written Opinion, dated Dec. 2, 2019, received in International Patent Application No. PCT/US2019/031078, which corresponds with U.S. Appl. No. 16/403,329, 32 pages.

Written Opinion of the International Preliminary Examining Authority (IPEA), dated Jul. 26, 2024, received in International Patent Application No. PCT/US2024/017499, which corresponds with U.S. Appl. No. 18/584,966, 12 pages.

Decision to Grant, dated Apr. 28, 2024, received in Chinese Patent Application No. 202110516449.3, which corresponds with U.S. Appl. No. 16/403,329, 4 pages.

Notice of Allowance, dated Apr. 29, 2024, received in U.S. Appl. No. 17/947,037, 11 pages.

Office Action, dated Nov. 7, 2024, received in U.S. Appl. No. 18/383,012, 21 pages.

International Search Report and Written Opinion, dated Jul. 26, 2024, received in International Patent Application No. PCT/US2024/017499, which corresponds with U.S. Appl. No. 18/584,966, 24 pages.

Final Office Action, dated Apr. 16, 2025, received in U.S. Appl. No. 18/383,012, 23 pages.

* cited by examiner

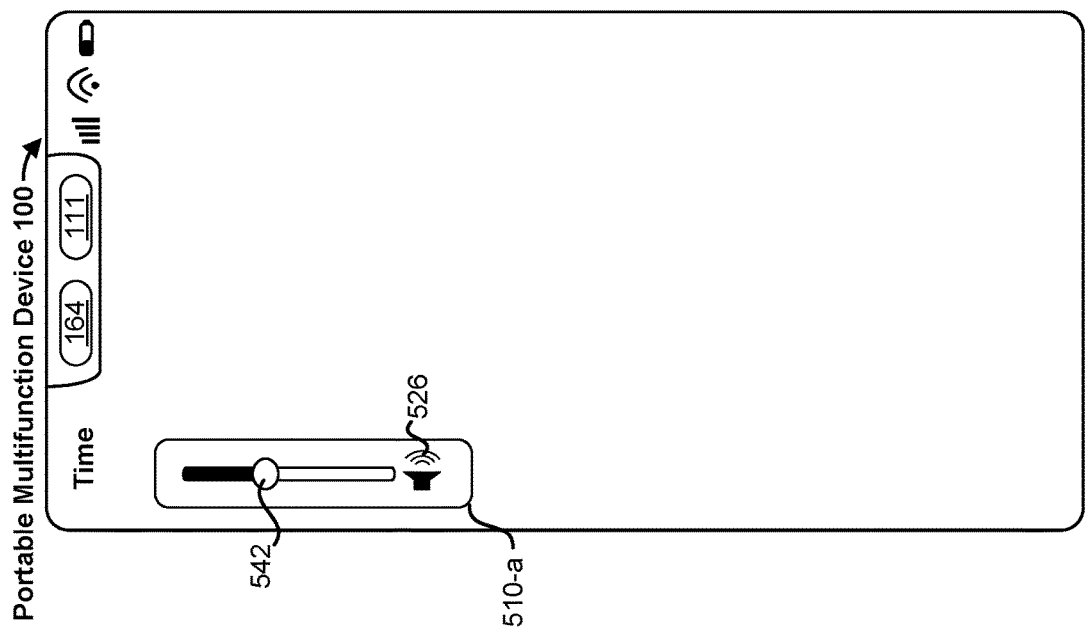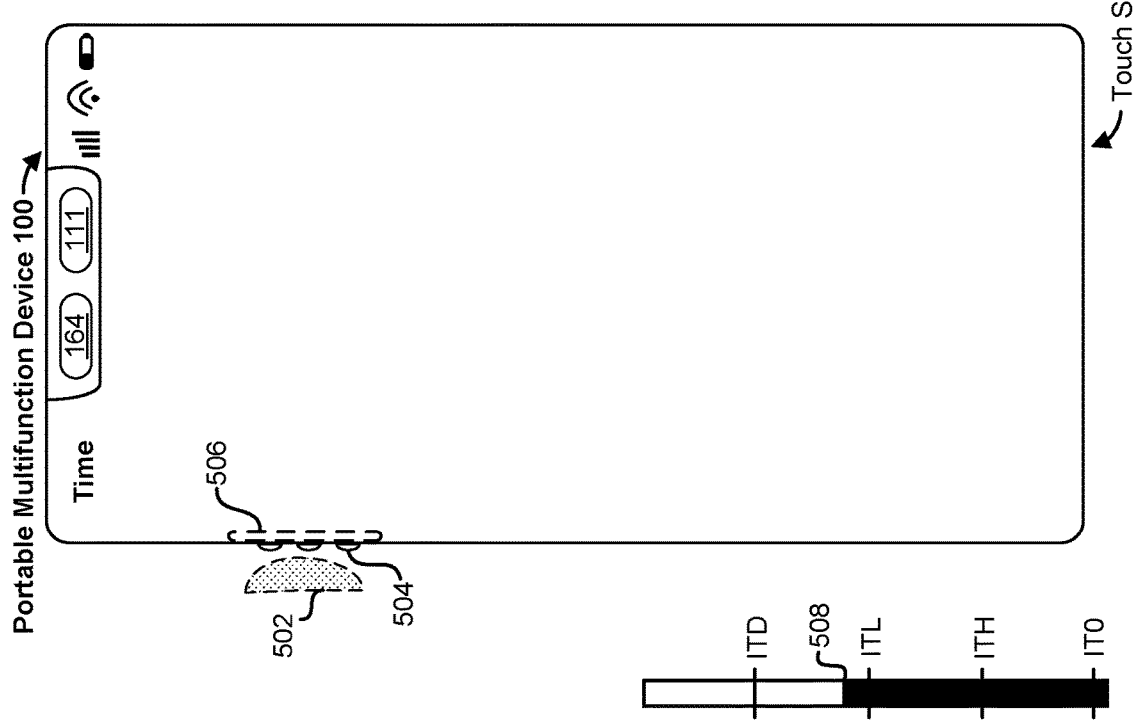

908 In response to detecting the first input:

918 The control user interface has a first appearance in accordance with the first input location being at a corner region of the electronic device The control user interface has a second appearance in accordance with the first input location being at a non-corner region of the electronic device, the second appearance being different than the first appearance 920 Prior to detecting the first input, a user interface element is displayed at the first display location, and displaying the control user interface at the first display location includes replacing display of the user interface element with display of the control user interface element 922 Prior to detecting the first input, the control user interface is displayed at a third display location on the display, the third display location being different than the first display location, and displaying the control user interface at the first display location includes ceasing to display the control user interface at the third display location 924 Forgo displaying the control user interface in accordance with a determination that the first input does not meet the one or more criteria 926 Detect a second input while the control user interface is displayed 928 Adjust a parameter for a function represented in the control user interface in accordance with the second input in response to detecting the second input 930 Perform a second function of the electronic device in accordance with a determination that the first input meets the one or more criteria and is detected at a third input location that is different from the first and second input locations, the second function being different than the function represented in the control user interface

Figure 9B

928 Adjust a parameter for a function represented in the control user interface in accordance with the second input in response to detecting the second input (B)

932 The parameter is adjusted in accordance with the second input being a first type of input A third input is detected while the control user interface is displayed, and, in response to detecting the third input, a third function represented in the control user interface is performed in accordance with the third input being a second type of input 934 The control user interface is displayed in accordance with the first input being a first type of input, and, in accordance with a determination that the first input is a second type of input, different than the first type, a third function of the electronic device is performed, the third function being different than the function represented in the control user interface 936 The function is identified in accordance with an operating state of the electronic device 938 Detect a fourth input at the first input location along the edge of the electronic device Display the control user interface at the first display location in response to detecting the fourth input and in accordance with a determination that the fourth input meets the one or more criteria Subsequent to displaying the control user interface, adjust the parameter in accordance with movement of the fourth input 940 Detect a fifth input at an input location on a front side of the electronic device Display a third version of the control user interface in response to detecting the fifth input, the third version of the control user interface being visually distinct from the first version of the control user interface

Figure 9C

1026 The first input is a first type of gesture and is detected at a first location on the side display A fifth input is detected at a second location on the side display, the fifth input being the first type of gesture and the second location being different than the first location In response to detecting the fifth input, a second function of the electronic device is performed

1028 The control user interface or a respective portion of the control user interface is displayed on the side display in accordance with the electronic device being in a first state In accordance with the electronic device being in a second state, forgo displaying the control user interface or the respective portion of the control user interface on the side display

1030 The control user interface or a respective portion of the control user interface is displayed at a location on the side display in accordance with the electronic device having a first orientation In accordance with the electronic device having a second orientation distinct from the first orientation, the control user interface is displayed at a third location

1032 Detect a sixth input at a first input location

In response to detecting the sixth input, display the control user interface at a third display location that corresponds to the first input location Detect a seventh input at a second input location, different than the first input location In response to detecting the seventh input, display the control user interface at a fourth display location that corresponds to the second input location

Figure 10C

DEVICES, METHODS, AND USER INTERFACES FOR EDGE AND CORNER INTERACTIONS

RELATED APPLICATIONS

This application claims priority to U.S. Provisional Patent Application No. 63/617,740, filed Jan. 4, 2024, and to U.S. Provisional Patent Application No. 63/449,911, filed Mar. 3, 2023, each of which is hereby incorporated by reference in its entirety.

TECHNICAL FIELD

This relates generally to electronic devices with displays and touch-sensitive input regions, including but not limited to electronic devices with displays and touch-sensitive input regions at edges and/or corners of the devices.

BACKGROUND

Many electronic devices rely on fixed position buttons, such as mechanical home buttons, volume buttons, and power buttons. However mechanical buttons require user inputs to be at fixed positions and provide little, if any, feedback to a user. Some devices have solid-state buttons on the front side of the devices to replace the mechanical buttons. However, the solid-state buttons also take up valuable space on the display side of the device, reducing available display area for visual information on a portable electronic device.

SUMMARY

Accordingly, there is a need for electronic devices with improved methods and interfaces for facilitating interactions and providing visual, haptic, and/or audio feedback during user interactions, which make the human-machine interface and manipulation of user interfaces more efficient and intuitive for a user. There is also a need for electronic devices with improved methods and interfaces for providing additional functionality without cluttering up the display with more virtual controls or crowding the surface of the device with more hardware controls. Such methods and interfaces optionally complement or replace conventional methods for providing function controls and providing feedback during interaction with a device. Such methods and interfaces reduce the number and extent of the inputs required from a user by helping the user to understand the connection between provided inputs and device responses to the inputs and reducing user input mistakes, thereby creating a more efficient human-machine interface.

The above deficiencies and other problems associated with user interfaces for electronic devices are reduced or eliminated by the disclosed devices, which include one or more input regions (e.g., surfaces located on edges and/or peripheral sides of the device). In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device with a display. The method includes detecting a first input along an edge of the electronic device. The method also includes, in response to detecting the first input and in accordance with a determination that the first input meets one or more criteria and is detected at a first input location, displaying a control user interface at a first display location on the display that corresponds to the first input location. The method further includes, in response to detecting the first input and in accordance with a determination that the first input meets the one or more criteria and is detected at a second input location that is different from the first input location, displaying the control user interface at a second display location on the display that corresponds to the second input location, the second display location being different than the first display location. The method further includes, while the control user interface is displayed, detecting a second touch input; and, in response to detecting the second input, adjusting a parameter for a function represented in the control user interface in accordance with the second input.

In accordance with some embodiments, a method is performed at an electronic device with a front display and a side display. The method includes, while displaying a control user interface on the side display, detecting a touch input at the side display; and, in response to detecting the touch input, displaying a portion of the control user interface on the front display. In some embodiments, the front display and the side display are portions of a single, continuous display.

In accordance with some embodiments, a method is performed at an electronic device with a display. The method includes detecting occurrence of a condition associated with the electronic device. The method also includes, in response to detecting the occurrence of the condition and in accordance with the condition having a first condition type, providing a first illumination at a first portion of an edge of the electronic device without illuminating a second portion of the edge of the electronic device. The method further includes, in response to detecting the occurrence of the condition and in accordance with the condition having a second condition type, providing a second illumination at the first portion of an edge of the electronic device without illuminating the second portion of the edge of the electronic device, the second illumination being different than the first illumination.

In accordance with some embodiments, an electronic device (e.g., a multifunction device, an electronic accessory, or a personal electronic device) includes one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions that, when executed by an electronic device cause the device to perform or cause performance of the operations of any of the methods described herein. In accordance with some embodiments, a graphical user interface on an electronic device with a display, a touch-sensitive surface, a memory, and one or more processors to execute one or more programs stored in the memory includes one or more of the elements displayed in any of the methods described herein, which are updated in response to inputs, as described in any of the methods described herein. In accordance with some embodiments, an electronic device includes means for performing or causing performance of the operations of any of the methods described herein. In accordance with some embodiments, an information processing apparatus, for use in an electronic device includes means for performing or causing performance of the operations of any of the methods described herein.

Thus, electronic devices with displays, touch-sensitive surfaces, optionally, one or more sensors to detect intensities of contacts with the touch-sensitive surface, optionally, one or more tactile output generators for generating localized tactile outputs at the input regions and/or whole device tactile outputs throughout multiple regions of the device, optionally one or more device orientation sensors, and optionally an audio system, are provided with improved methods and interfaces for facilitating interactions and providing feedback to a user during interaction with an input region, thereby increasing the effectiveness, efficiency, and user satisfaction with such devices. Such methods and interfaces may complement or replace conventional methods for facilitating interactions with the device and providing feedback to a user.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 9A-9C are flow diagrams of an example process for user interaction with an electronic device in accordance with some embodiments.

FIGS. 10A-10C are flow diagrams of an example process for user interaction with an electronic device in accordance with some embodiments.

DESCRIPTION OF EMBODIMENTS

Electronic devices, including multifunctional devices, personal devices, and desktop computers, are widely used to provide information and other outputs to users. As noted above, many electronic devices rely on fixed-position mechanical and/or solid-state buttons to facilitate interactions and/or provide feedback. The methods, systems, user interfaces, and interactions described herein improve how user interactions and feedback are provided in multiple ways, thereby making manipulation of user interfaces more efficient and intuitive for a user. For example, embodiments disclosed herein describe improved processes and user interfaces for performing device functions and adjusting device parameters, such as volume and brightness levels. The methods, systems, user interfaces, and interactions described herein also provide improved feedback during a variety of user interactions with input regions (e.g., portions of a side and/or edge surface) that make manipulation of user interfaces more efficient and intuitive for a user.

The processes described below enhance the operability of electronic devices and make the user-device interfaces more efficient (e.g., by helping the user to provide proper inputs and reducing user mistakes when operating/interacting with the electronic devices) through various techniques, including by providing improved visual, audio, and/or tactile feedback to the user, reducing the number of inputs needed to perform an operation, providing control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

Figure 2:
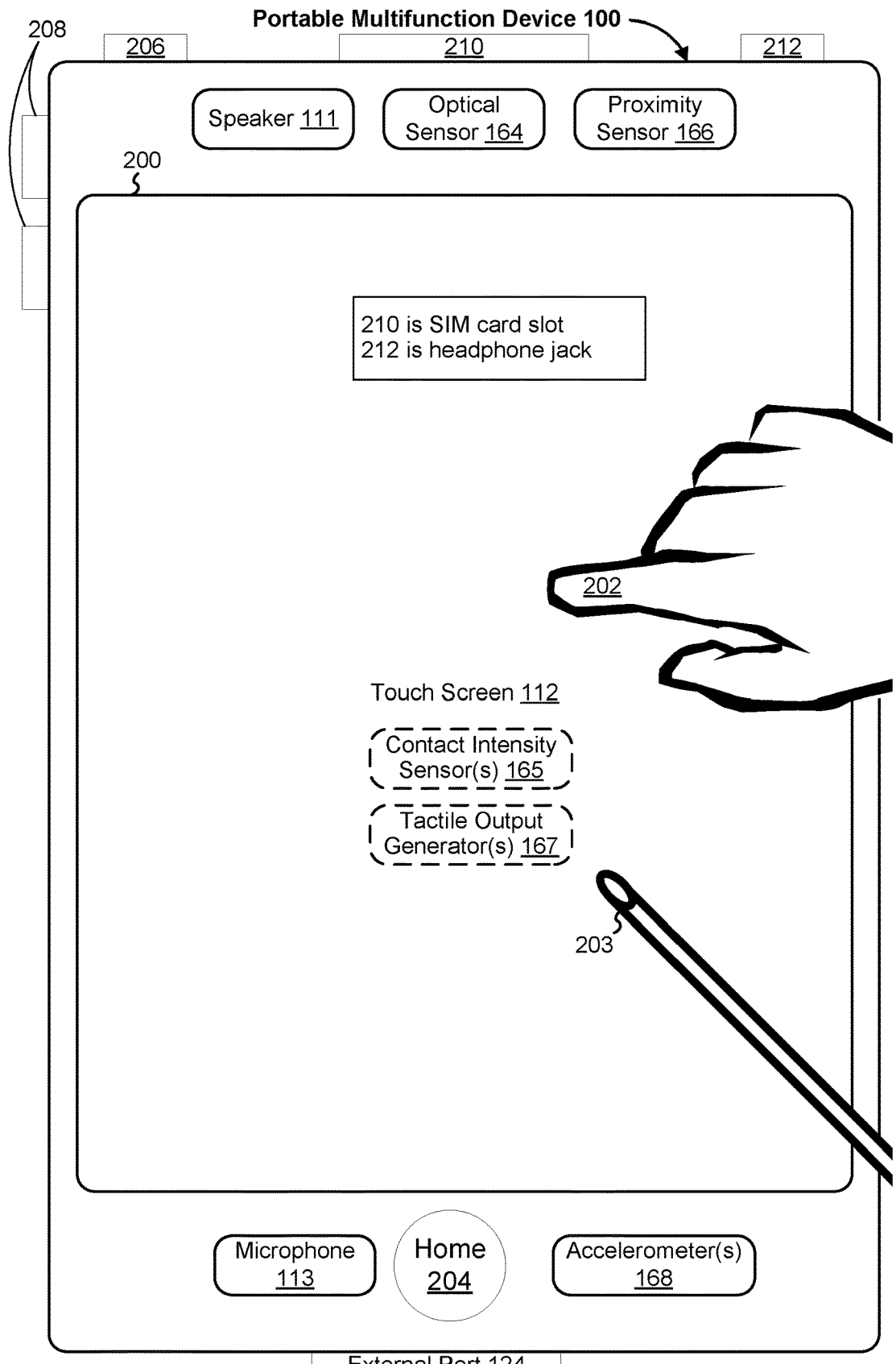
FIG. 2 illustrates a portable multifunction device having a touch screen in accordance with some embodiments.
Figure 3:
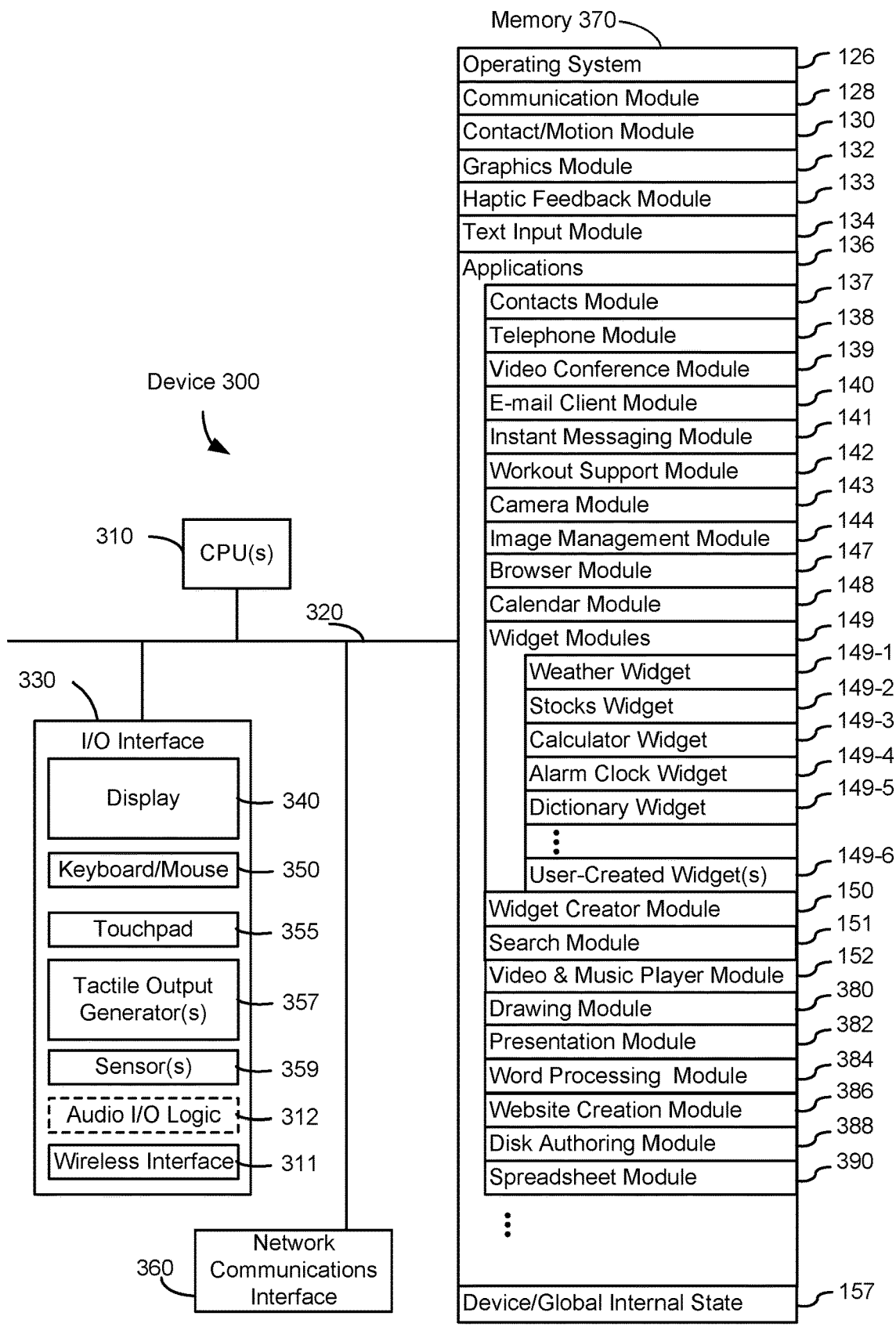
FIG. 3 is a block diagram of an example multifunction device with a display and a touch-sensitive surface in accordance with some embodiments.

Below, FIGS. 1A-1B, 2, 3, and 4A-4C illustrate example devices. FIGS. 4D-4E illustrate example intensity-based inputs and thresholds. FIGS. 5A-5AP, 6A-6T, 7A-7B, and 8A-8J illustrate example user interfaces and device interactions for controlling the example electronic devices. FIGS. 9A-9C, 10A-10C, and 11A-11B illustrate examples flow diagram of a process for adjusting audio output of one or more wearable audio output devices.

The user interfaces and device interactions in FIGS. 5A-5AP, 6A-6T, 7A-7B, and 8A-8J are used to illustrate the processes in FIGS. 9A-9C, 10A-10C, and 11A-11B.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
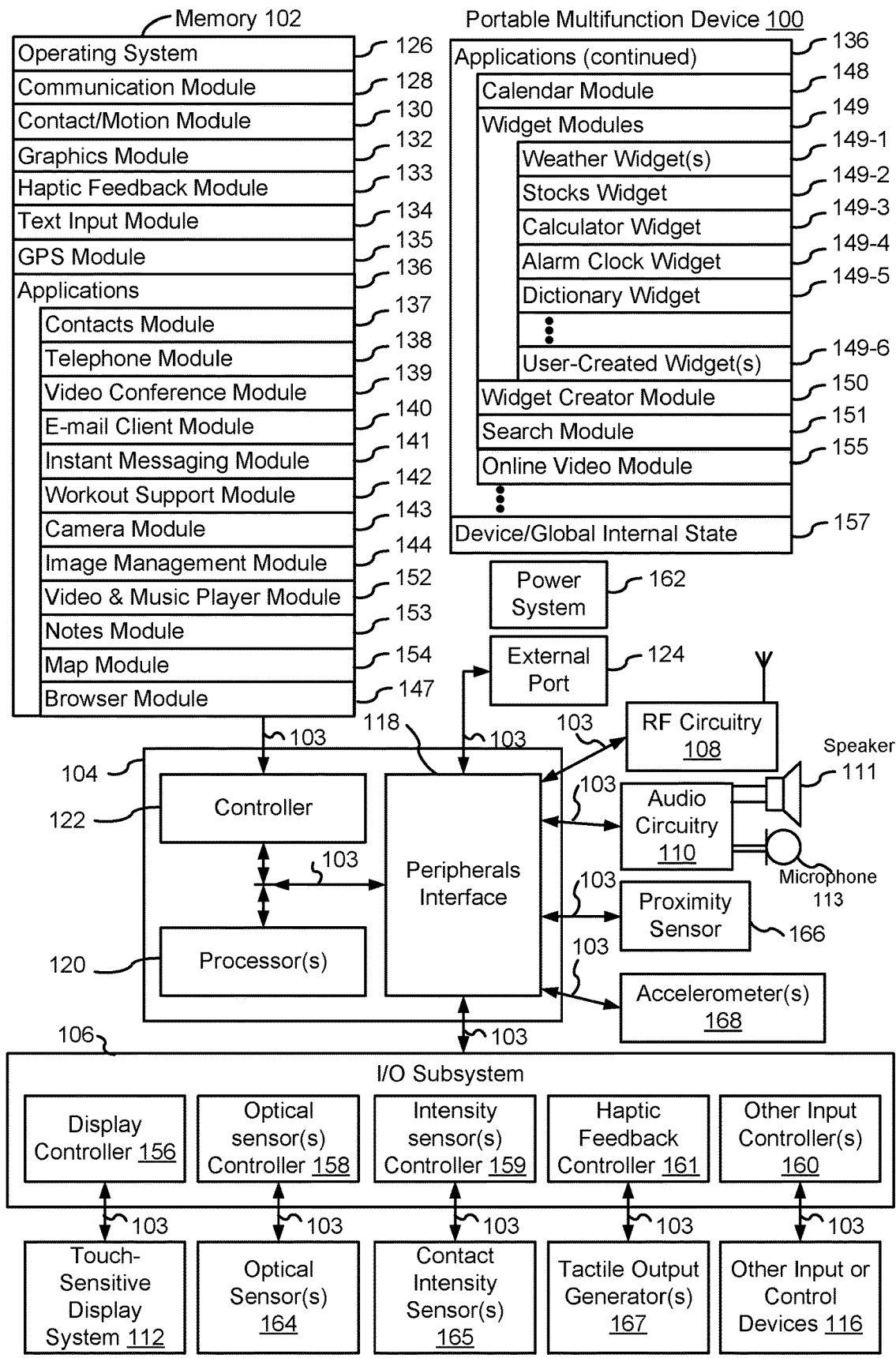
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random-access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, California.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164 (e.g., as part of one or more cameras). FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view, or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, California. In some embodiments, the external port is a Lightning connector that is the same as, or similar to and/or compatible with the Lightning connector used in some iPhone®, iPod Touch®, and iPad® devices from Apple Inc. of Cupertino, California. In some embodiments, the external port is a USB Type-C connector that is the same as, or similar to and/or compatible with the USB Type-C connector used in some electronic devices from Apple Inc. of Cupertino, California.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have criteria that are met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on touch-sensitive display system 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
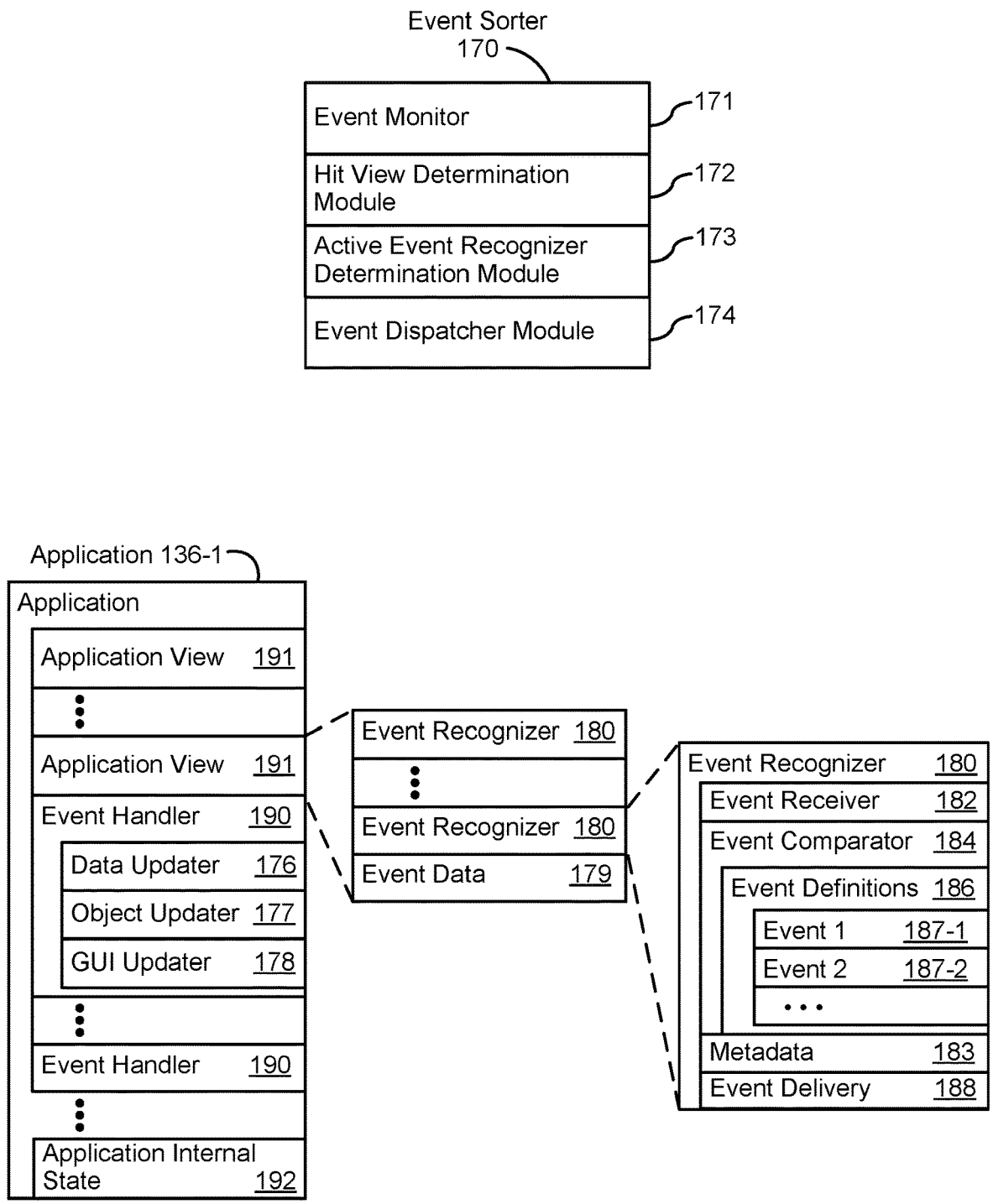
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher-level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancelation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event-to-event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). In some embodiments, device 300 includes a wireless interface 311 for communication with one or more wearable audio output devices 301 and/or an electronic accessory case 342 (e.g., FIG. 3E). In some embodiments, device 300 includes a network communications interface 360 for communication with remote devices (e.g., in conjunction with communication module 128).

Memory 370 includes high-speed random-access memory, such as DRAM, SRAM, DDR RAM or other random access solid-state memory devices; and optionally includes non-volatile memory, such as one or more magnetic disk storage devices, optical disk storage devices, flash memory devices, or other non-volatile solid-state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 4A:
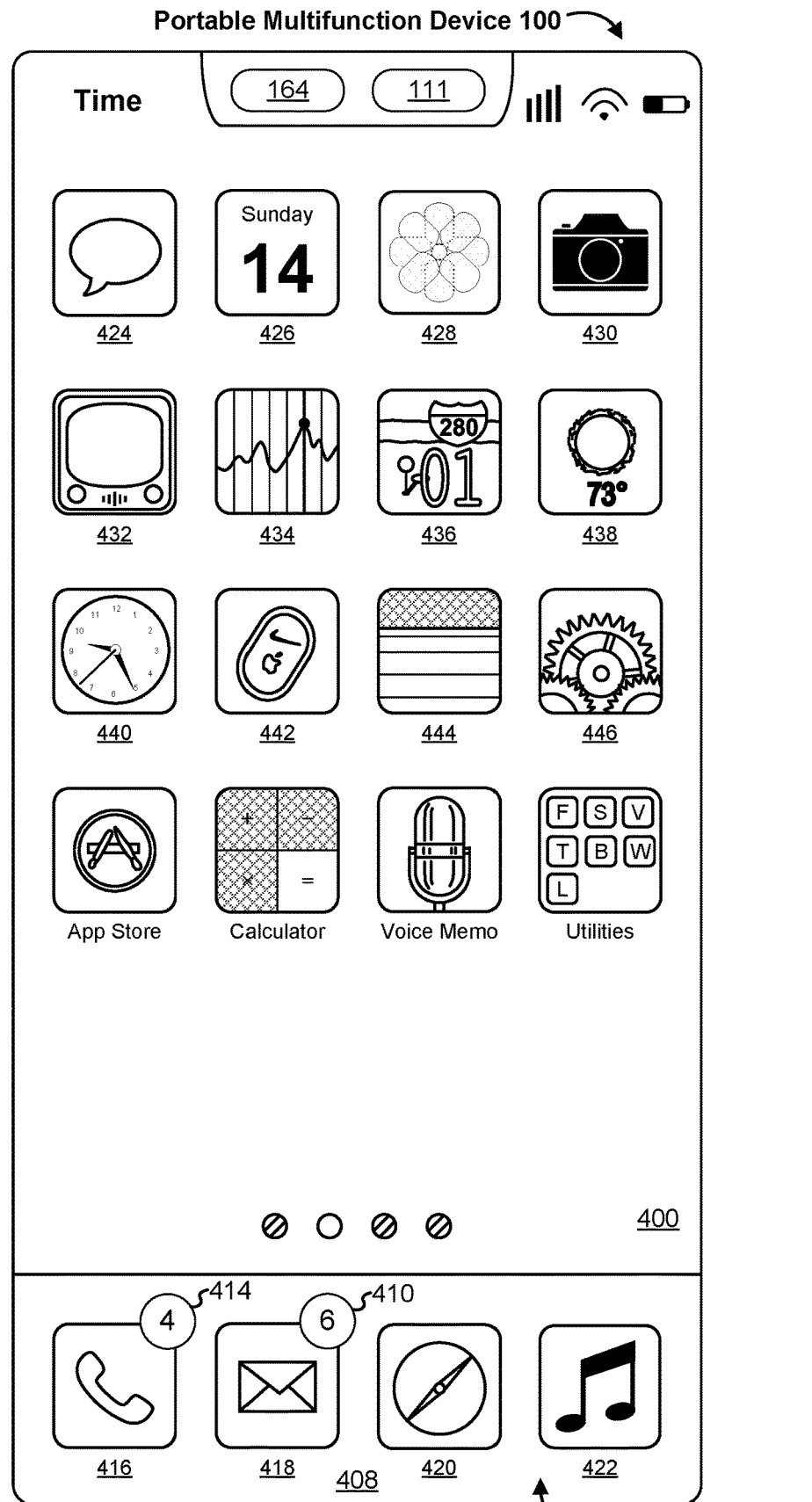
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) for wireless communication(s), such as cellular and Wi-Fi signals;
Time;
a Bluetooth indicator;
a Battery status indicator;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser"; and
  Icon 422 for video and music player module 152, labeled "Music"; and
Icons for other applications, such as:
  Icon 424 for IM module 141, labeled "Messages";
  Icon 426 for calendar module 148, labeled "Calendar";
  Icon 428 for image management module 144, labeled "Photos";
  Icon 430 for camera module 143, labeled "Camera";
  Icon 432 for online video module 155, labeled "Online Video";
  Icon 434 for stocks widget 149-2, labeled "Stocks";
  Icon 436 for map module 154, labeled "Maps";
  Icon 438 for weather widget 149-1, labeled "Weather";
  Icon 440 for alarm clock widget 149-4, labeled "Clock";
  Icon 442 for workout support module 142, labeled "Workout Support";
  Icon 444 for notes module 153, labeled "Notes"; and
  Icon 446 for a settings application or module, which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
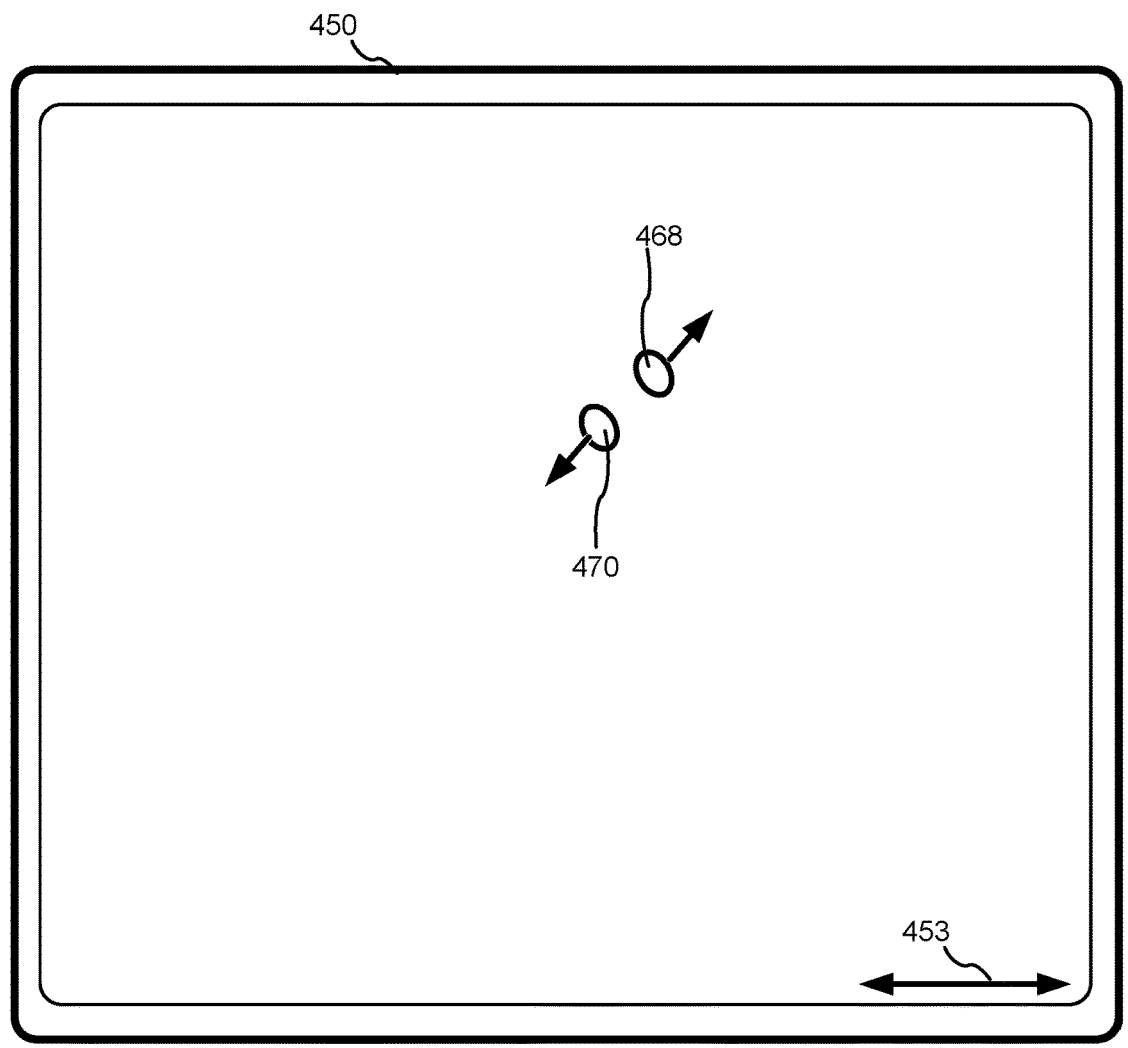
FIG. 4B illustrates an example user interface for a multifunction device with a touch-sensitive surface that is separate from the display in accordance with some embodiments.
Figure 4B:
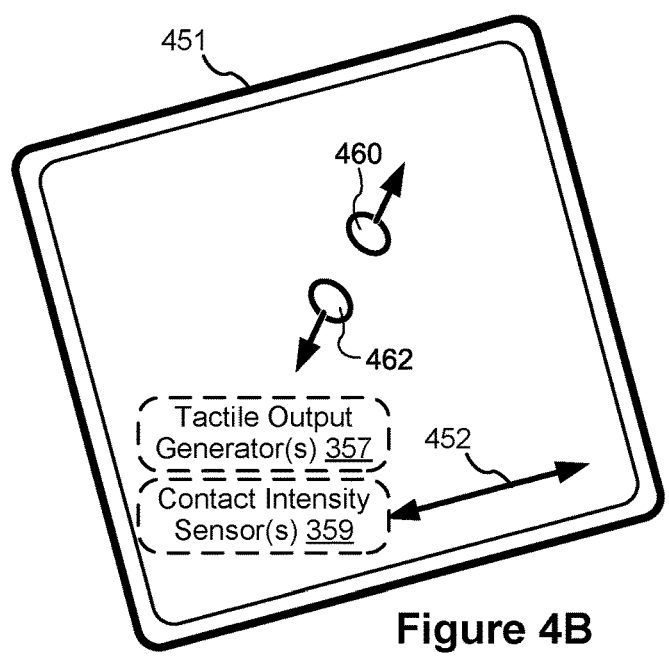

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch-sensitive display system 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse-based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases).

This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

Figure 4C:
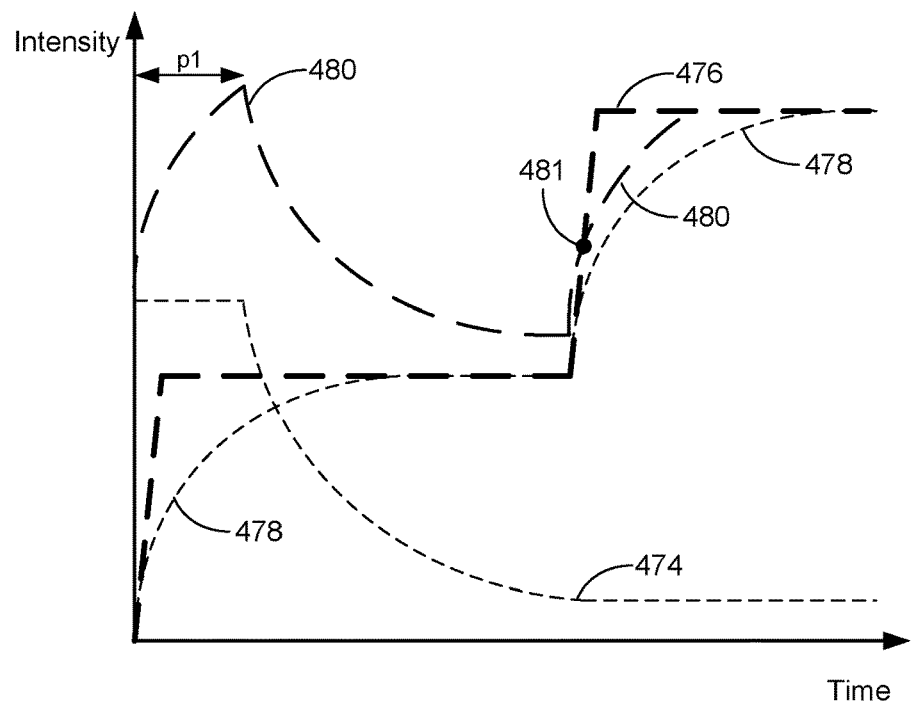
FIGS. 4C-4E illustrate examples of dynamic intensity thresholds in accordance with some embodiments.
Figure 4D:
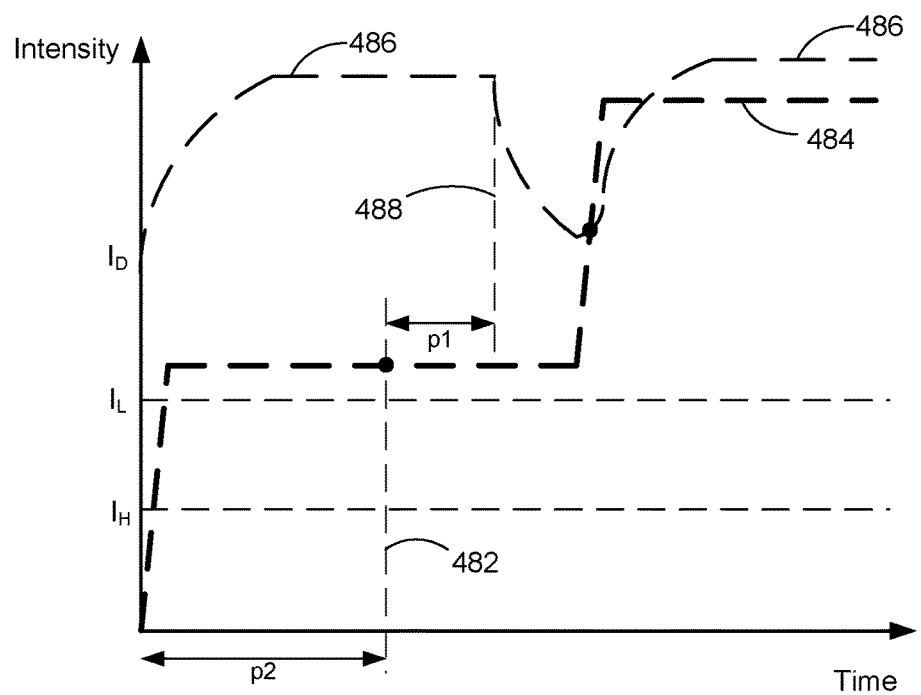
Figure 4E:
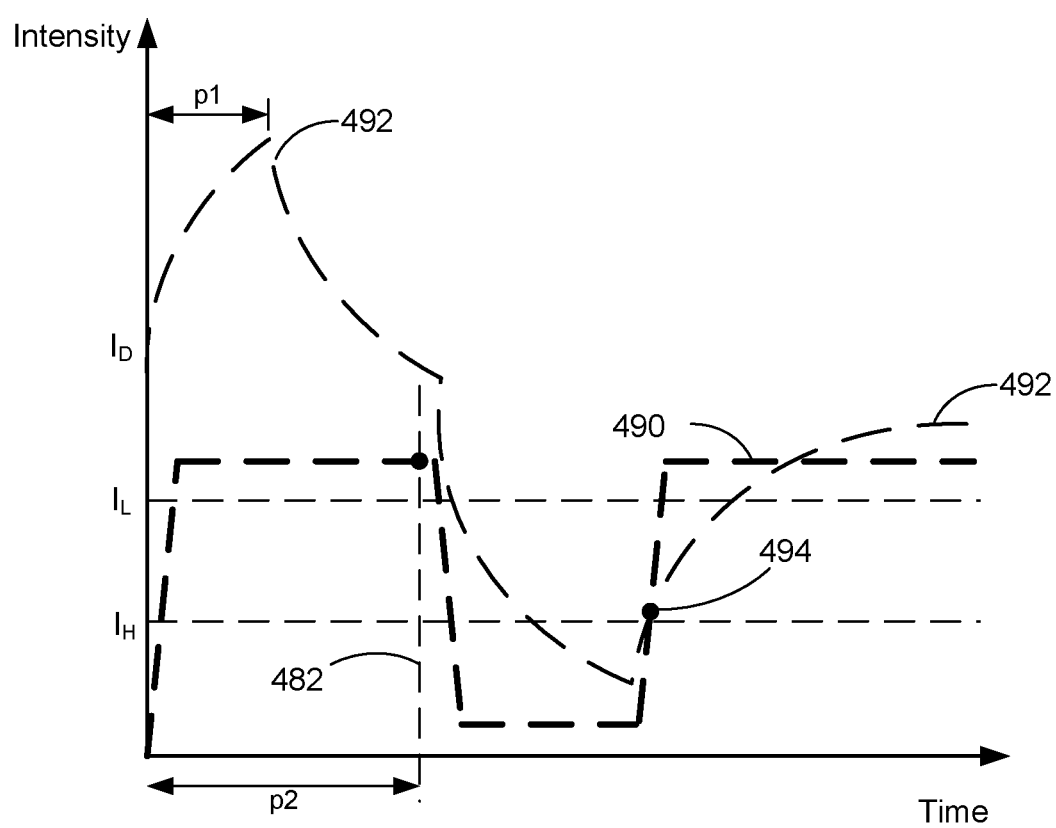

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

FIG. 4D illustrates another dynamic intensity threshold 486 (e.g., intensity threshold $IT_D$). FIG. 4D also illustrates two other intensity thresholds: a first intensity threshold $IT_H$ and a second intensity threshold $IT_L$. In FIG. 4D, although touch input 484 satisfies the first intensity threshold $IT_H$ and the second intensity threshold $IT_L$ prior to time p2, no response is provided until delay time p2 has elapsed at time 482. Also, in FIG. 4D, dynamic intensity threshold 486 decays over time, with the decay starting at time 488 after a predefined delay time p1 has elapsed from time 482 (when the response associated with the second intensity threshold $IT_L$ was triggered). This type of dynamic intensity threshold reduces accidental triggering of a response associated with the dynamic intensity threshold $IT_D$ immediately after, or concurrently with, triggering a response associated with a lower intensity threshold, such as the first intensity threshold $IT_H$ or the second intensity threshold $IT_L$.

FIG. 4E illustrate yet another dynamic intensity threshold 492 (e.g., intensity threshold $IT_D$). In FIG. 4E, a response associated with the intensity threshold $IT_L$ is triggered after the delay time p2 has elapsed from when touch input 490 is initially detected. Concurrently, dynamic intensity threshold 492 decays after the predefined delay time p1 has elapsed from when touch input 490 is initially detected. So, a decrease in intensity of touch input 490 after triggering the response associated with the intensity threshold $IT_L$, followed by an increase in the intensity of touch input 490, without releasing touch input 490, can trigger a response associated with the intensity threshold $IT_D$ (e.g., at time 494) even when the intensity of touch input 490 is below another intensity threshold, for example, the intensity threshold $IT_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, (optionally) one or more tactile output generators for generating tactile outputs, and (optionally) one or more sensors to detect intensities of contacts with the touch-sensitive surface.

FIGS. 5A-5AP, 6A-6T, 7A-7B, and 8A-8J illustrate example user interfaces and user interactions in accordance with some embodiments. The user interfaces in these figures are used to illustrate the processes described below, including the processes in FIGS. 9A-9C, 10A-10C, and 11A-11B.

For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 5A-5AP illustrate example user interfaces and user interactions for a multifunction device in accordance with some embodiments. FIG. 5A shows multifunction device 100 with physical indicator 504 for input location 506. In some embodiments, physical indicator 504 is a textured surface with one or more bumps and/or indentations. In some embodiments, physical indicator 504 is a physically-distinguished portion of the housing of multifunction device 100. In some embodiments, physical indicator 504 is a textured surface. In some embodiments, physical indicator 504 includes an indicator at a middle of input location 506 and/or respective indicators at edges of input location 506. FIG. 5A also shows user input 502 (e.g., a touch input and/or intensity input) at an edge of multifunction device 100 (e.g., a left edge of multifunction device 100) corresponding to input location 506. User input 502 has corresponding intensity 508 that is greater than a light press threshold ($IT_L$) and less than a deep press threshold ($IT_D$).

FIG. 5B illustrates a transition from FIG. 5A. FIG. 5B shows multifunction device 100 with volume control element 510 displayed at display location 510-a on touch screen 112. Volume control element 510 in FIG. 5B is displayed in response to user input 502 in FIG. 5A. In accordance with some embodiments, volume control element 510 includes volume slider element 542 and speaker icon 526. Display location 510-a in FIG. 5B is adjacent to input location 506 in FIG. 5A. In some embodiments, the display location has a vertical position and/or horizontal position that corresponds to a vertical position and/or horizontal position of the input location. In some embodiments, the display location has a vertical position that corresponds to the vertical position of the input location; and has a default or preset horizontal position (e.g., the display location is preset to be 5 mm, 10 mm, or other distance from the edge of the display or the device).

Figure 5D:
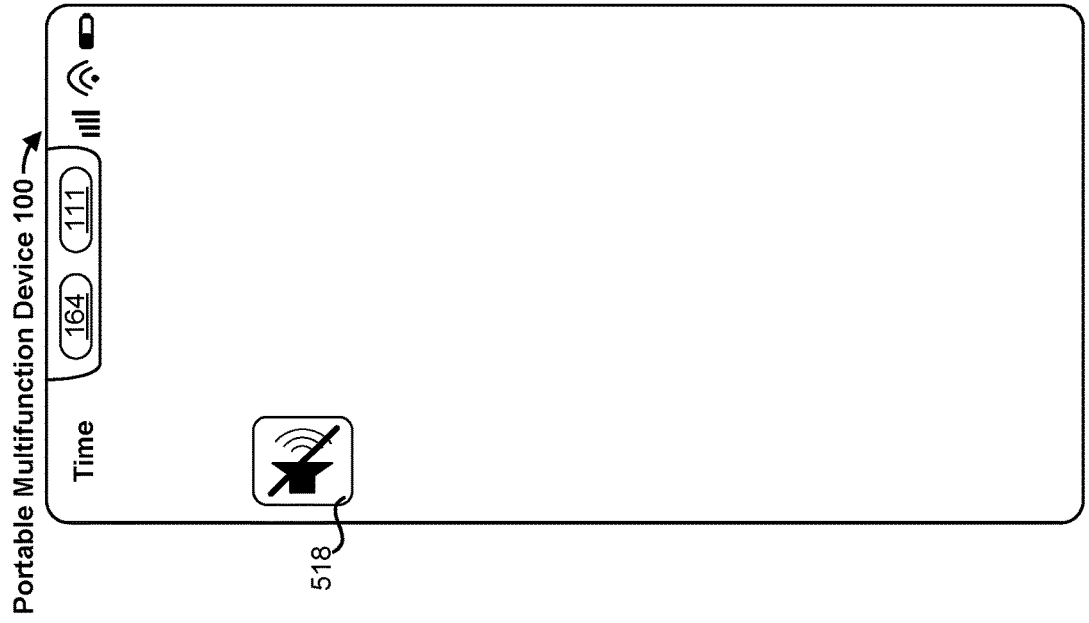
FIGS. 5A-5AP illustrate example user interfaces and user interactions for a multifunction device in accordance with some embodiments.
Figure 5C:
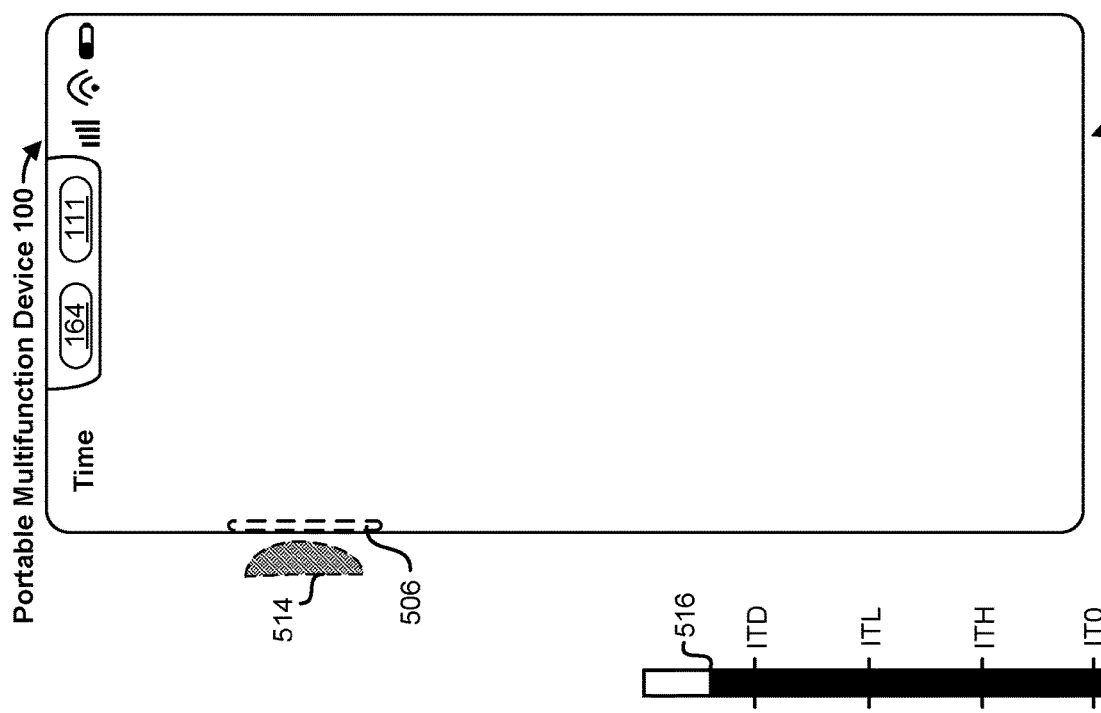
Figure 5F:
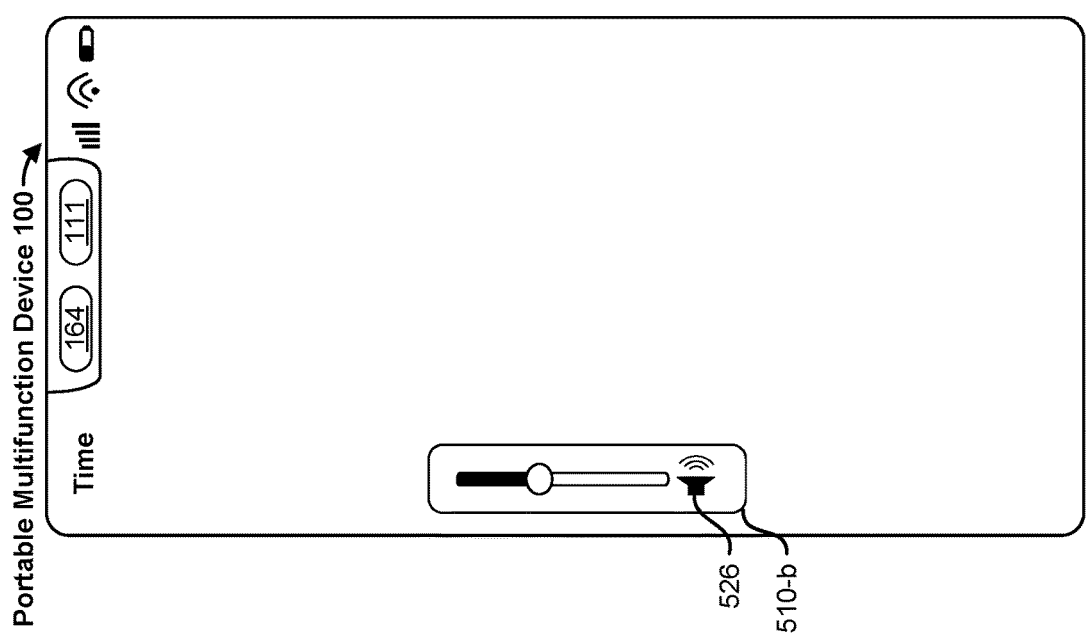

FIG. 5C shows user input 514 (e.g., a touch input and/or intensity input) at an edge of multifunction device 100 corresponding to input location 506. User input 514 has corresponding intensity 516 that is greater than the deep press threshold ($IT_D$). FIG. 5D illustrates a transition from FIG. 5C. FIG. 5D shows multifunction device 100 with volume element 518 displayed on touch screen 112. Volume element 518 in FIG. 5D is displayed in response to user input 514 in FIG. 5C. In accordance with some embodiments, volume element 518 includes a muted-speaker icon indicating that an output volume of multifunction device 100 is muted. Volume element 518 is displayed at a location in FIG. 5D that is adjacent to input location 506 in FIG. 5C. In some embodiments, volume element 518 is non-interactive. In some embodiments, volume element 518 is interactive (e.g., a user input at volume element 518 toggles a mute function of multifunction device 100). As illustrated in FIGS. 5A-5D, user inputs with different intensities cause different user elements to be displayed in accordance with some embodiments. In the example of FIGS. 5A-5D a light press input (e.g., user input 502) causes a first user interface element (e.g., volume control element 510) to be displayed and a deep press input (e.g., user input 514) causes a second user interface element (e.g., volume element 518) to be displayed.

Figure 5E:
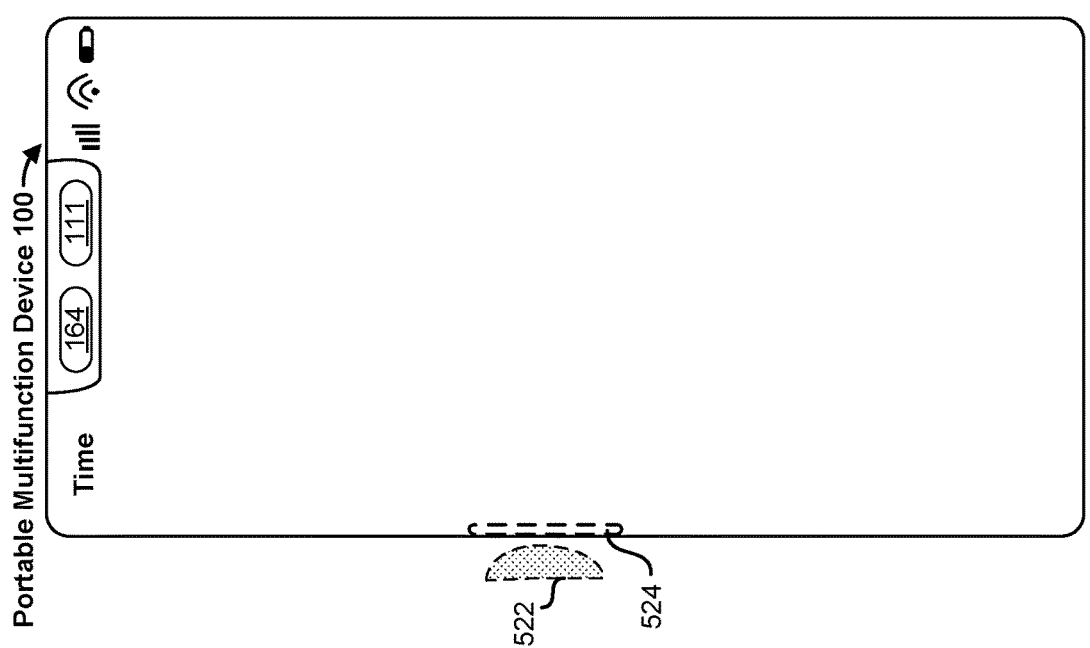
Figure 5H:
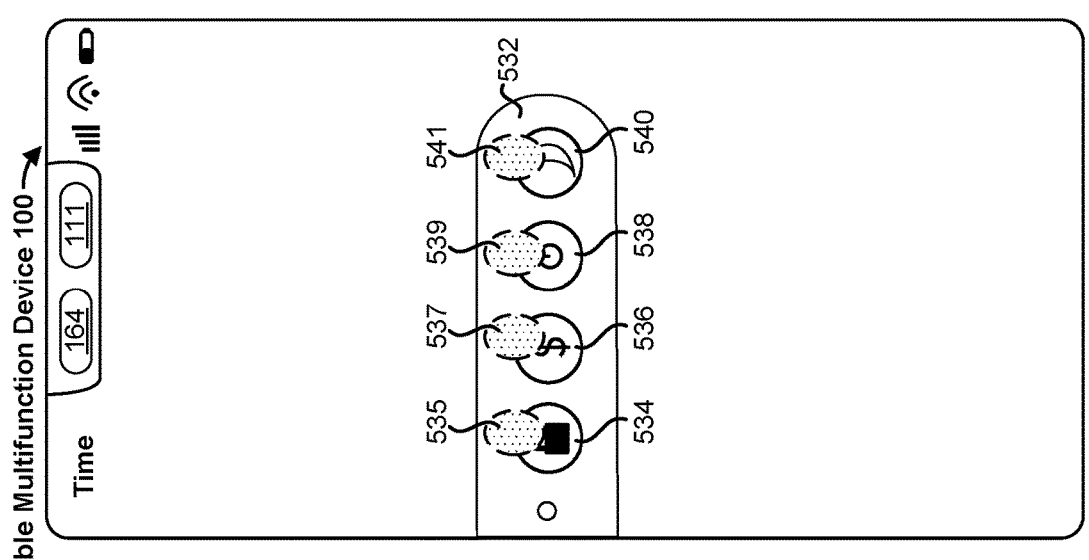

FIG. 5E shows user input 522 (e.g., a light press input) at an edge of multifunction device 100 corresponding to input location 524. FIG. 5F illustrates a transition from FIG. 5E. FIG. 5F shows multifunction device 100 with volume control element 510 displayed at display location 510-b on touch screen 112. Volume control element 510 in FIG. 5F is displayed in response to user input 522 in FIG. 5E and includes speaker icon 526. Display location 510-b in FIG. 5E is adjacent to input location 524 in FIG. 5E. As shown in FIGS. 5A-5B and 5E-5F, user inputs 502 and 522 are at two different locations along a same edge of multifunction device 100 (e.g., input locations 506 and 524) and volume control element 510 is displayed at corresponding display locations (e.g., display locations 510-*a* and 510-*b* respectively) in accordance with some embodiments.

Figure 5G:
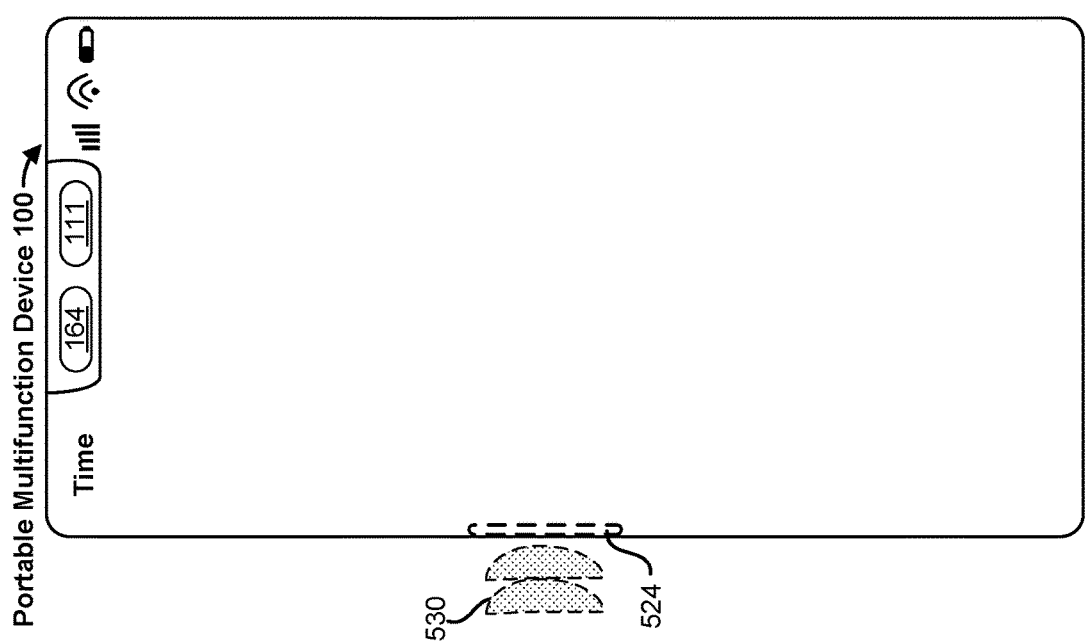

FIG. 5G shows user input 530 (e.g., a double tap input) at an edge of multifunction device 100 corresponding to input location 524. FIG. 5H illustrates a transition from FIG. 5G. FIG. 5H shows multifunction device 100 with menu 532 displayed on touch screen 112. Menu 532 in FIG. 5H is displayed in response to user input 530 in FIG. 5G. Menu 532 is displayed at a location in FIG. 5H that is adjacent to input location 524 in FIG. 5G. Menu 532 in FIG. 5H includes selectable option 534 (e.g., an option to lock the device), selectable option 536 (e.g., an option to use a payment function of the device), selectable option 538 (e.g., an option to turn off the device), and selectable option 540 (e.g., an option to turn on/off the Do Not Disturb mode of the device). In some embodiments, menu 532 includes a superset or subset of the options shown in FIG. 5H. FIG. 5H further shows user input 535 (e.g., a tap, light press, or other input type) at selectable option 534, user input 537 (e.g., a tap, light press, or other input type) at selectable option 536, user input 539 (e.g., a tap, light press, or other input type) at selectable option 538, and user input 541 (e.g., a tap, light press, or other input type) at selectable option 540. As shown in FIGS. 5E-5H, different types of inputs (e.g., a tap input and a double tap input) at a same location along an edge of multifunction device 100 (e.g., input location 524) cause different user interface elements to be displayed (e.g., a volume control element and a menu) in accordance with some embodiments. In some embodiments, a double tap gesture (e.g., user input 530) causes display of a plurality of selectable user interface elements and a subsequent tap gesture at any of the user interface elements causes performance of a function corresponding to the respective user interface element.

Figure 5J:
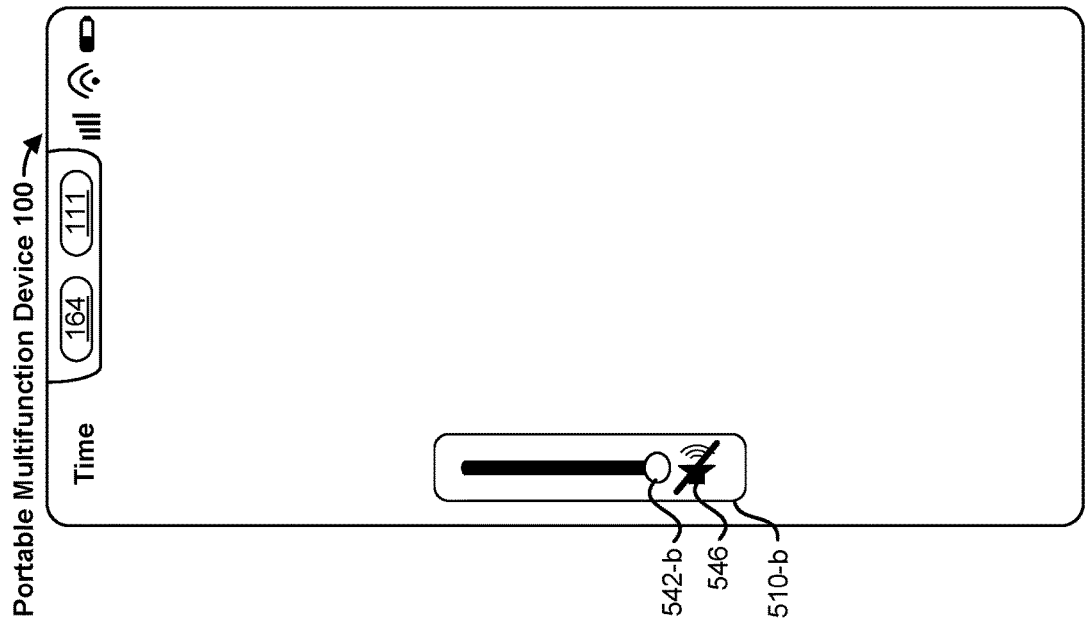
Figure 5I:
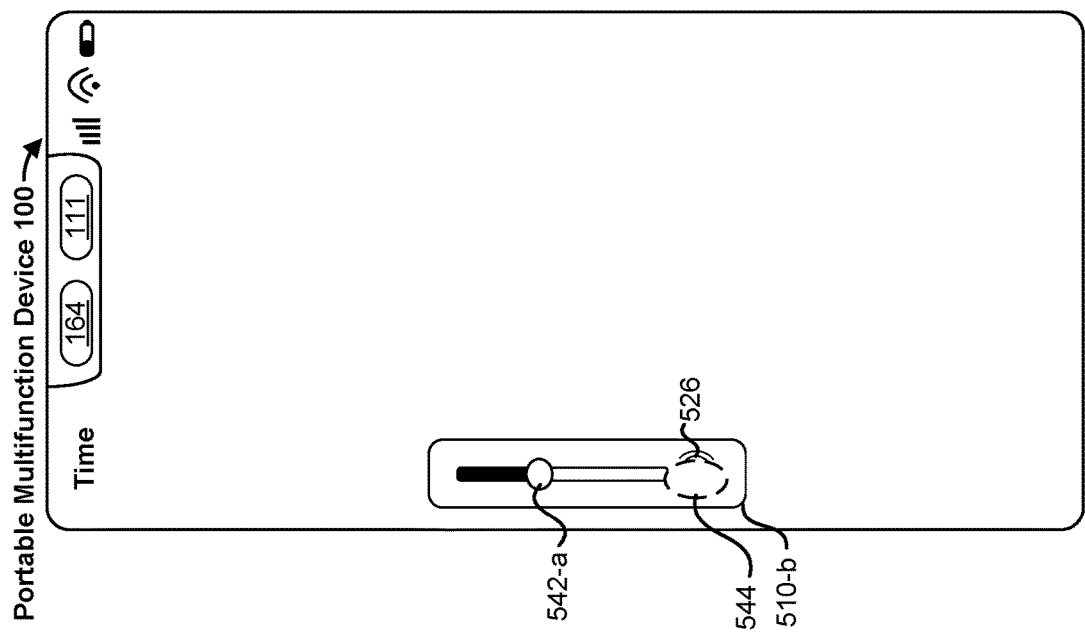

FIG. 5I shows volume control element 510 at display location 510-*b*. In FIG. 5I, volume control element 510 includes volume slider element 542 at position 542-*a* indicating an output volume of multifunction device 100. FIG. 5I further shows user input 544 (e.g., a tap, light press, or other type of input) at speaker icon 526 of volume control element 510. FIG. 5J illustrates a transition from FIG. 5I. FIG. 5J shows multifunction device 100 with volume control element 510 displayed on touch screen 112. In FIG. 5J volume control element 510 includes volume slider element 542 at position 542-*b* indicating that multifunction device 100 is muted. Volume control element 510 in FIG. 5J also includes muted speaker icon 546 indicating that multifunction device 100 is muted. User input 544 at speaker icon 526 in FIG. 5I causes multifunction device 100 to mute audio output as shown in FIG. 5J.

Figure 5L:
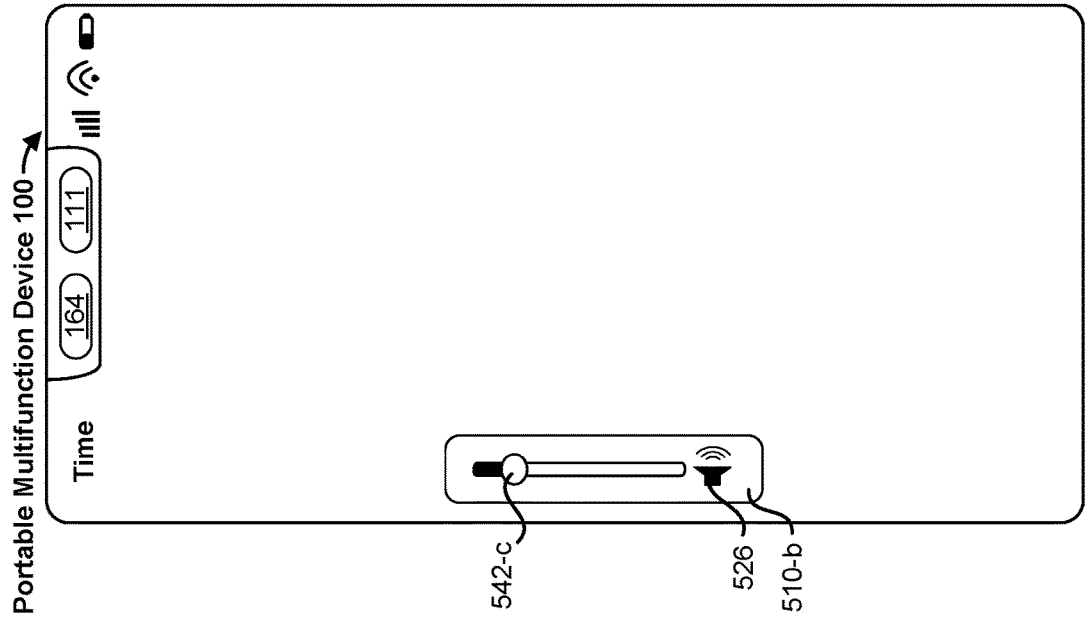
Figure 5K:
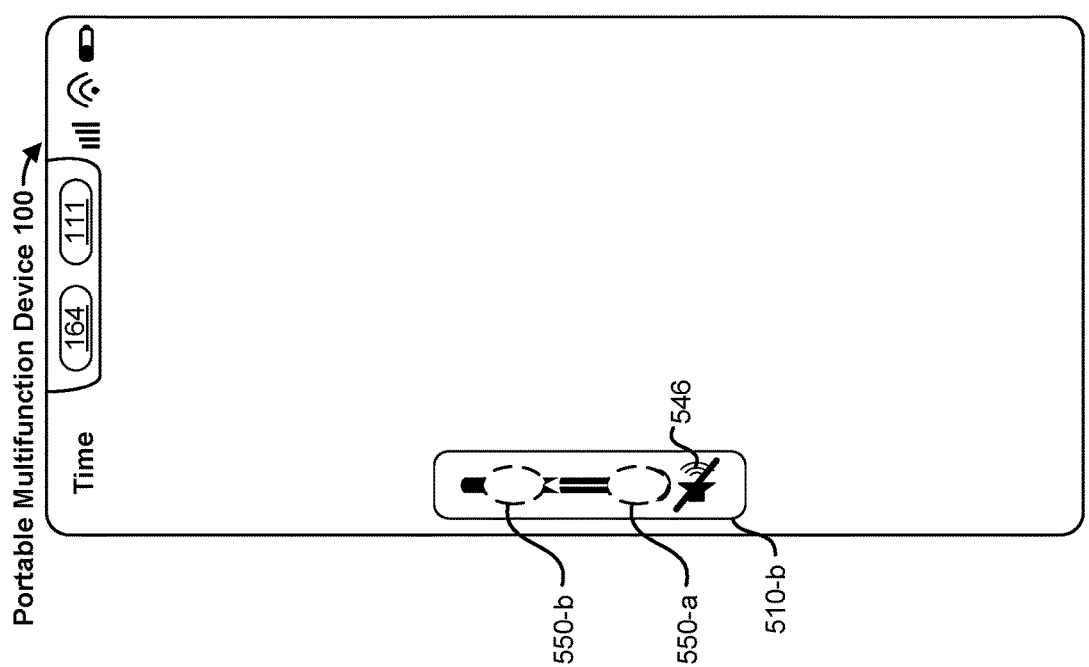

FIG. 5K shows volume control element 510 at display location 510-*b*. In FIG. 5K, volume control element 510 includes muted speaker icon 546 indicating that multifunction device 100 is muted. FIG. 5K further shows user input 550 detected at position 550-*a* corresponding to volume slider element 542 and moving to position 550-*b* (e.g., a swipe or drag gesture). FIG. 5L illustrates a transition from FIG. 5K. FIG. 5L shows multifunction device 100 with volume control element 510 displayed on touch screen 112. In FIG. 5L volume control element 510 includes volume slider element 542 at position 542-*c* indicating an output volume of multifunction device 100 (e.g., an increase in output volume in response to user input 550). Volume control element 510 in FIG. 5L also includes speaker icon 526 indicating that multifunction device 100 is unmuted. User input 550 in FIG. 5K causes multifunction device 100 to increase audio output as shown in FIG. 5L (e.g., volume slider element 542 moves in accordance with a direction and/or magnitude of movement of user input 550).

Figure 5M:
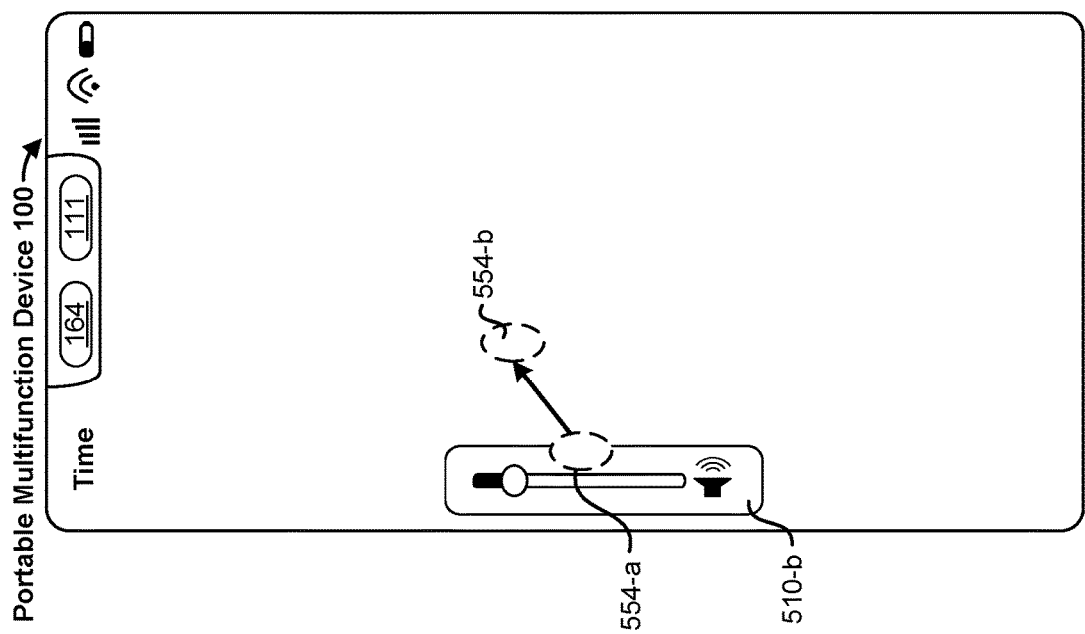
Figure 5N:
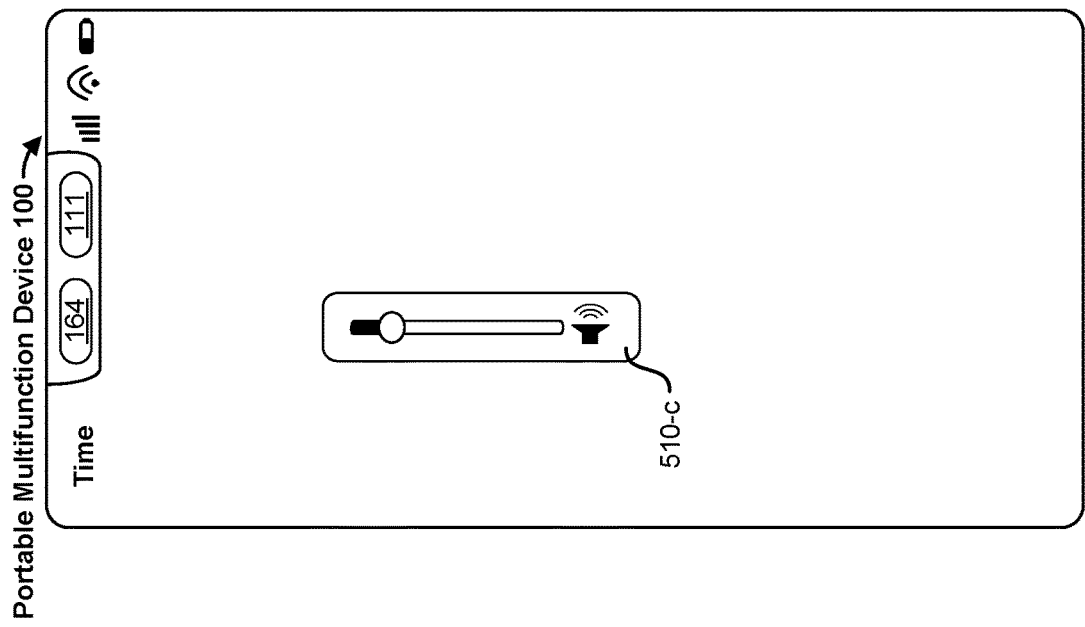

FIG. 5M shows volume control element 510 at display location 510-*b*. FIG. 5M further shows user input 554 detected at position 554-*a* corresponding to volume control element 510 and moving to position 554-*b* (e.g., a swipe or drag gesture). FIG. 5N illustrates a transition from FIG. 5M. FIG. 5N shows multifunction device 100 with volume control element 510 displayed at display location 510-*c* on touch screen 112. User input 554 in FIG. 5M causes volume control element 510 to move from display location 510-*b* in FIG. 5M to display location 510-*c* in FIG. 5L (e.g., volume control element 510 moves in accordance with a direction and/or magnitude of movement of user input 554).

Figure 5P:
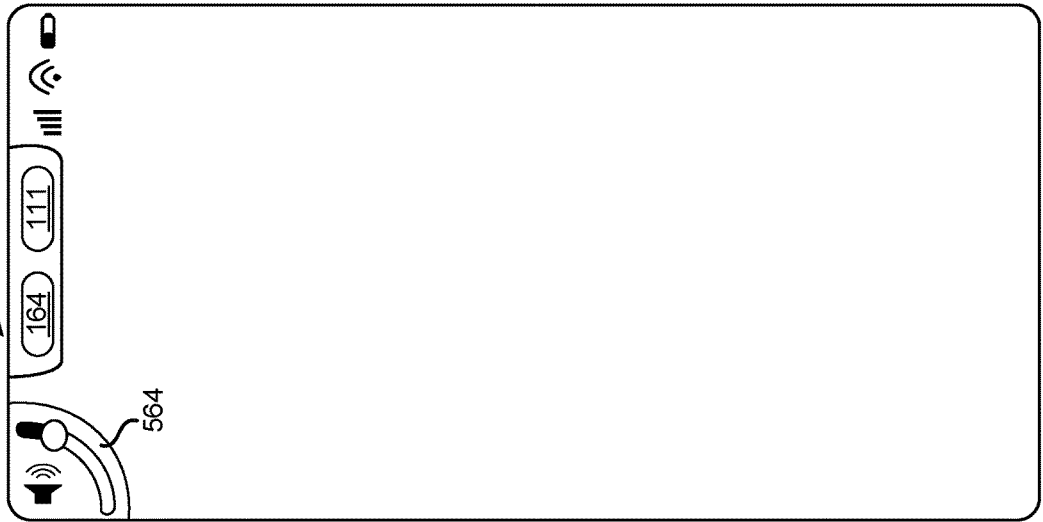
Figure 5O:
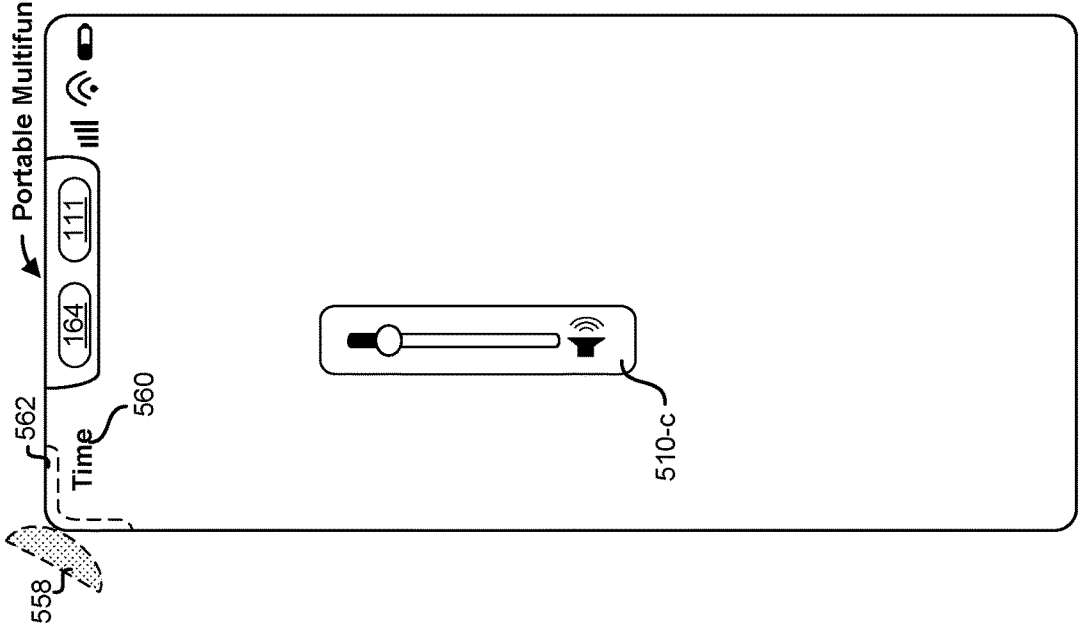

FIG. 5O shows volume control element 510 at display location 510-*c* and time element 560 displayed near a top-left corner of multifunction device 100. FIG. 5O also shows user input 558 (e.g., a tap or light press input) at the top-left corner of multifunction device 100 corresponding to input location 562. FIG. 5P illustrates a transition from FIG. 5O. FIG. 5P shows multifunction device 100 with volume control element 564 displayed at a display location corresponding to the top-left corner on touch screen 112. Volume control element 564 in FIG. 5P is displayed in response to user input 558 in FIG. 5O and includes a volume slider element and a speaker icon. Display location 510-*b* in FIG. 5E is adjacent to input location 524 in FIG. 5E. FIG. 5P further shows multifunction device 100 ceasing to display volume control element 510 and time element 560 in response to user input 558 (e.g., display of time element 560 is replaced with display of volume control element 564). Display of volume control element 510 in FIG. 5O is replaced with display of volume control element 564 in response to user input 558. In accordance with some embodiments, volume control element 564 (e.g., a corner UI element) has a different shape and arrangement of components (e.g., the speaker icon and volume slider) than volume control element 510 (e.g., a non-corner UI element). In some embodiments, a corner UI element has different components (e.g., sub-elements) than a corresponding non-corner UI element.

Figure 5R:
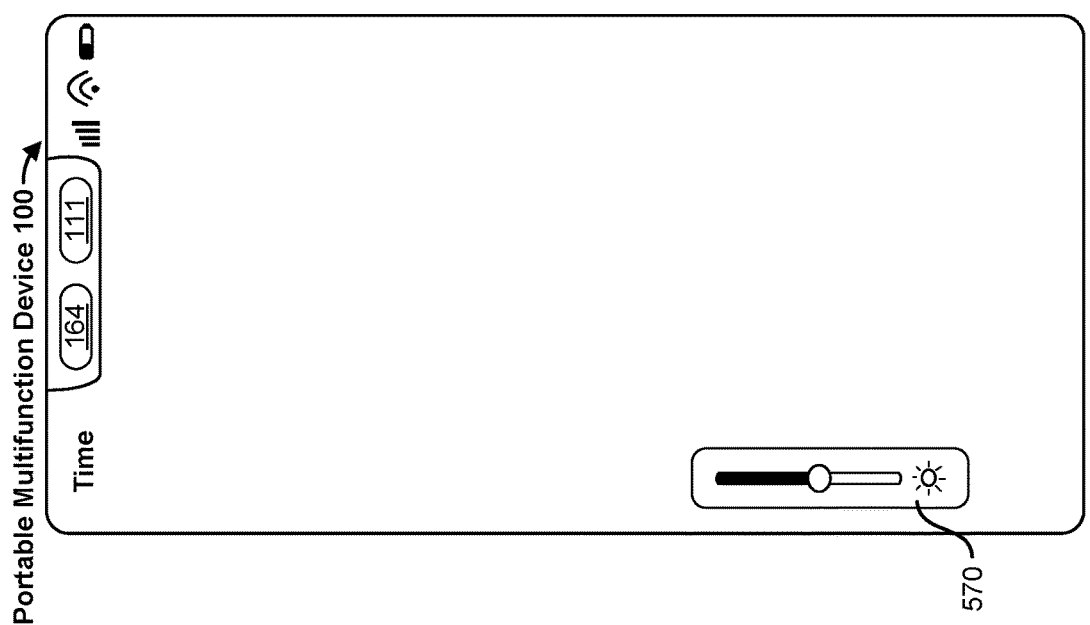
Figure 5Q:
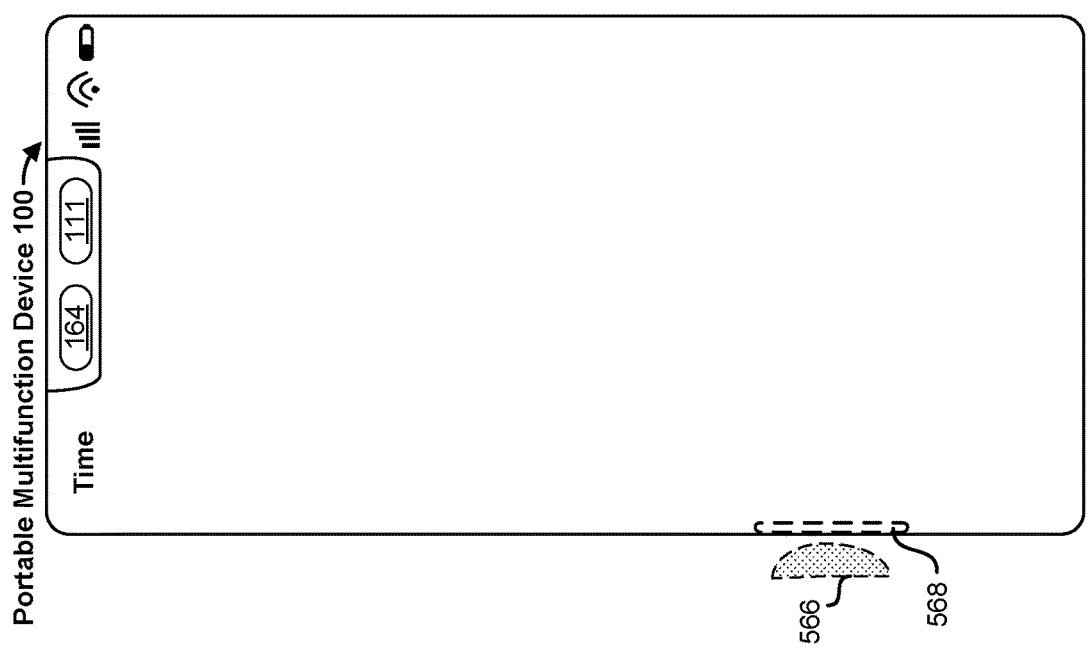

FIG. 5Q shows user input 566 (e.g., a light press input) at an edge of multifunction device 100 corresponding to input location 568. FIG. 5R illustrates a transition from FIG. 5Q. FIG. 5R shows multifunction device 100 with brightness control element 570 displayed at a display location on touch screen 112. Brightness control element 570 in FIG. 5R is displayed in response to user input 566 in FIG. 5Q and includes speaker icon 526. Display location of brightness control element 570 in FIG. 5R is adjacent to input location 568 in FIG. 5Q. As shown in FIGS. 5E-5F and 5Q-5R, user inputs 522 and 566 at two different locations along a same edge of multifunction device 100 (e.g., input locations 524 and 568) cause volume control element 510 or brightness control element 570 to be displayed based on the respective input locations.

Figure 5T:
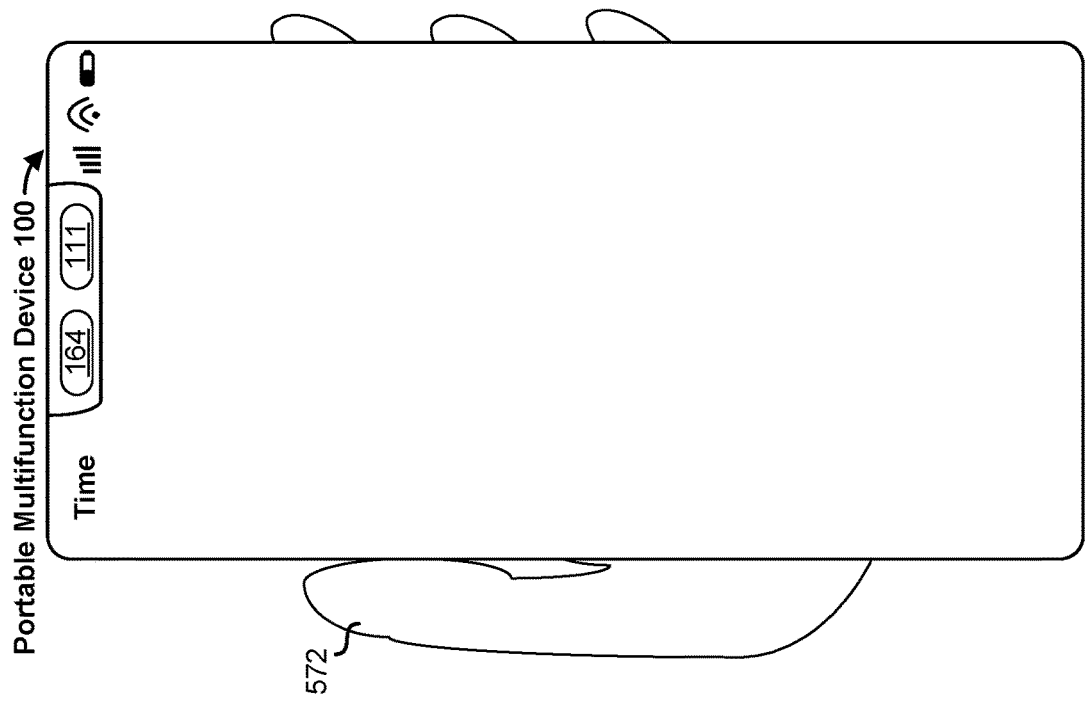
Figure 5S:
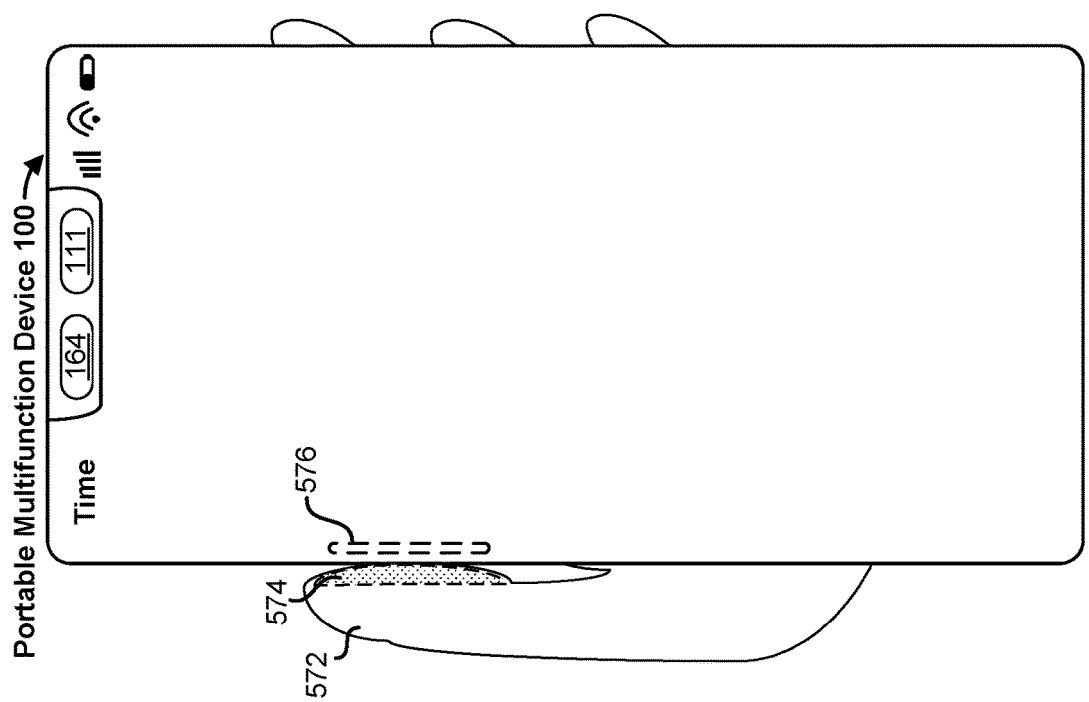

FIG. 5S shows user input 574 (e.g., a light press input) at an edge of multifunction device 100 corresponding to input location 576. In FIG. 5S user input 574 corresponds to a touch by thumb 572 of the user's hand (e.g., multifunction device 100 is being held in the user's left hand). FIG. 5T illustrates a transition from FIG. 5S. FIG. 5T shows multifunction device 100 not displaying volume control element 510 in response to user input 574 (e.g., multifunction device 100 forgoes responding to user input 574 in accordance with a determination that user input 574 corresponds to thumb 572). In some embodiments, multifunction device 100 is configured (e.g., programmed) to forgo responding to touch inputs applied by a user's thumb. In some embodiments, multifunction device 100 is configured (e.g., programmed) to respond to touch input applied by a user's thumb (e.g., in a same manner as touch inputs applied by a user's fingers).

Figure 5V:
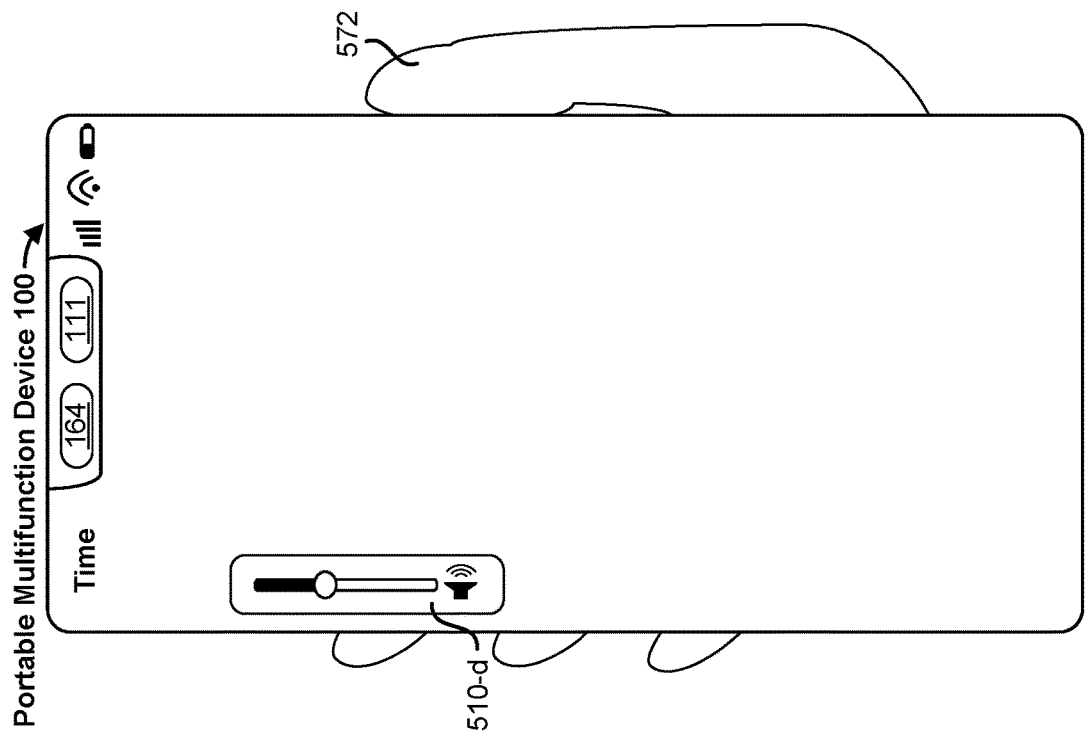
Figure 5U:
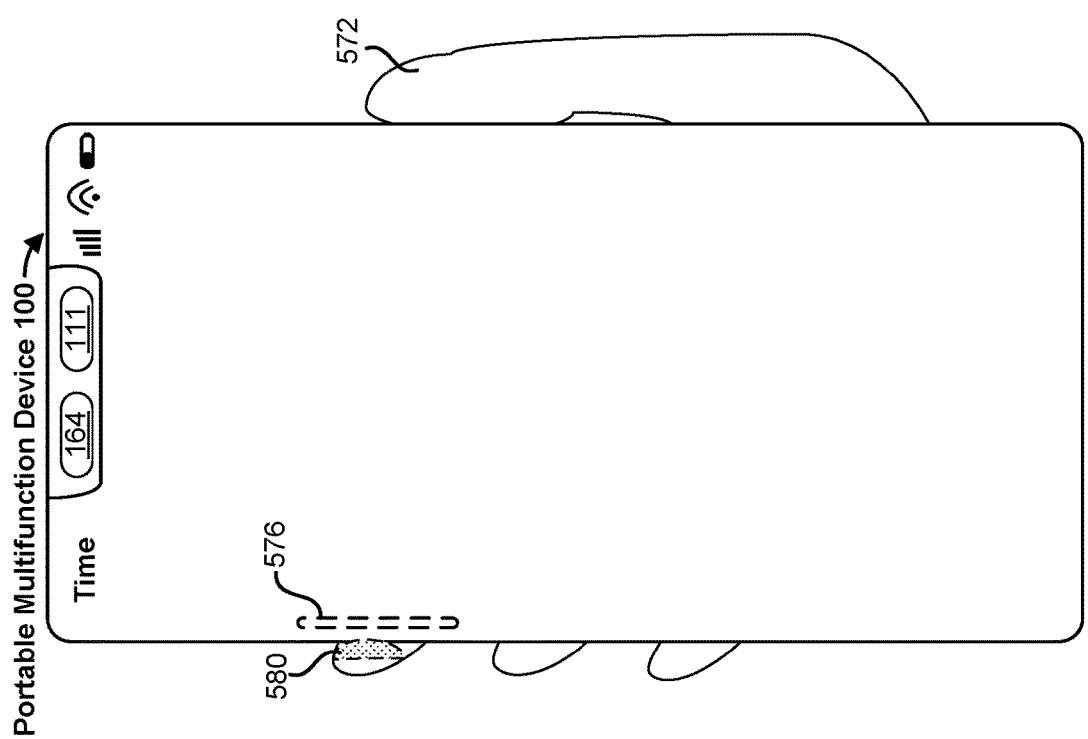

FIG. 5U shows user input 580 (e.g., a light press input) at an edge of multifunction device 100 corresponding to input location 576. In FIG. 5U user input 580 corresponds to a touch by an index finger of the user's hand (e.g., multifunction device 100 is being held in the user's right hand). FIG. 5V illustrates a transition from FIG. 5U. FIG. 5V shows multifunction device 100 displaying volume control element 510 at display location 510-d in response to user input 580 (e.g., multifunction device 100 responds to user input 580 in accordance with a determination that user input 580 does not correspond to thumb 572). Display location 510-d of volume control element 510 in FIG. 5V is adjacent to input location 576 in FIG. 5U. In some embodiments, multifunction device 100 is configured (e.g., programmed) to respond to touch inputs applied by a user's fingers and not respond to touch inputs applied by a user's thumb.

Figure 5X:
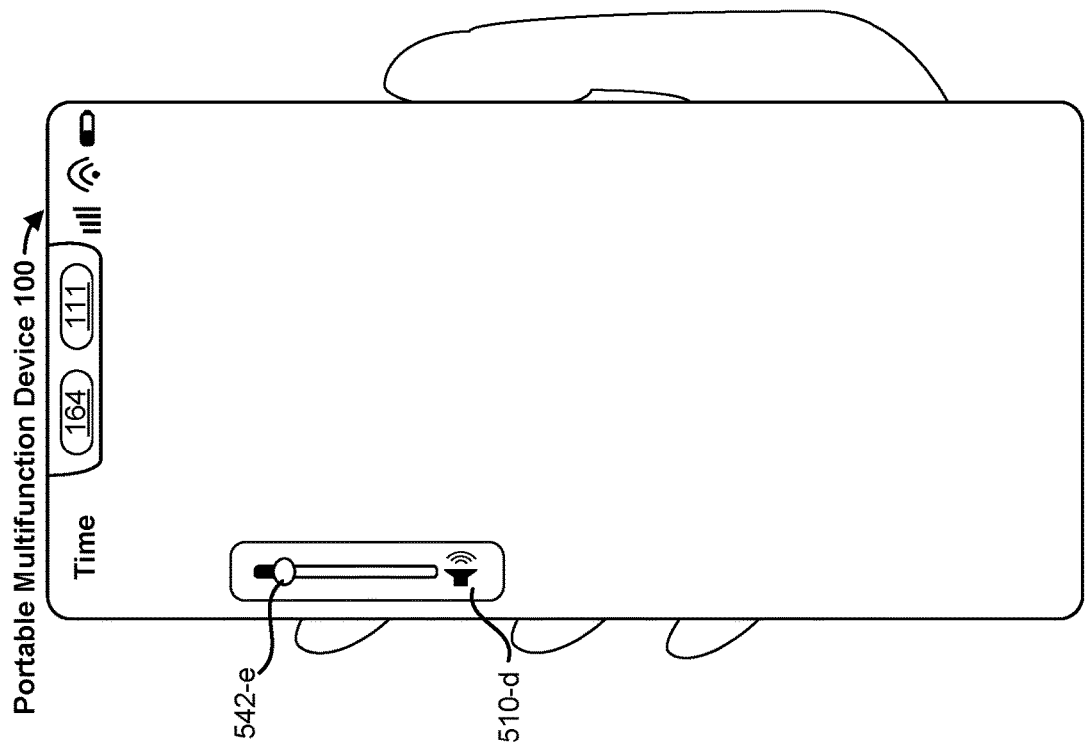
Figure 5W:
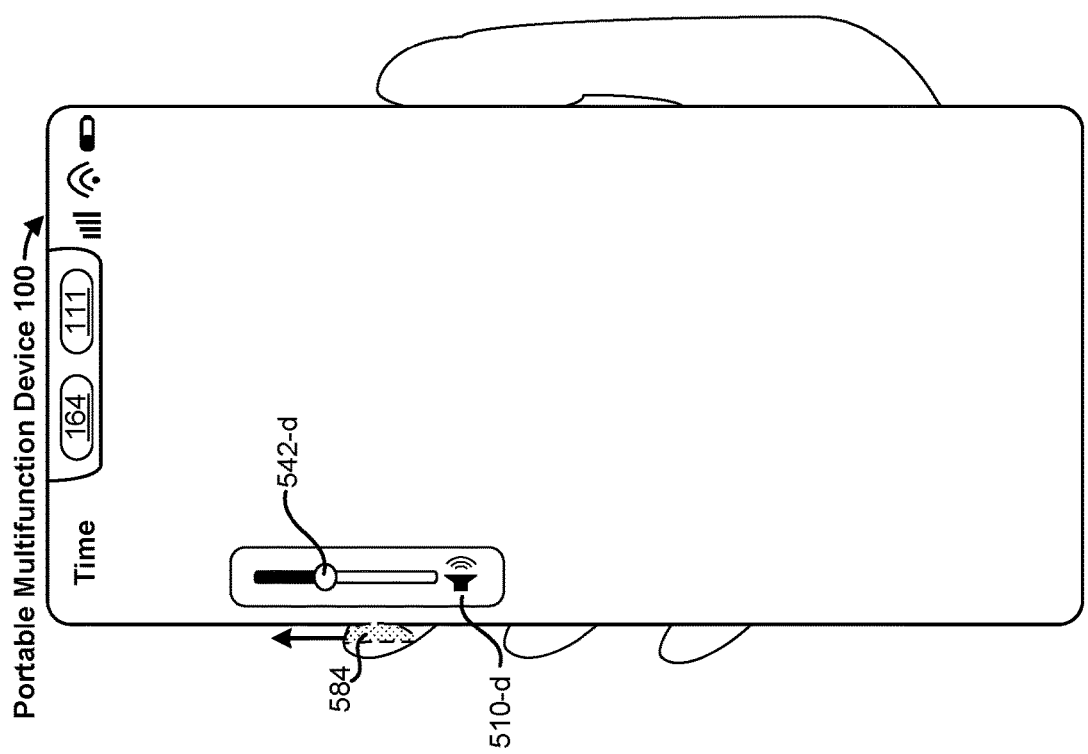

FIG. 5W shows volume control element 510 at display location 510-d. In FIG. 5W, volume control element 510 includes volume slider element 542 at position 542-d indicating an output volume of multifunction device 100. FIG. 5W further shows user input 584 detected at a position on the edge of multifunction device 100 corresponding to volume control element 510 (e.g., a swipe or drag gesture). FIG. 5X illustrates a transition from FIG. 5W. FIG. 5X shows multifunction device 100 with volume control element 510 displayed on touch screen 112. In FIG. 5X volume control element 510 includes volume slider element 542 at position 542-e indicating an output volume of multifunction device 100 (e.g., an increase in output volume in response to user input 584). User input 584 in FIG. 5W causes multifunction device 100 to increase audio output as shown in FIG. 5X (e.g., volume slider element 542 moves in accordance with a direction and/or magnitude of movement of user input 584).

Figure 5Y:
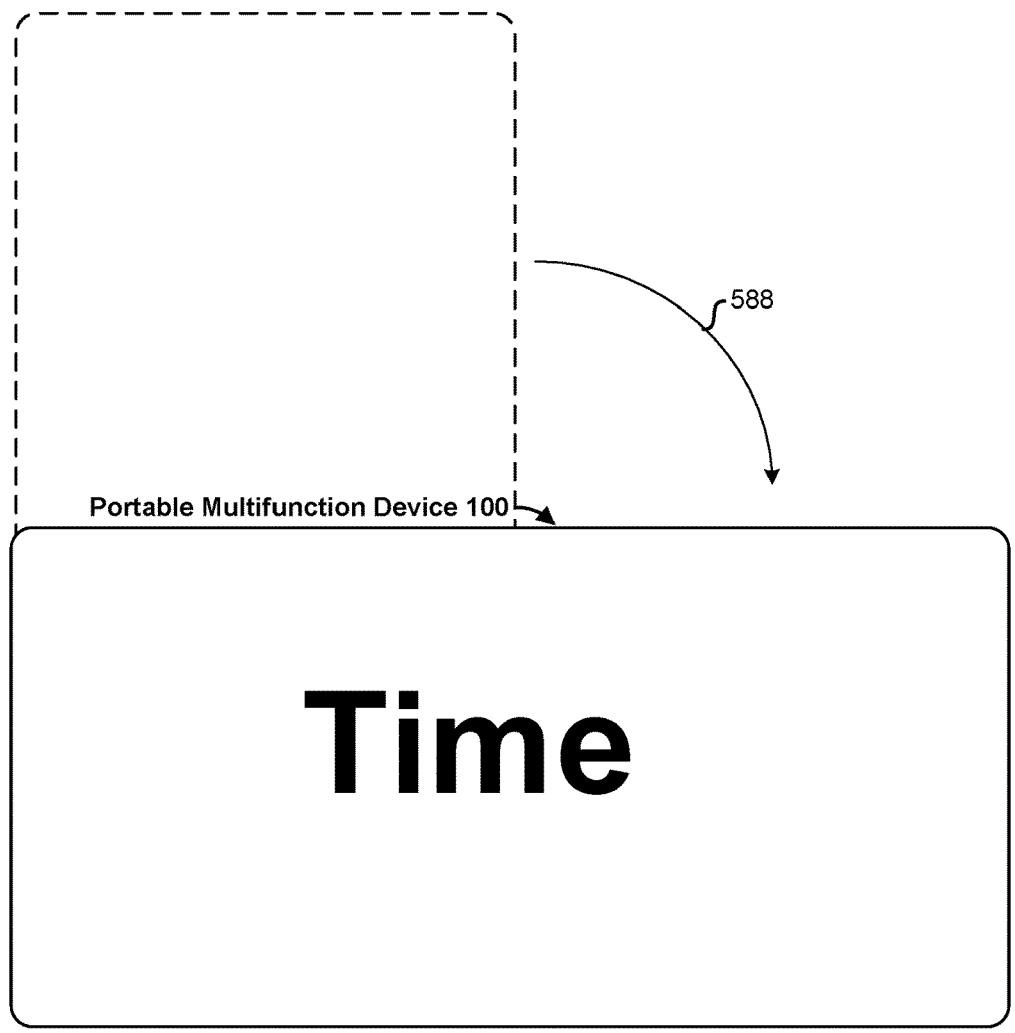
Figure 5Z:
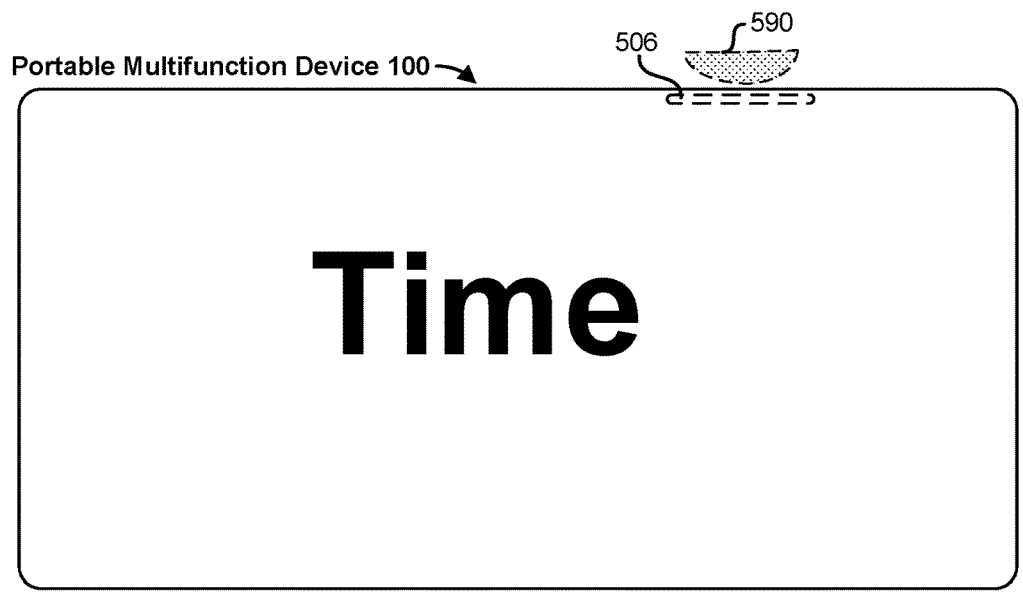
Figure 5A:
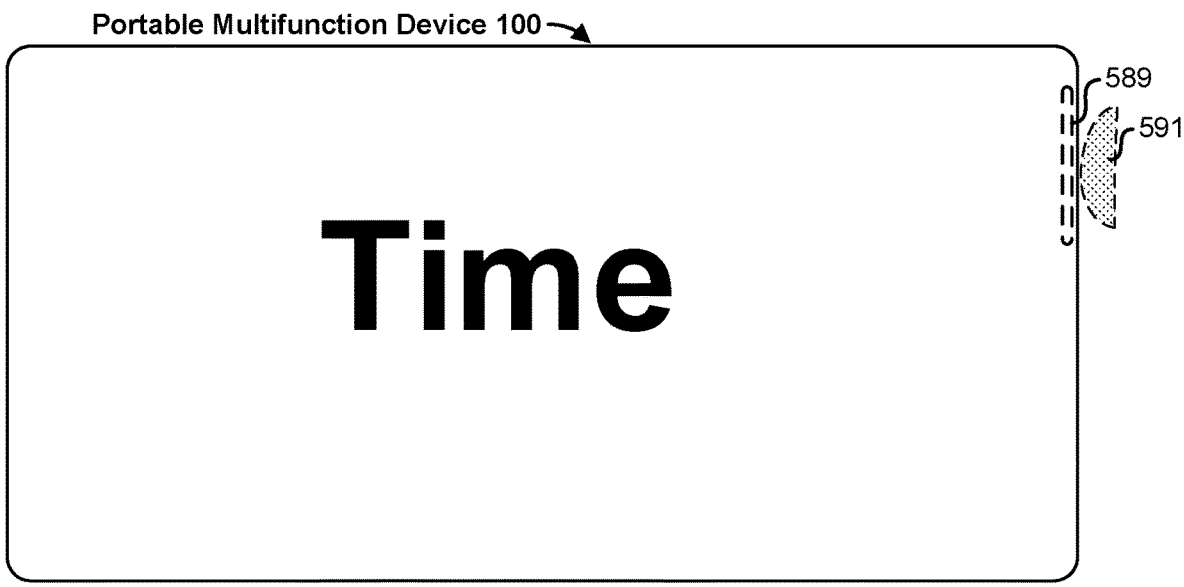
Figure 5A:
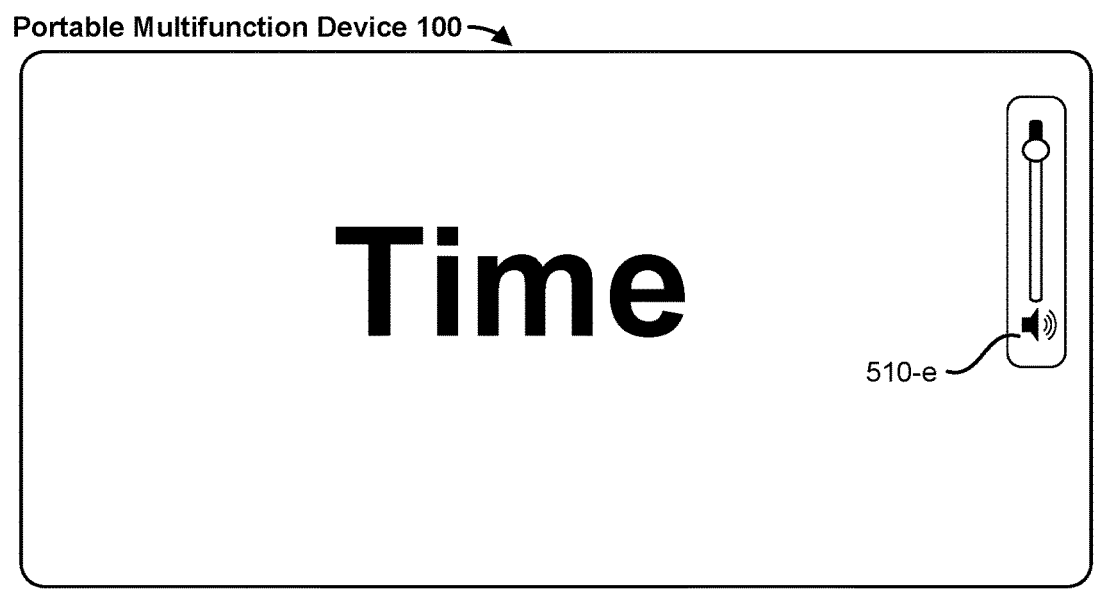
Figure 5A:
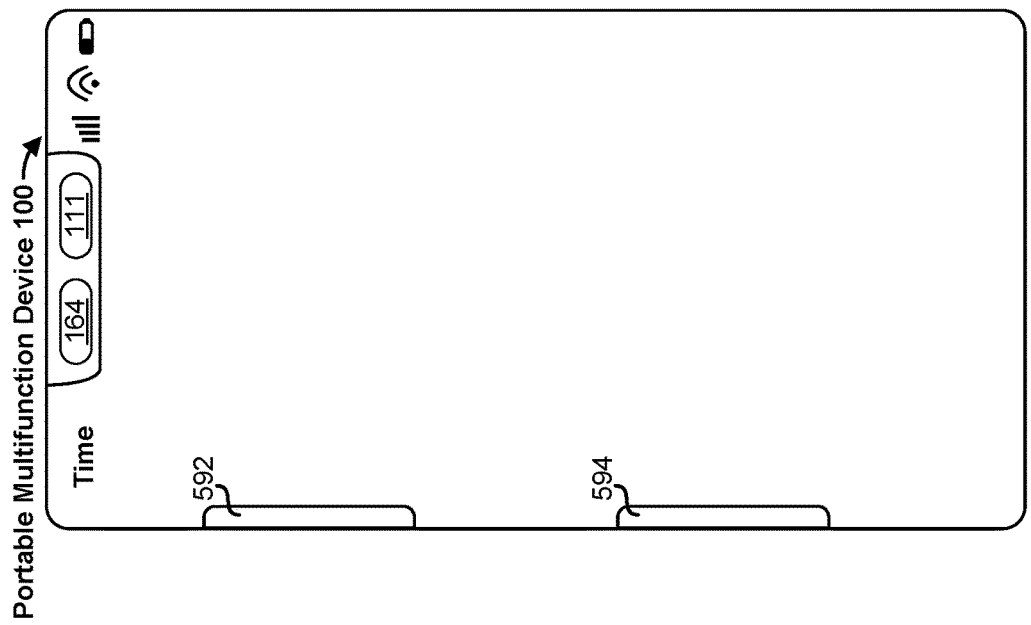
Figure 5A:
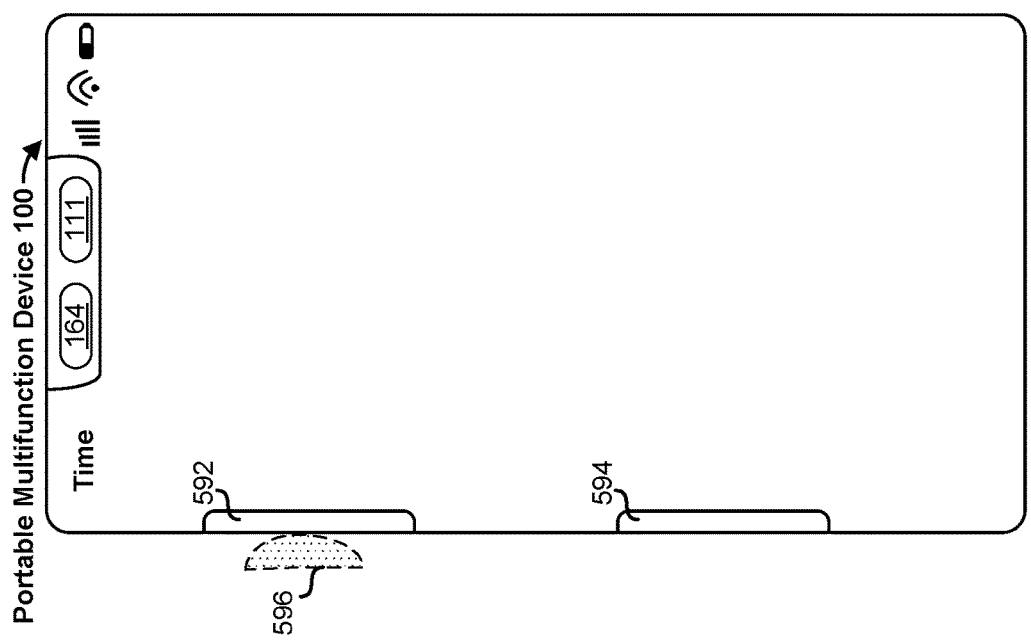
Figure 5A:
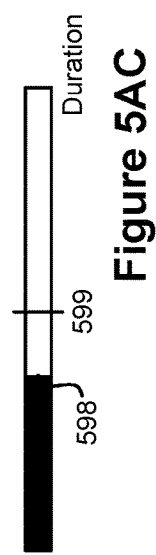
Figure 5A:
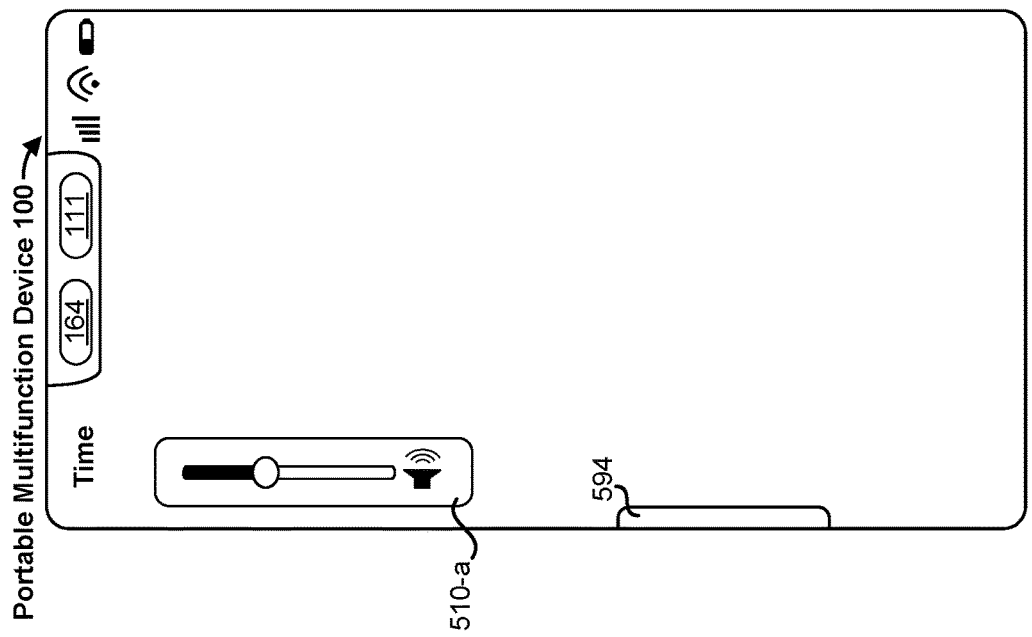
Figure 5A:
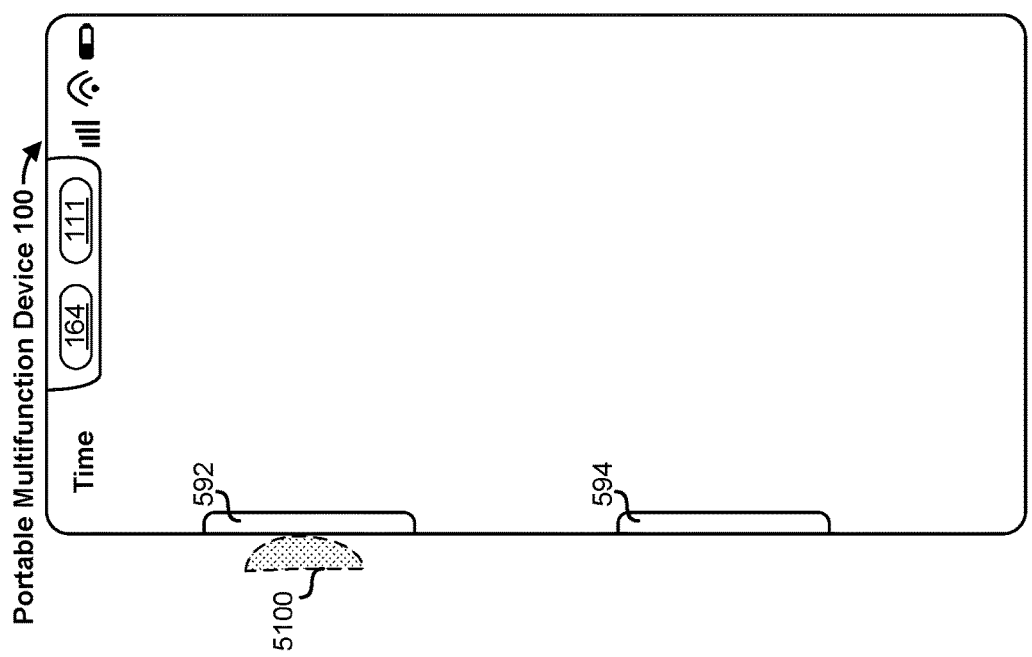
Figure 5A:
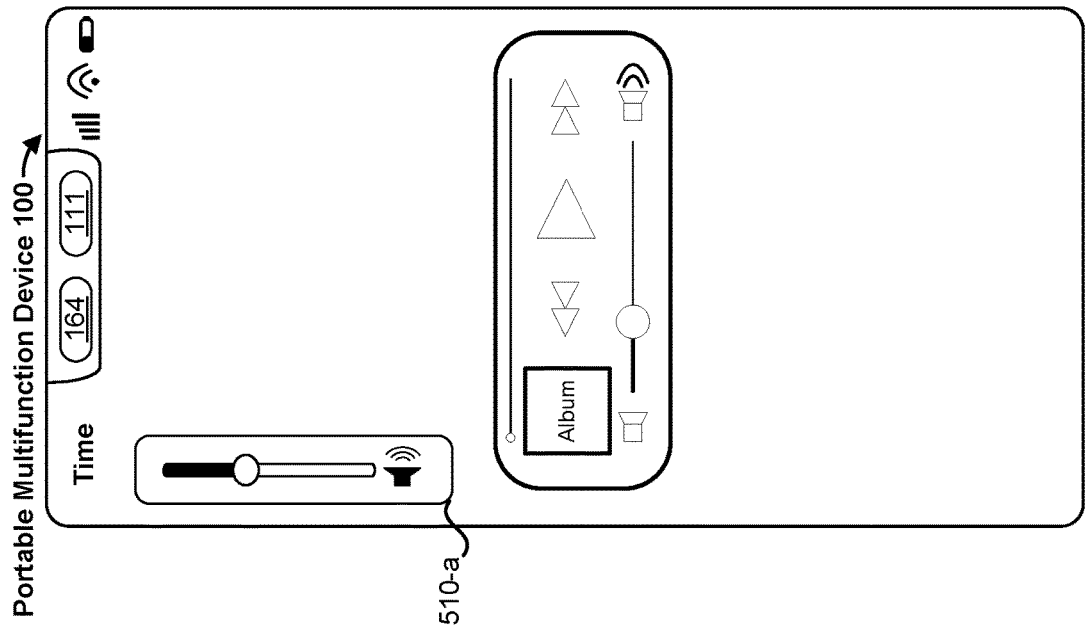
Figure 5A:
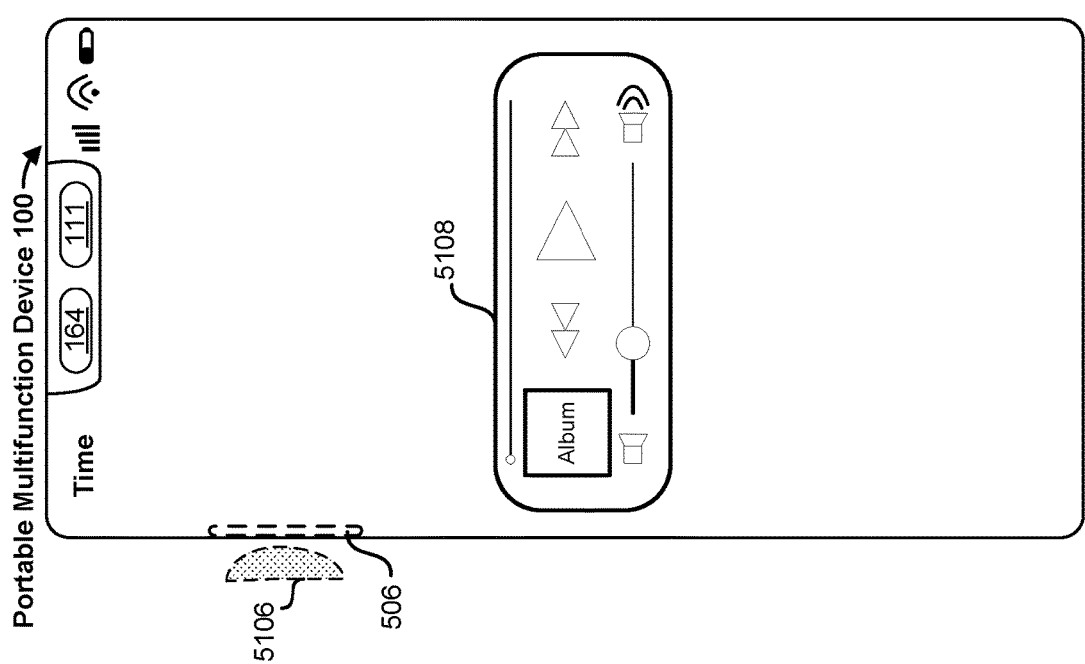
Figure 5A:
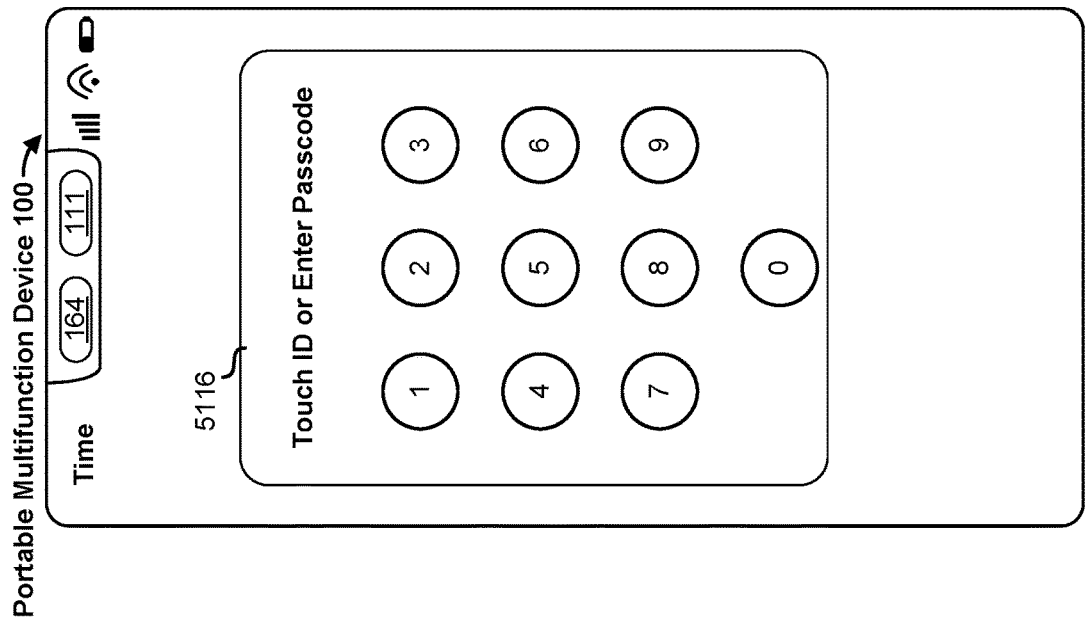
Figure 5A:
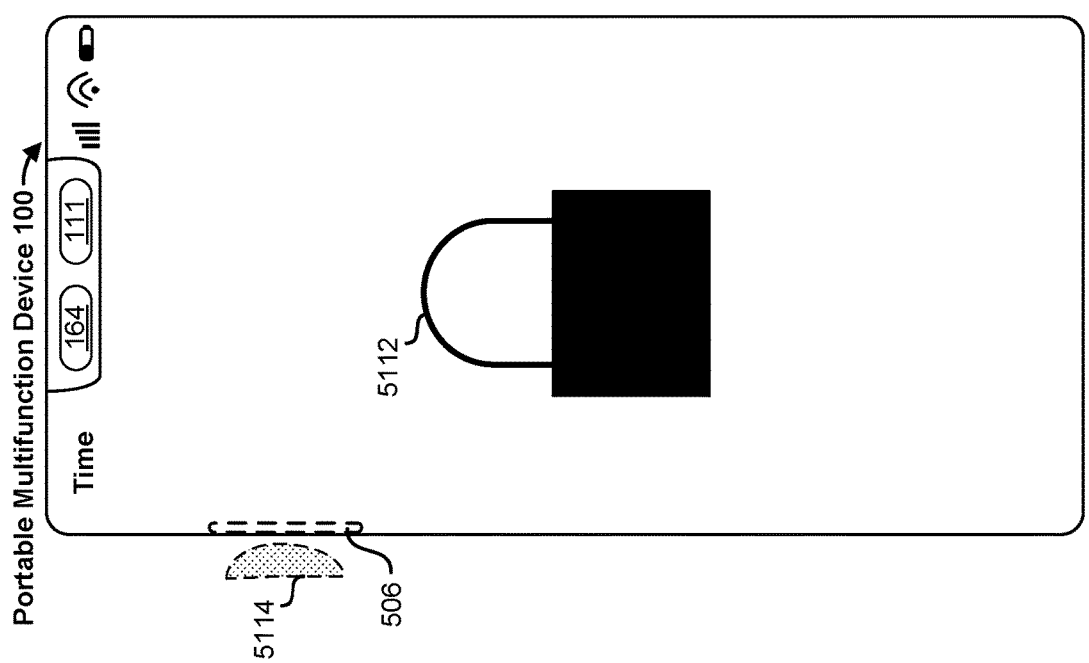
Figure 5A:
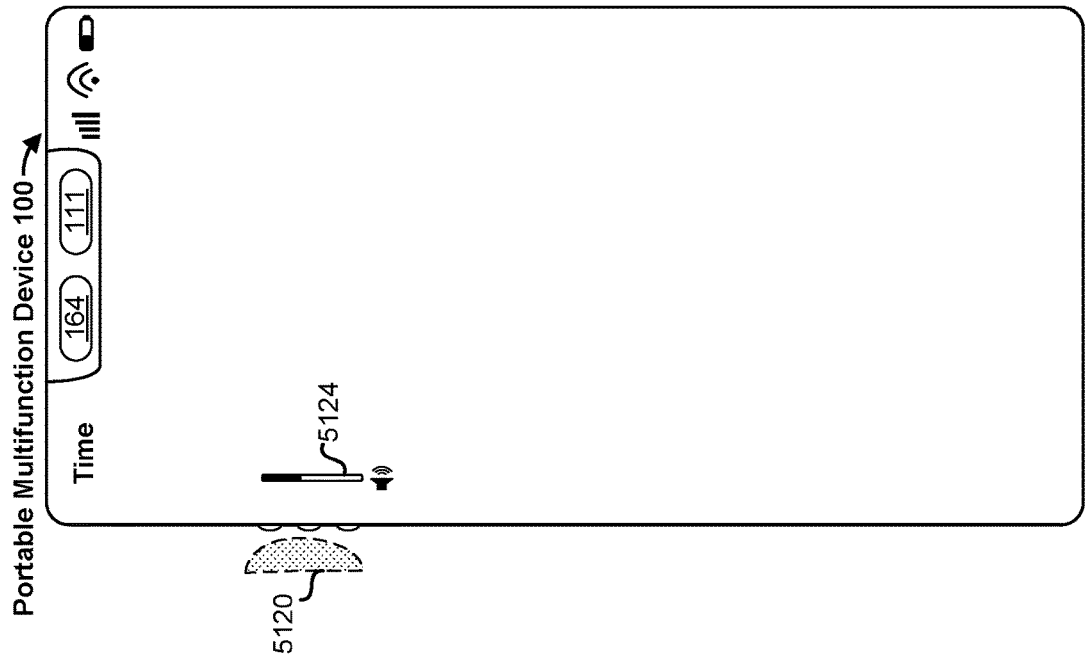
Figure 5A:
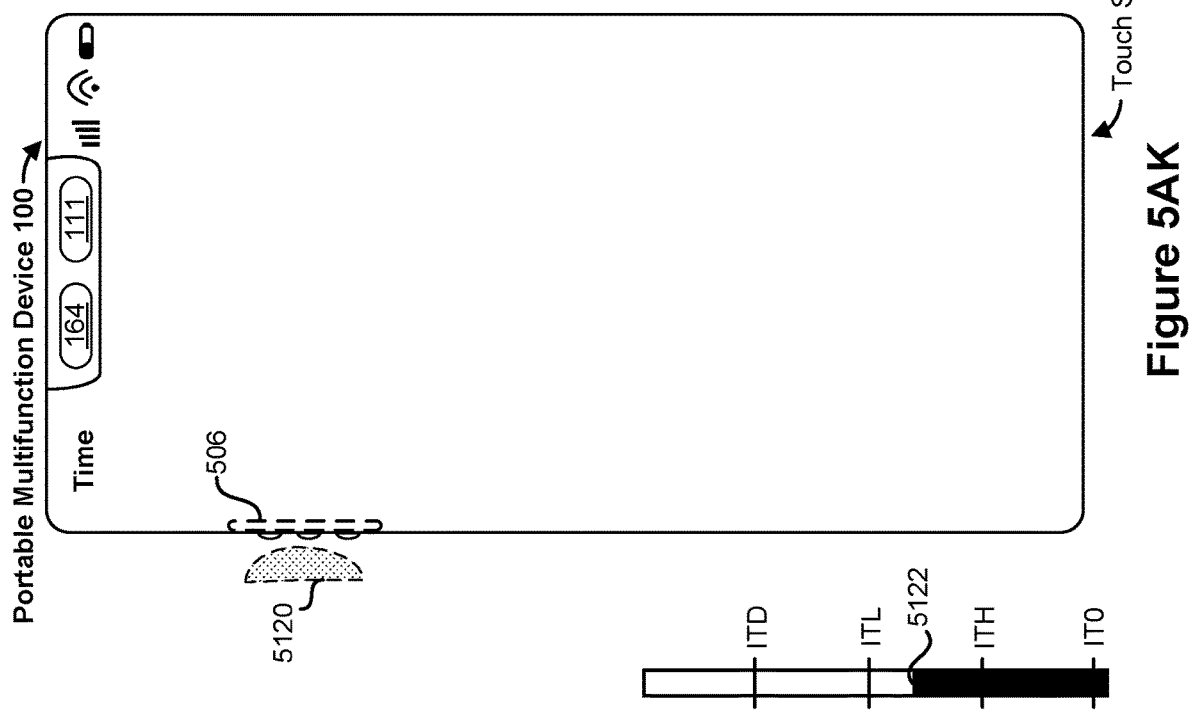
Figure 5A:
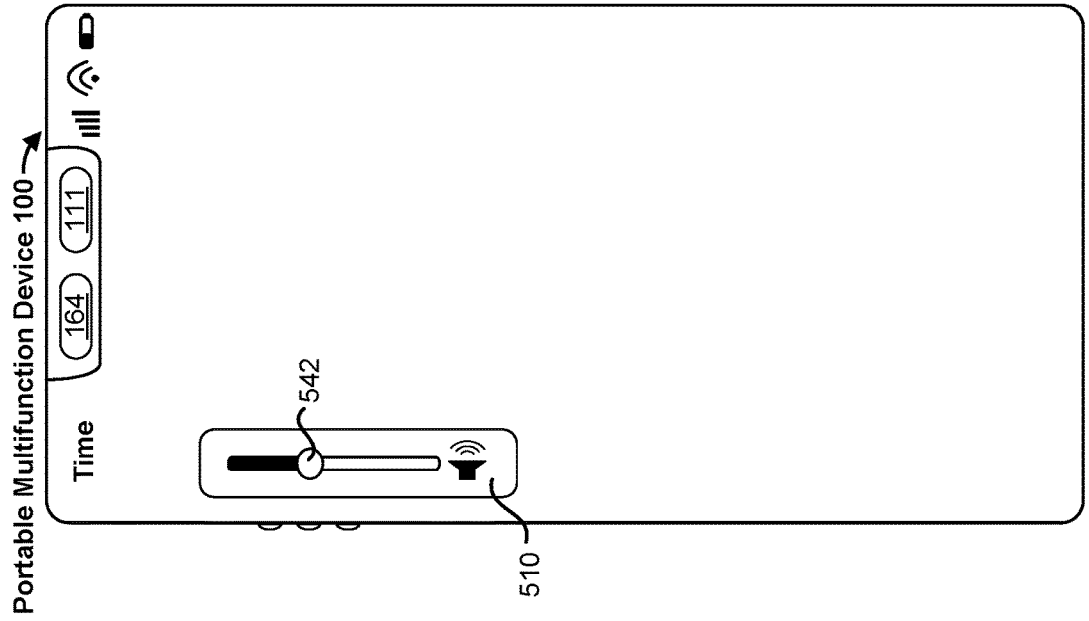
Figure 5A:
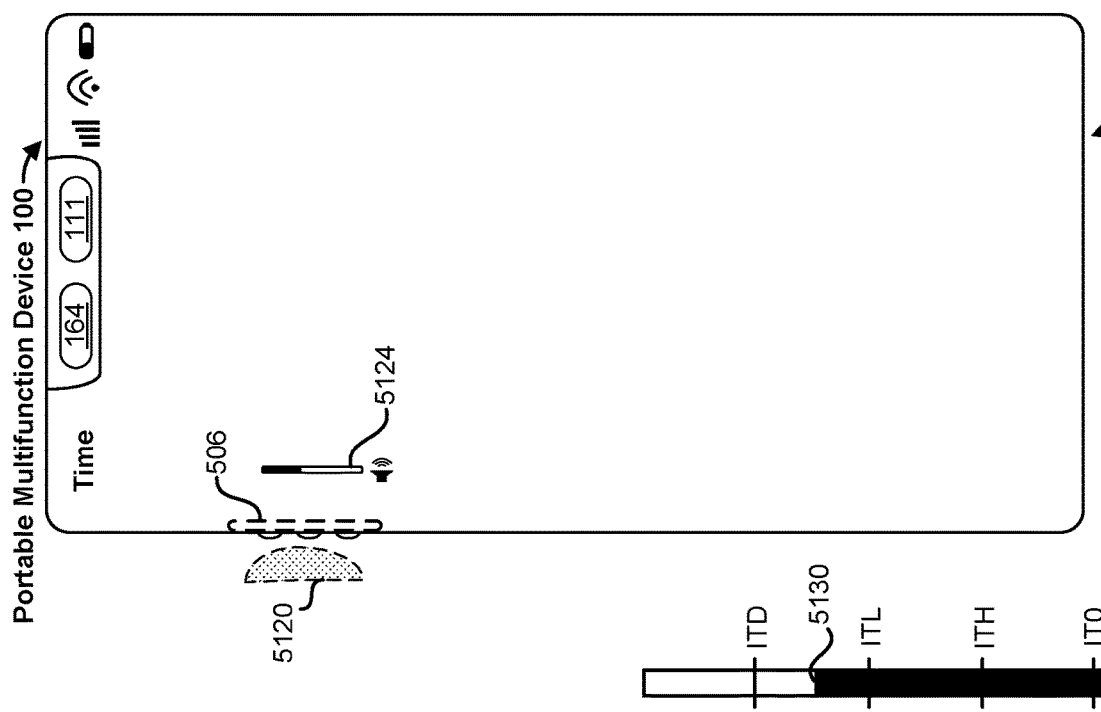
Figure 5A:
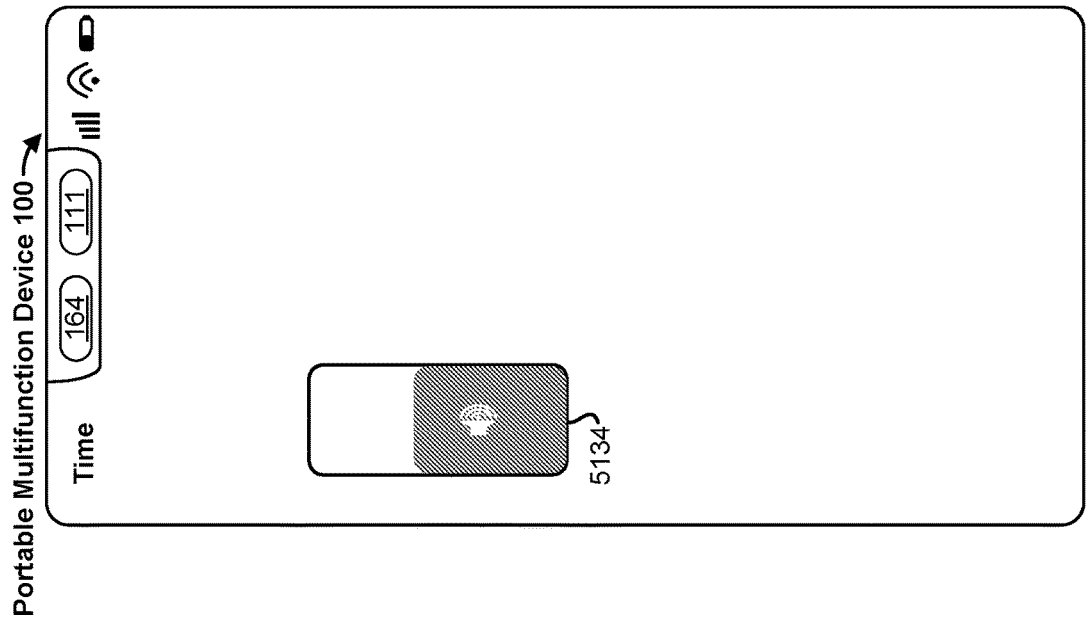
Figure 5A:
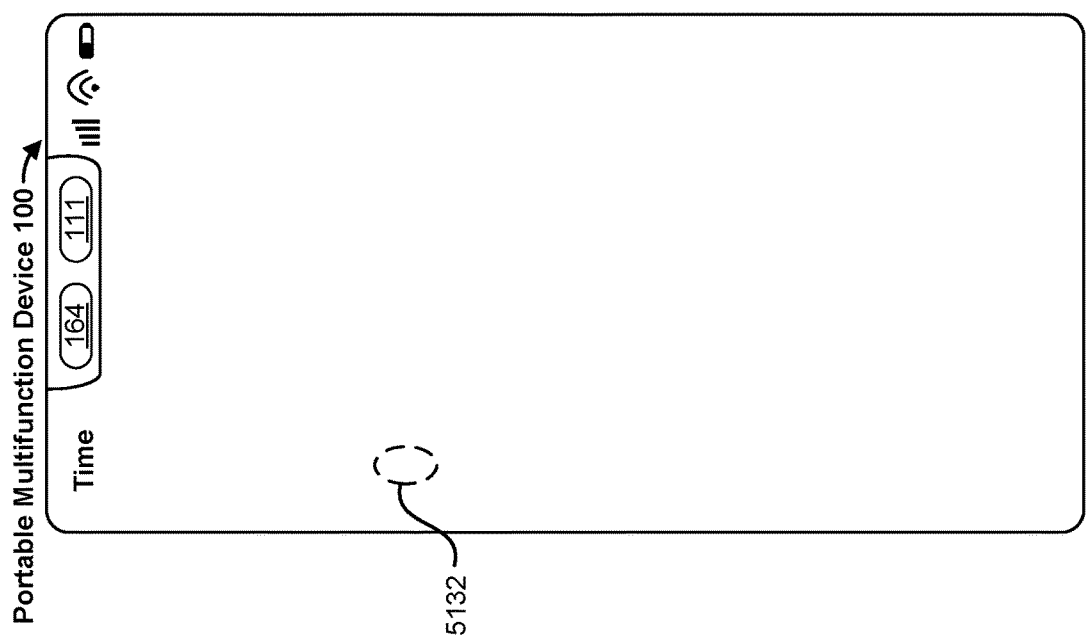

FIG. 5Y shows multifunction device 100 rotating in accordance with arrow 588 (e.g., rotating from a portrait orientation to a landscape orientation). FIG. 5Z shows user input 590 (e.g., a light press input) at an edge of multifunction device 100 (e.g., a top edge of multifunction device 100) corresponding to input location 506. FIG. 5Z shows multifunction device 100 not displaying volume control element 510 in response to user input 590 (e.g., multifunction device 100 forgoes responding to user input 590 in accordance with multifunction device 100 being in a landscape orientation). In some embodiments, multifunction device 100 is configured (e.g., programmed) to forgo responding to user inputs (or to particular types of user inputs) applied to a top edge of the device. In some embodiments, a portion of the top edge of the device is not responsive to user inputs (e.g., a middle portion). In some embodiments, corner portions of the top edge of the device are responsive to user inputs.

FIG. 5AA shows user input 591 (e.g., a light press input) at an edge of multifunction device 100 (e.g., a right edge of multifunction device 100) corresponding to input location 589. FIG. 5AB illustrates a transition from FIG. 5AA. FIG. 5AB shows multifunction device 100 displaying volume control element 510 at display location 510-e in response to user input 591. Display location 510-e in FIG. 5AB is adjacent to input location 589 in FIG. 5AA. As shown in FIGS. 5Y-5Z and 5AA-5AB, user inputs 590 and 591 are at two different edges of multifunction device 100 (e.g., input locations 506 and 589) and volume control element 510 is displayed in response to a touch on one edge (e.g., the right edge) and is not displayed in response to a touch on the other edge (e.g., the top edge).

FIG. 5AC shows multifunction device 100 with input location indicators 592 and 594 on touch screen 112. For example, input location indicator 592 corresponds to input location 506 and input location indicator 594 corresponds to input location 568. In some embodiments, input location indicator 592 and/or 594 have more illumination than surrounding areas. In some embodiments, input location indicator 592 has a different color, pattern, and/or luminosity than input location indicator 594. FIG. 5AC also shows user input 596 (e.g., a light press input) at an edge of multifunction device 100 (e.g., a left edge of multifunction device 100) corresponding to input location indicator 592. User input 596 has corresponding duration 598 that is less than duration threshold 599. FIG. 5AD shows multifunction device 100 not displaying volume control element 510 in response to user input 596 (e.g., multifunction device 100 forgoes responding to user input 596). In some embodiments, multifunction device 100 is configured (e.g., programmed) to forgo responding to user inputs that have a touch duration that is less than a threshold duration (e.g., less than 2 seconds, 1 second, ½ second, ¼ second, ⅛ second, or other time duration). FIG. 5AD shows multifunction device 100 displaying input location indicators 592 and 594 (e.g., multifunction device 100 continues to display input location indicators in accordance with user input 596 having a duration less than duration threshold 599). In some embodiments, input location indicator 592 corresponds to a volume function and/or a media playback function of multifunction device 100 and input location indicator 594 corresponds to a camera function and/or a brightness function of multifunction device 100.

FIG. 5AE shows multifunction device 100 with input location indicators 592 and 594 on touch screen 112. FIG. 5AE further shows user input 5100 (e.g., a light press input) at an edge of multifunction device 100 corresponding to input location indicator 592. User input 5100 has corresponding duration 5102 that is greater than duration threshold 599. FIG. 5AF illustrates a transition from FIG. 5AE. FIG. 5AF shows multifunction device 100 displaying volume control element 510 at display location 510-a in response to user input 5100. Display location 510-a of volume control element 510 in FIG. 5AF is adjacent to input location indicator 592 in FIG. 5AE.

FIG. 5AG shows multifunction device 100 displaying a media playback interface 5108 on touch screen 112. FIG. 5AG further shows user input 5106 (e.g., a light press input) at an edge of multifunction device 100 (e.g., a left edge) corresponding to input location 506. FIG. 5AH illustrates a transition from FIG. 5AG. FIG. 5AH shows multifunction device 100 with volume control element 510 displayed at display location 510-a on touch screen 112. Volume control element 510 in FIG. 5AH is displayed in response to user input 5106 in FIG. 5AG. Display location 510-a in FIG. 5AH is adjacent to input location 506 in FIG. 5AG.

FIG. 5AI shows multifunction device 100 displaying a device lock indicator 5112 on touch screen 112. FIG. 5AI further shows user input 5114 (e.g., a light press input) at an edge of multifunction device 100 (e.g., a left edge) corresponding to input location 506. FIG. 5AJ illustrates a transition from FIG. 5AL. FIG. 5AJ shows multifunction device 100 with unlock element 5116 displayed on touch screen 112. Unlock element 5116 in FIG. 5AJ is displayed in response to user input 5114 in FIG. 5AL. In some embodiments, a display position of unlock element 5116 corresponds to input location 506. In some embodiments, the display position of unlock element 5116 is independent of input location 506 (e.g., the display position is fixed and/or based on user preferences). As shown in FIGS. 5AG-5AJ, a state of multifunction device 100 (e.g., an active application) can affect the response to a user input. For example, user input 5106 is detected while a media playback application is active and causes volume control element 510 to be displayed. In this example, user input 5114 is detected while the device is in a locked state and causes unlock element 5116 to be displayed.

FIG. 5AK shows user input 5120 at an edge (e.g., the left edge) of multifunction device 100 corresponding to input location 506. User input 5120 in FIG. 5AK has a corresponding intensity 5122 that is below intensity threshold $IT_L$. FIG. 5AL illustrates a transition from FIG. 5AK. FIG. 5AL shows multifunction device 100 with volume element 5124 displayed on touch screen 112. Volume element 5124 in FIG. 5AL is displayed in response to user input 5120 in FIG. 5AK detected with an intensity below $IT_L$. The display location of volume element 5124 in FIG. 5AL is adjacent to input location 506 in FIG. 5AK. In the example of FIG. 5AL, volume element 5124 is non-interactive (e.g., the user cannot adjust the volume by interacting with volume element 5124).

FIG. 5AM shows user input 5120 continuing at the edge of multifunction device 100 at input location 506 and display of volume element 5124 on touch screen 112. User input 5120 in FIG. 5AM has a corresponding intensity 5130 that is above intensity threshold $IT_L$. FIG. 5AN illustrates a transition from FIG. 5AM. FIG. 5AN shows multifunction device 100 with volume control element 510 displayed on touch screen 112 (in place of volume element 5124). Volume control element 510 in FIG. 5AN is displayed in response to user input 5120 in FIG. 5AM detected with an intensity above $IT_L$. The display location of volume control element 510 in FIG. 5AN is adjacent to input location 506 in FIG. 5AM. In accordance with some embodiments, volume control element 510 is interactive (e.g., causes changes to output volume in response to user inputs). In some embodiments, volume control element 510 includes one or more components not included in volume element 5124, such as volume slider element 542. As shown in FIGS. 5AK-5AN, a user input having an intensity below an intensity threshold can cause partial display of a user element (e.g., volume element 5124 represents a partial display of volume control element 510). If the user input increases in intensity such that the intensity is above the intensity threshold, more of the user element can be displayed (e.g., volume control element 510). In some embodiments, when the intensity of a user input is above a threshold, a larger user interface element is displayed than when the intensity of the user input being below the threshold (e.g., a magnification of the user interface element is increased). In some embodiments, one or more components of the user interface element are displayed when the intensity of the user input is above an intensity threshold and are not displayed when the intensity of the user input is below the intensity threshold.

FIG. 5AO shows user input 5132 (e.g., a light press input) at a front surface of multifunction device 100 (e.g., on touch screen 112). FIG. 5AP illustrates a transition from FIG. 5AO. FIG. 5AP shows multifunction device 100 with volume control element 5134 displayed on touch screen 112. Volume control element 5134 in FIG. 5AP is displayed in response to user input 5132 in FIG. 5AO. The display location of volume control element 5134 in FIG. 5AP is the same location as the input location of user input 5132 in FIG. 5AO. In some embodiments, user input 5132 activates a displayed volume icon (e.g., displayed on a home screen and/or control interface). As shown in FIGS. 5A-5B and 5AO-5AP, a user input at an edge of the device (e.g., user input 502) can cause display of a different user interface element than a user input on a front surface of the device (e.g., user input 5132). In some embodiments, volume control element 5134 includes a subset or superset of the components of volume control element 510 (e.g., does not include volume slider element 542).

In some embodiments, one or more of the user inputs described above with reference to FIGS. 5A-5AP (e.g., user inputs 502, 514, 522, 530, 535, 537, 539, 541, 544, 550, 554, 558, 566, 574, 580, 584, 590, 591, 596, 5100, 5106, 5114, 5120, and 5132) are detected via one or more intensity-sensitive surfaces or regions that include one or more intensity sensors (e.g., one or more contact intensity sensors 165, sometimes called force sensors or force pixels), via one or more capacitive sensors, and/or via one or more other types of input sensors. The one or more intensity sensors may be configured to measure an amount of force associated with a user input. For example, one or more of the user inputs described above may be detected only using data from one or more force sensors.

Figure 6A:
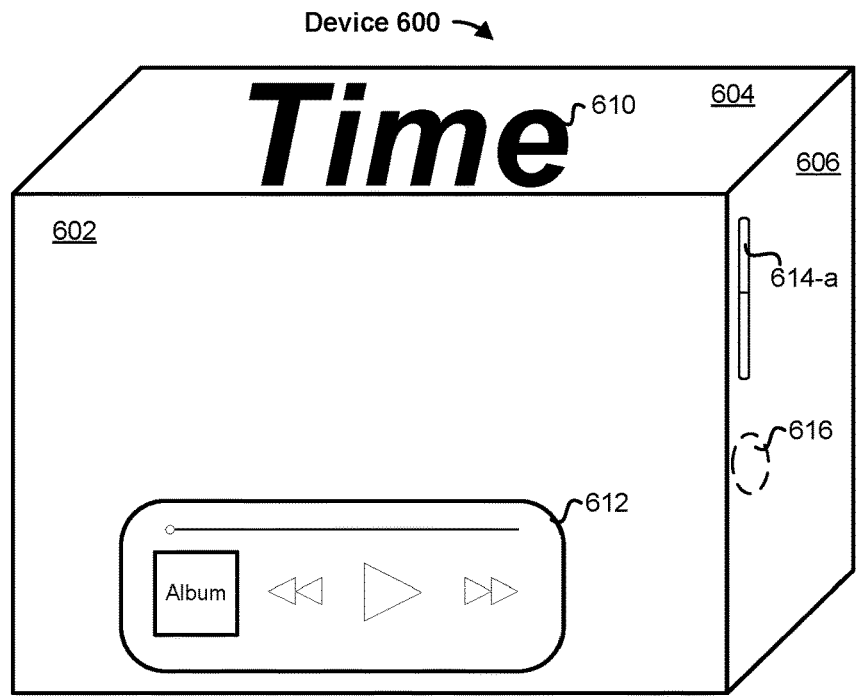
FIGS. 6A-6T illustrate example user interfaces and user interactions for a device in accordance with some embodiments.
Figure 6B:
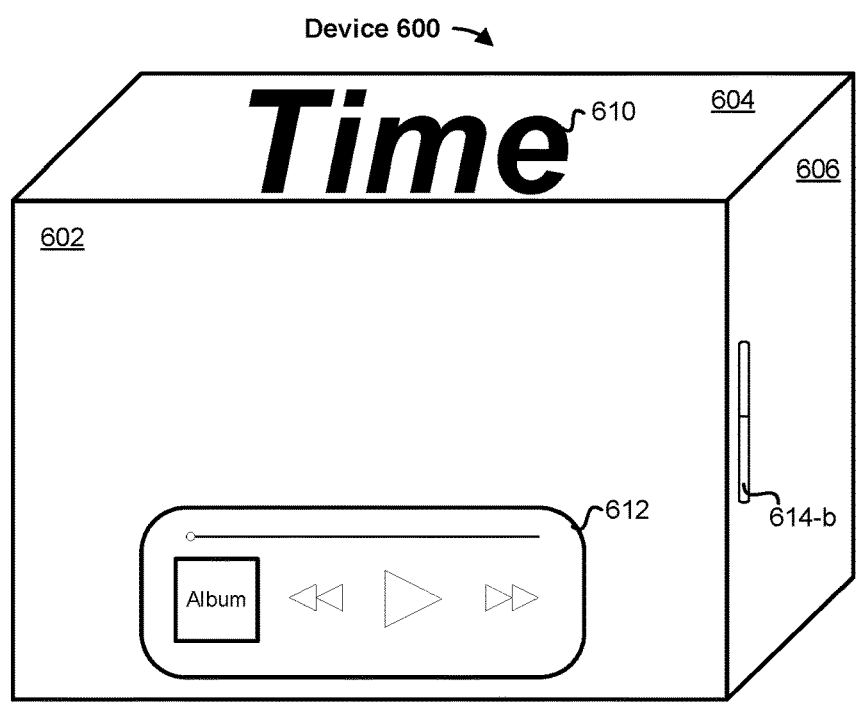
Figure 6C:
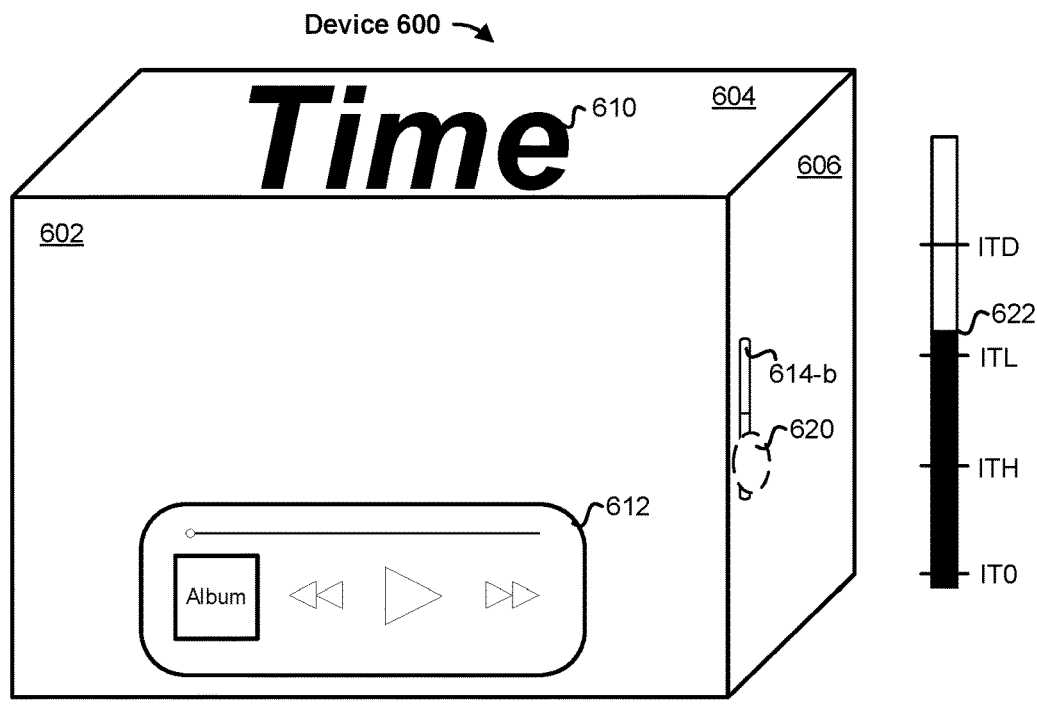
Figure 6D:
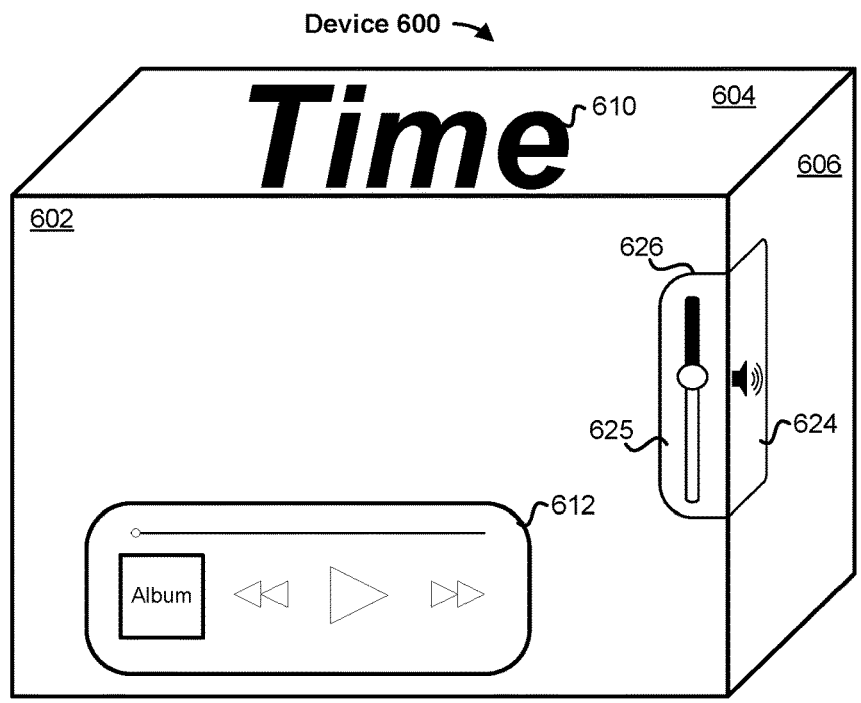
Figure 6E:
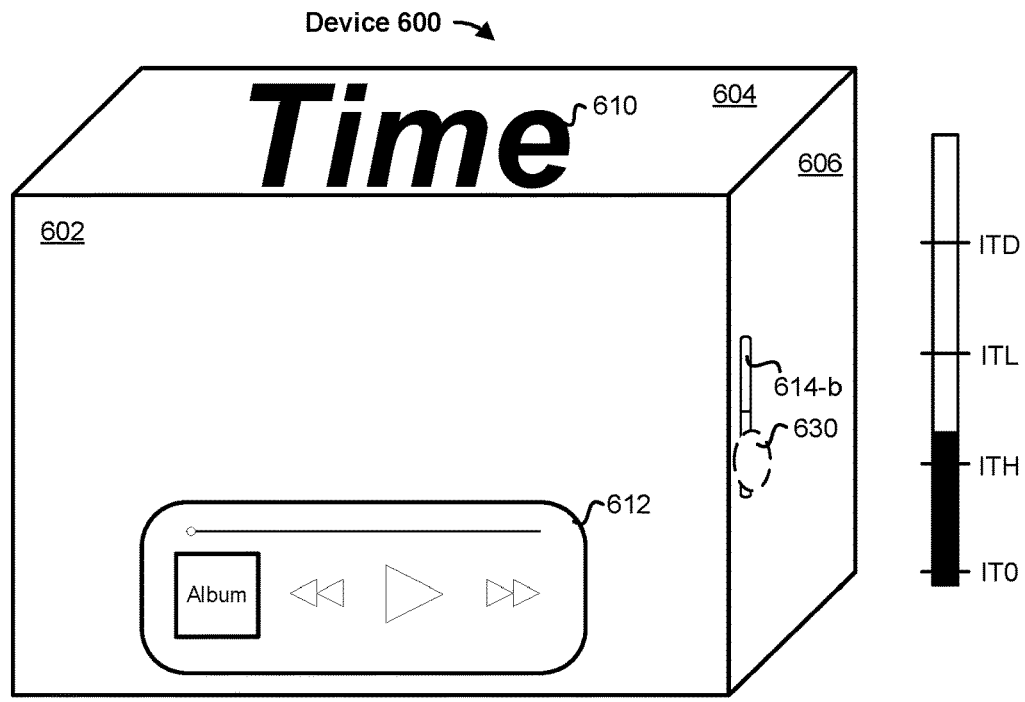
Figure 6F:
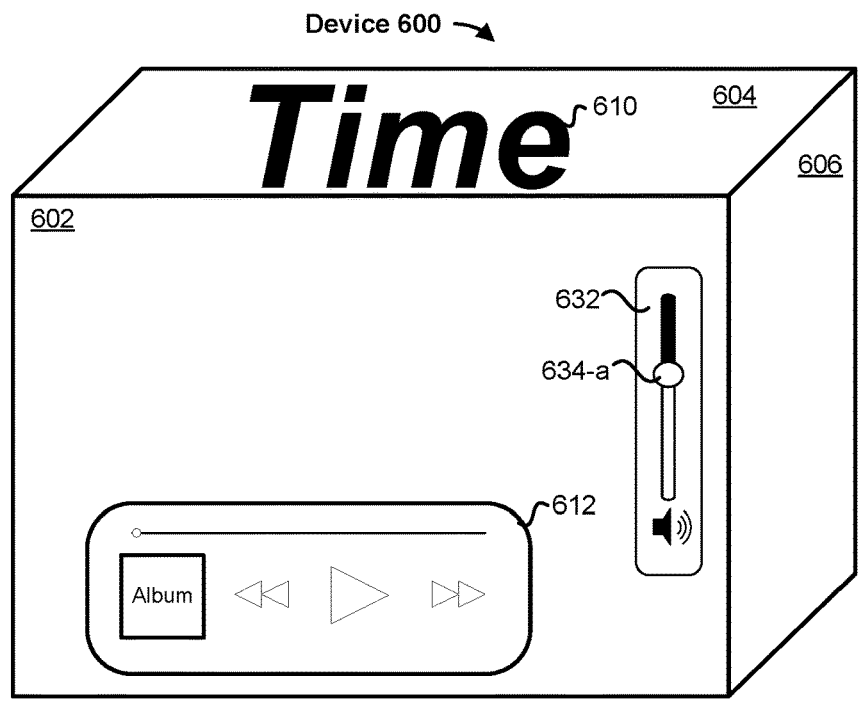
Figure 6G:
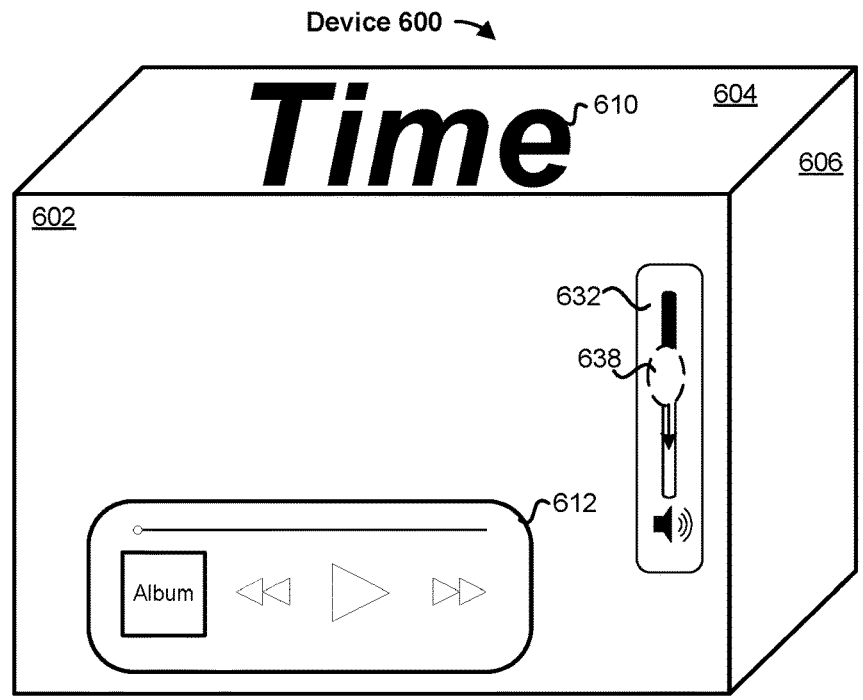
Figure 6H:
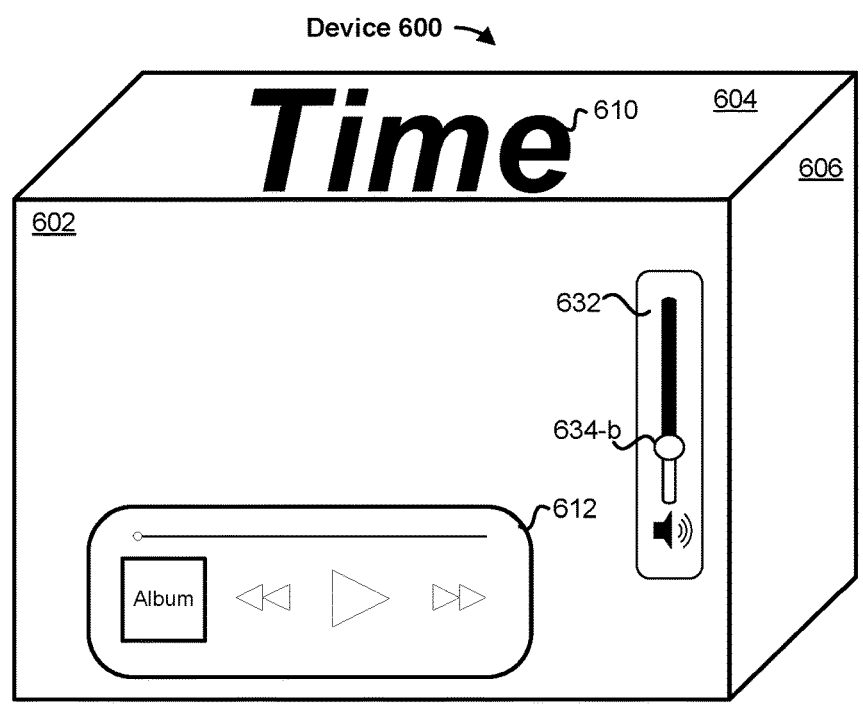
Figure 6I:
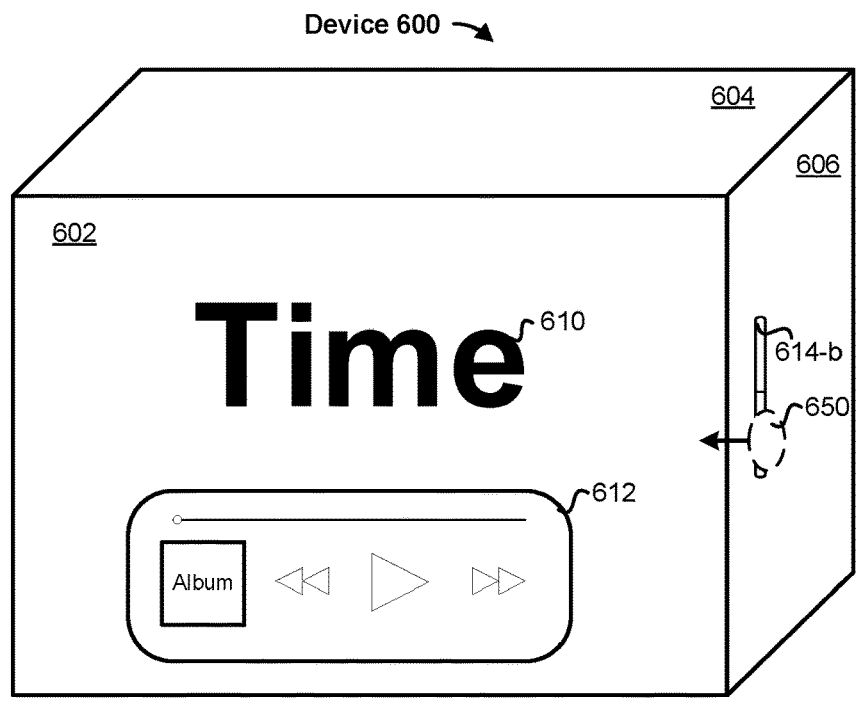
Figure 6J:
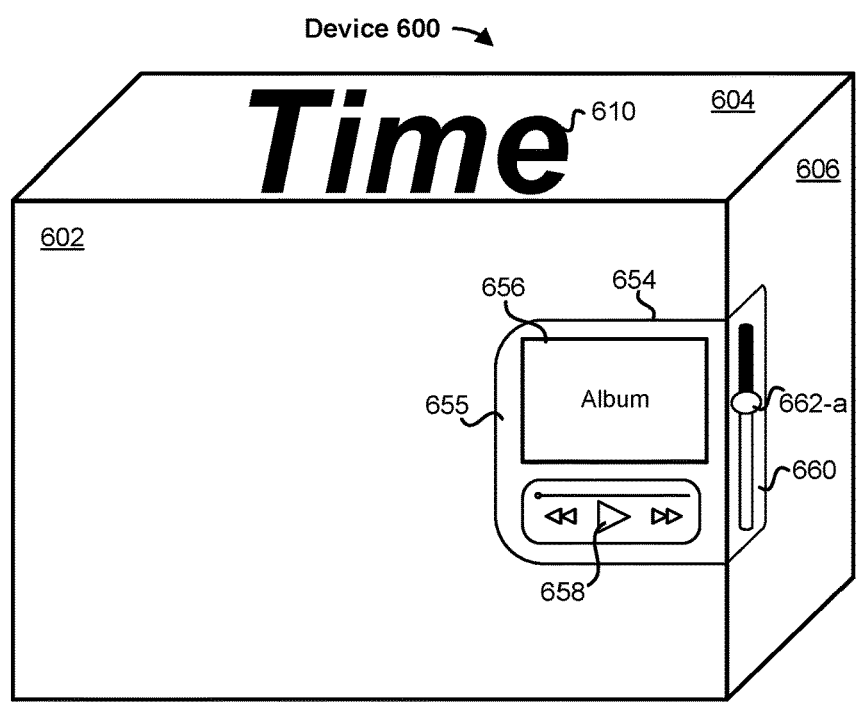
Figure 6K:
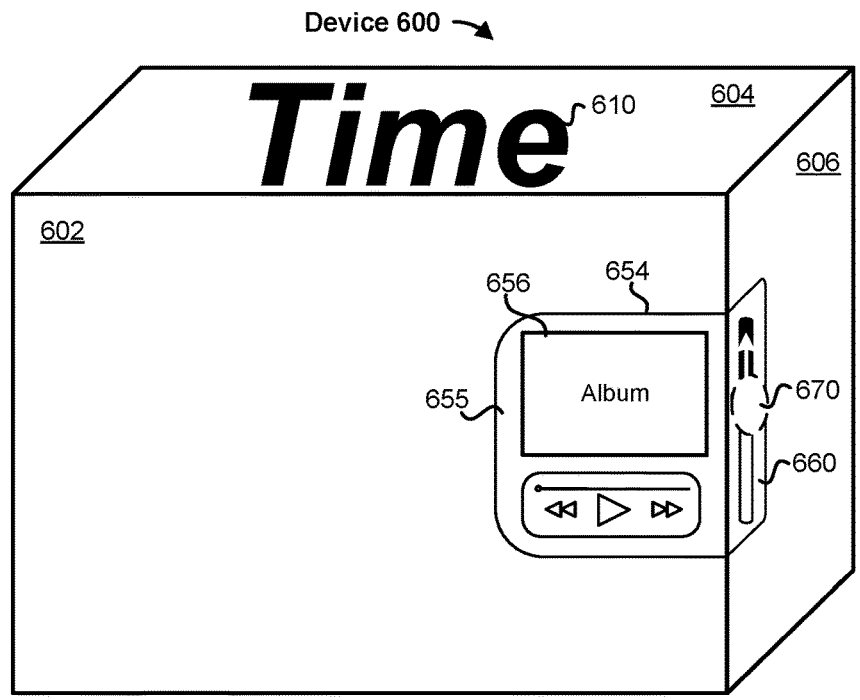
Figure 6L:
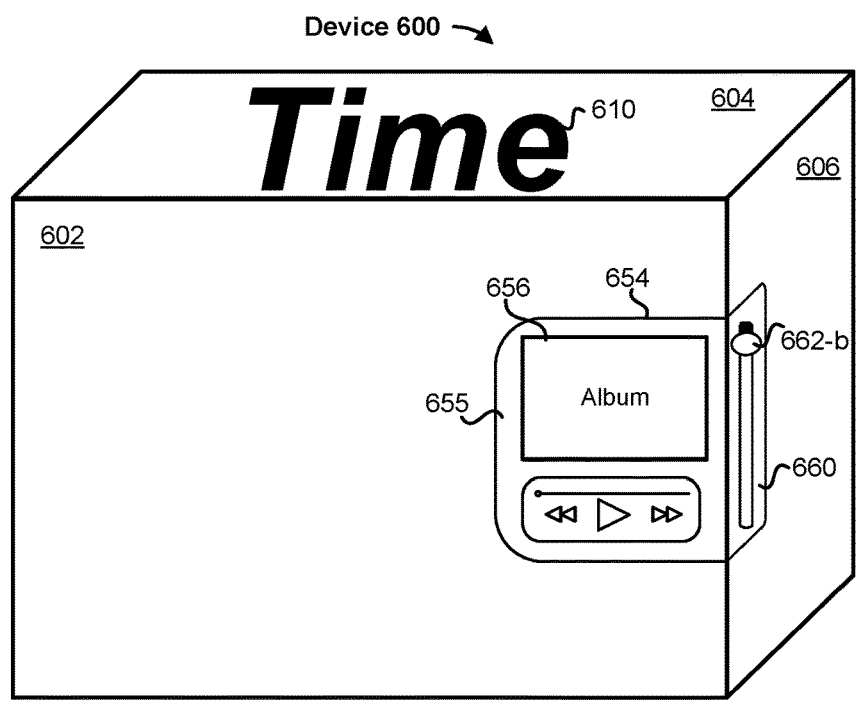
Figure 6M:
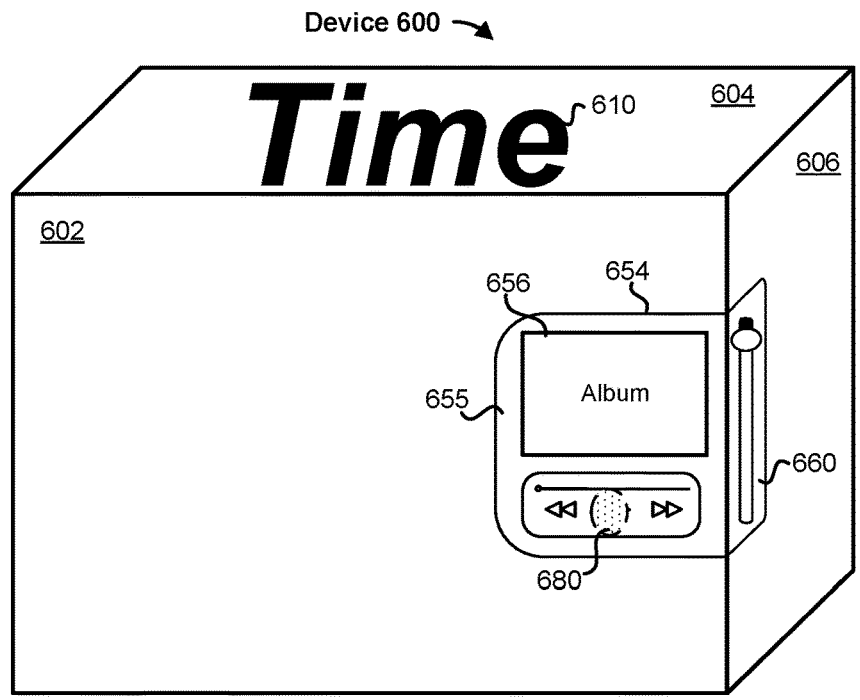
Figure 6N:
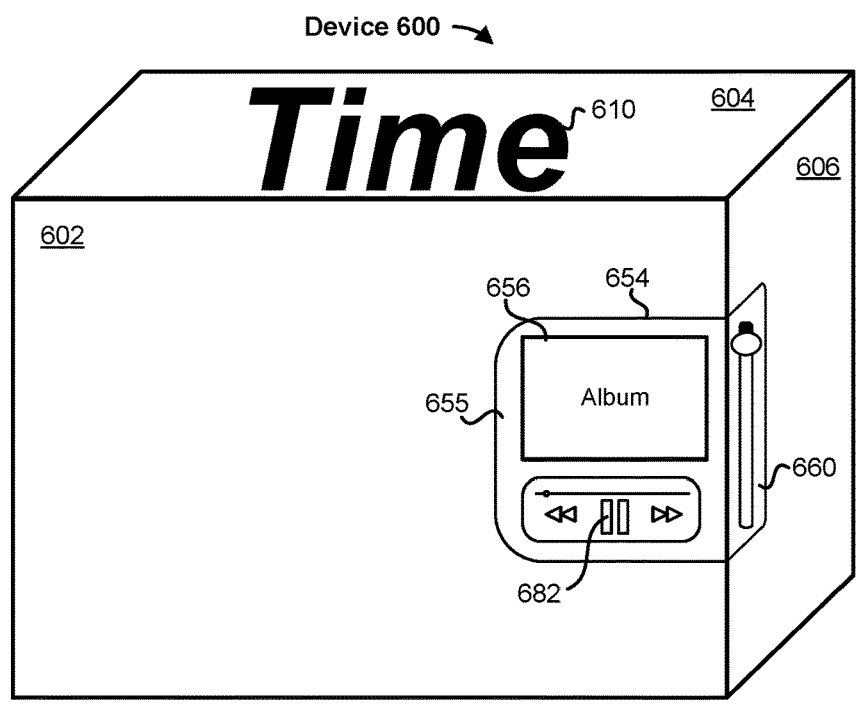
Figure 6O:
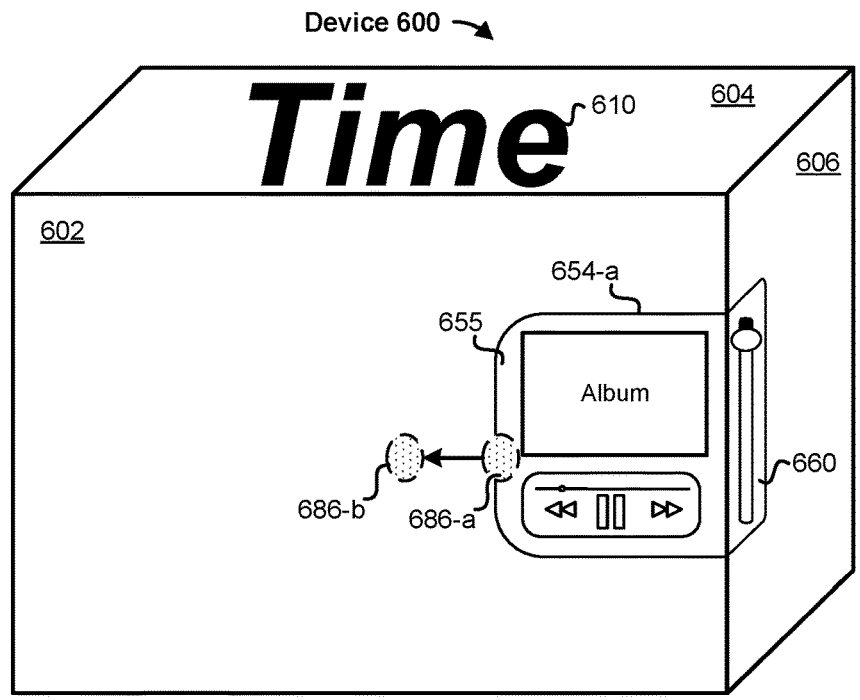
Figure 6P:
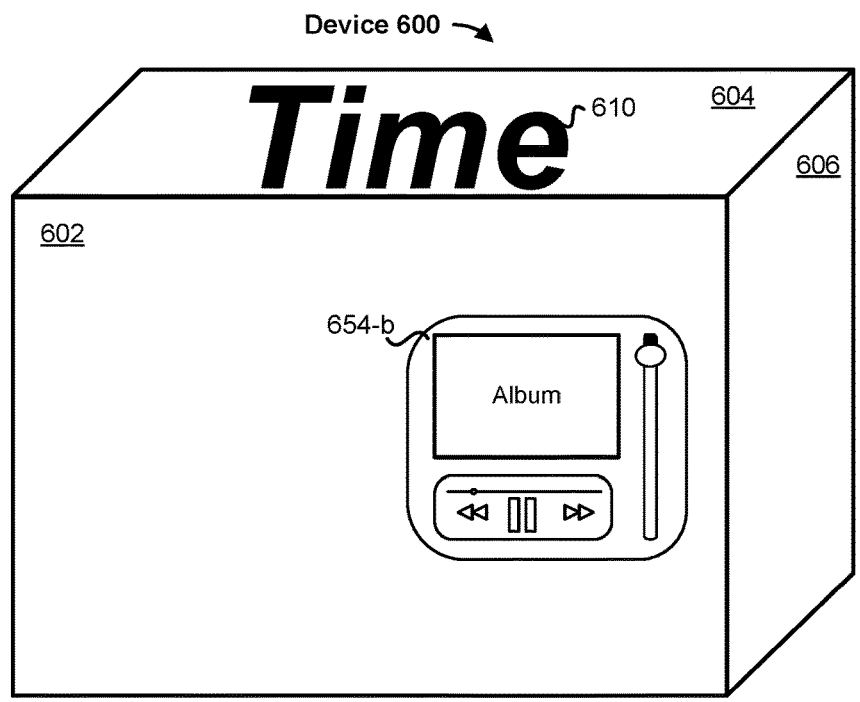
Figure 6Q:
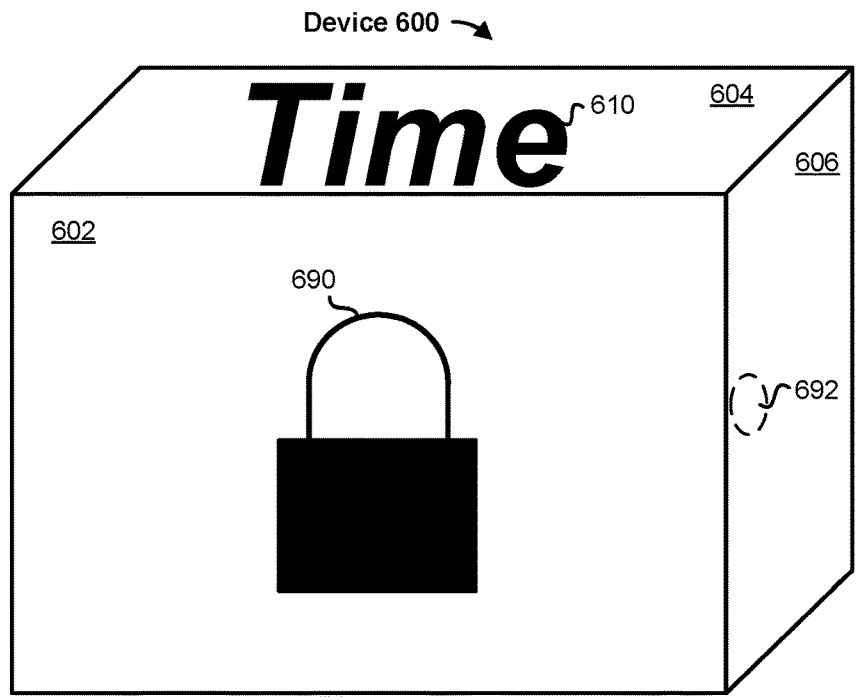
Figure 6R:
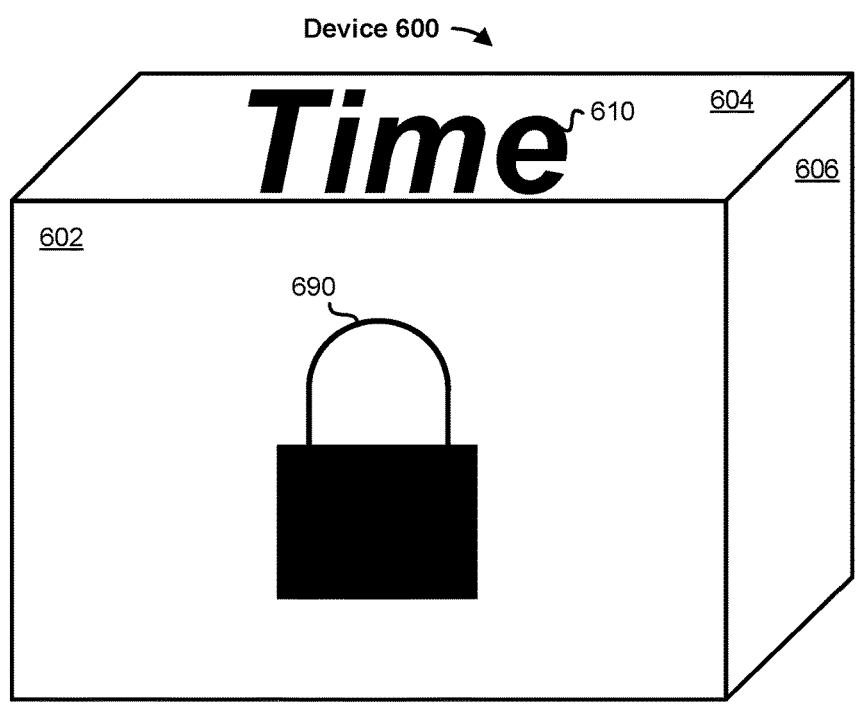
Figure 6S:
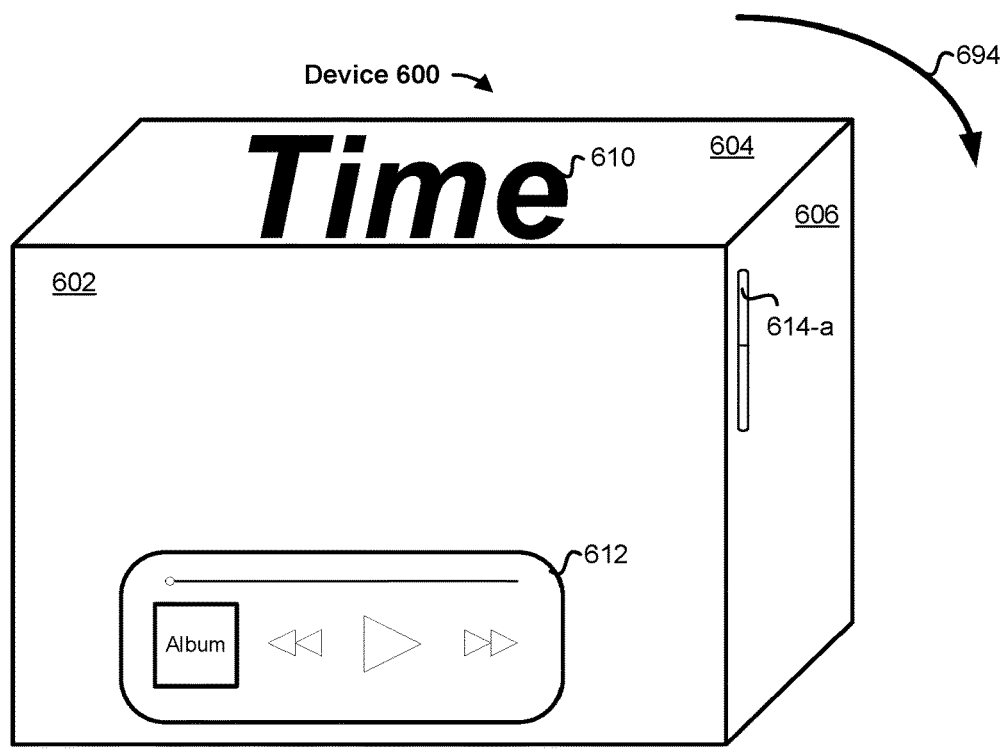
Figure 6T:
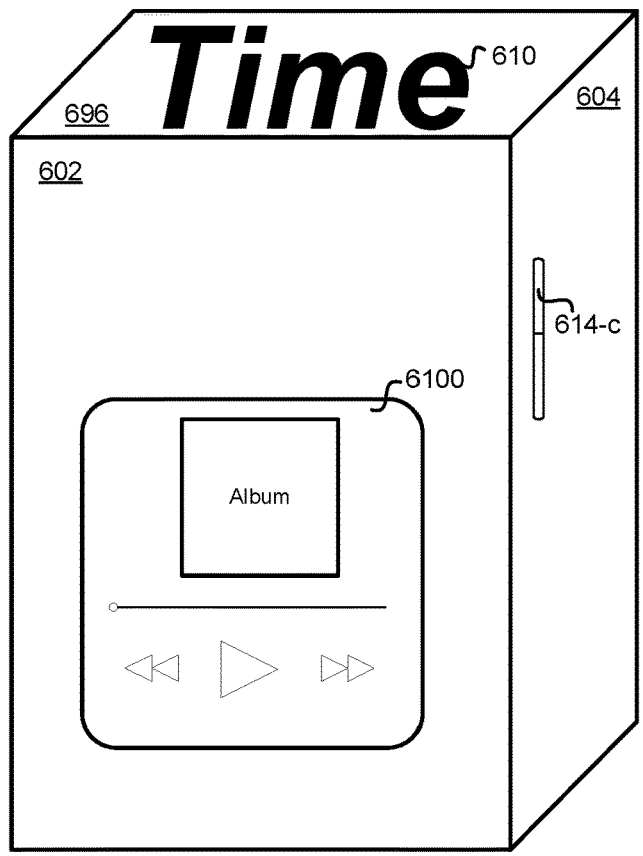

FIGS. 6A-6T illustrate example user interfaces and user interactions for a device in accordance with some embodiments. FIG. 6A shows device 600 (e.g., an instance of multifunction device 100) that includes displays 602, 604, and 606. In some embodiments, device 600 has at least a portion of the functionality described previously with respect to multifunction device 100. In some embodiments, one or more of displays 602, 604, and 606 is a touch screen. In some embodiments, device 600 includes a display on each side. In some embodiments, device 600 includes a display on five sides (e.g., each side except a bottom side). Display 602 in FIG. 6A includes display of media playback element 612. Display 604 in FIG. 6A includes display of time element 610. Display 606 in FIG. 6A includes display of volume control element 614 displayed at display location 614-*a*. FIG. 6A also shows user input 616 at display 606 (e.g., at a location different than display location 614-*a*).

FIG. 6B illustrates a transition from FIG. 6A. FIG. 6B shows device 600 with volume control element 614 displayed at display location 614-*b* on display 606. Volume control element 614 in FIG. 6B is displayed in response to user input 616 in FIG. 6A. Display location 614-*b* in FIG. 6B is a same location as the location of user input 616 in FIG. 6A (e.g., volume control element 614 moves to a location of a user input on display 606). In some embodiments, display location 614-*b* has a vertical position and/or horizontal position that corresponds to a vertical position and/or horizontal position of user input 616. In some embodiments, the display location has a vertical position that corresponds to the vertical position of user input 616; and has a default or preset horizontal position (e.g., the display location is preset to be 5 mm, 10 mm, or other distance from the edge of the display or the device).

FIG. 6C shows user input 620 (e.g., a touch input and/or intensity input) at a location corresponding to volume control element 614 (e.g., at display location 614-*b*). User input 620 has corresponding intensity 622 that is greater than light press threshold $IT_L$. FIG. 6D illustrates a transition from FIG. 6C. FIG. 6D shows device 600 with volume control element 626 displayed on displays 602 and 606. Volume control element 626 in FIG. 6D is displayed in response to user input 620 in FIG. 6C. Volume control element 626 includes a portion 624 on display 606 and a portion 625 on display 602. In accordance with some embodiments, a display location of portion 624 on display 606 corresponds to an input location of user input 620 and/or a display location of volume control element 614.

FIG. 6E shows user input 630 (e.g., a touch input and/or intensity input) at a location corresponding to volume control element 614 (e.g., at display location 614-*b*). User input 630 has corresponding intensity 622 that is less than light press threshold $IT_L$ and greater than contact-detection threshold $IT_0$. FIG. 6F illustrates a transition from FIG. 6E. FIG. 6F shows device 600 with volume control element 632 displayed on display 602. Volume control element 632 in FIG. 6F is displayed in response to user input 630 in FIG. 6E. In accordance with some embodiments, a display location of volume control element 632 corresponds to an input location of user input 630 and/or a display location of volume control element 614. Volume control element 632 includes volume slider element 634 to adjust an output volume of device 600. In FIG. 6F, volume slider element 634 is at position 634-*a*. As shown in FIGS. 6C-6F, user inputs with different intensities cause different user elements to be displayed in accordance with some embodiments. In the example of FIGS. 6C-6F an input with a corresponding intensity above a light press threshold (e.g., user input 620) causes a first user interface element (e.g., volume control element 626) to be displayed on multiple displays and an input with a corresponding intensity below the light press threshold (e.g., user input 630) causes a second user interface element (e.g., volume control element 632) to be displayed on a single display.

FIG. 6G shows volume control element 632 displayed on display 602. FIG. 6G further shows user input 638 detected at a position corresponding to volume slider element 634 and moving downward (e.g., a swipe or drag gesture). FIG. 6H illustrates a transition from FIG. 6G. FIG. 6H shows device 600 with volume control element 632 displayed on display 602. In FIG. 6H volume control element 632 includes volume slider element 634 at position 634-*b* indicating an output volume of device 600 (e.g., a decrease in output volume in response to user input 638). User input 638 in FIG. 6G causes device 600 to decrease audio output as shown in FIG. 6H (e.g., volume slider element 634 moves in accordance with a direction and/or magnitude of movement of user input 638).

FIG. 6I shows time element 610 and media playback element 612 displayed on display 602 and volume control element 614 displayed at display location 614-*b* on display 606. FIG. 6I shows user input 650 (e.g., a swipe or drag gesture) at a location corresponding to volume control element 614 (e.g., at display location 614-*b*). User input 650 has a movement component toward display 602. FIG. 6J illustrates a transition from FIG. 6I. FIG. 6J shows device 600 with control element 654 displayed on displays 602 and 606. Control element 654 in FIG. 6J is displayed in response to user input 650 in FIG. 6I. Control element 654 includes media playback portion 655 on display 602 and volume control portion 660 on display 606. Media playback portion 655 on display 602 includes media information 656 and playback controls 658. Volume control portion 660 on display 606 includes volume slider element 662 at position 662-*a*. In accordance with some embodiments, a display location of portion 660 on display 606 corresponds to an input location of user input 650 and/or a display location of volume control element 614. In the example of FIGS. 6I-6J, display of control element 654 in response to user input 650 includes moving display of time element 610 from display 602 in FIG. 6I to display 604 in FIG. 6J. In the example of FIGS. 6I-6J, display of control element 654 includes ceasing to display media playback element 612 (e.g., display of media playback element 612 is replaced with display of media playback portion 655 of control element 654).

FIG. 6K shows control element 654 displayed with volume control portion 660 on display 606. FIG. 6K further shows user input 670 detected at a position corresponding to volume slider element 662 and moving upward (e.g., a swipe or drag gesture). FIG. 6L illustrates a transition from FIG. 6K. FIG. 6L shows control element 654 displayed with volume control portion 660 on display 606. In FIG. 6L volume control portion 660 includes volume slider element 662 at position 662-*b* indicating an output volume of device 600 (e.g., an increase in output volume in response to user input 670). User input 670 in FIG. 6K causes device 600 to increase audio output as shown in FIG. 6L (e.g., volume slider element 662 moves in accordance with a direction and/or magnitude of movement of user input 670).

FIG. 6M shows control element 654 displayed with media playback portion 655 on display 602. FIG. 6M further shows user input 680 detected at a position corresponding to a play button of playback controls 658 (e.g., a tap or light press gesture). FIG. 6N illustrates a transition from FIG. 6M. FIG. 6N shows control element 654 displayed with media playback portion 655 on display 602. In FIG. 6N media playback portion 655 includes pause control 682 indicating media is playing back at device 600. User input 680 in FIG. 6M causes device 600 to playback media as indicated in FIG. 6N.

FIG. 6O shows control element 654 displayed at position 654-*a* with media playback portion 655 on display 602 and volume control portion 660 on display 606. FIG. 6O further shows user input 686 detected at position 686-*a* corresponding to control element 654 and moving to position 686-*b* (e.g., a swipe or drag gesture). FIG. 6P illustrates a transition from FIG. 6O. FIG. 6P shows device 600 with control element 654 displayed at position 654-*b* on display 602. As shown in FIG. 6P, control element 654 at position 654-*b* is displayed only on display 602 (e.g., does not have a portion on display 606). User input 686 in FIG. 6O causes control element 654 to move from position 654-*a* in FIG. 6O to position 654-*b* in FIG. 6P (e.g., control element 654 moves in accordance with a direction and/or magnitude of movement of user input 686).

FIG. 6Q shows device 600 displaying a device lock indicator 690 on display 602 and not displaying volume control element 614 on display 606. In accordance with some embodiments, device 600 does not display volume control element 614 while in a locked state. FIG. 6Q further shows user input 692 (e.g., a light press input) at display 606. FIG. 6R shows device 600 not displaying a user interface element in response to user input 692 (e.g., device 600 forgoes responding to user input 692). In some embodiments, device 600 forgoes responding to user inputs (or particular types of user inputs) on display 606 while in a locked state.

FIG. 6S shows device 600 with display 602 (e.g., on a front side), display 604 (e.g., on a top side), and display 606 (e.g., on a right peripheral side). FIG. 6S further shows device 600 rotating in accordance with arrow 694 (e.g., rotating from a landscape orientation to a portrait orientation). FIG. 6T shows device 600 with display 602 (e.g., on a front side), display 604 (e.g., on a right peripheral side), and display 696 (e.g., on a top side). In FIG. 6T, display 602 includes display of a media playback element 6100, display 604 includes display of volume control element 614 displayed at display location 614-c, and display 696 includes display of time element 610. In the example of FIGS. 6S-6T, the displays of the device update in accordance with rotation of the device (e.g., so that the time element is always on a top side and the volume control element is always on a right peripheral side).

The dimensions of device 600 in FIGS. 6A-6T are merely an example, and one of ordinary skill in the art will recognize that device 600 can have other shapes, dimensions, and/or form factors. For example, device 600 may have a shape, dimensions, and/or form factor similar to those of multifunction device 100, device 700, or device 800. In some embodiments, device 600 has the form factor of a phone, tablet, or other portable electronic device. In some embodiments, device 600 is a wearable device, such as a smartwatch, wristband, or other wearable. In some embodiments, device 600 has one or more curved edges and/or corners, such as shown and described below with respect to devices 700 and 800. In some embodiments, device 600 has a display that extends from a front face of the device to a rear face of the device. For example, device 600 includes a curved edge, and a front display (e.g., display 602) extends across at least a portion of the curved edge (e.g., display 606 represents a curved and/or peripheral portion of display 602 in some embodiments).

In some embodiments, one or more of the user inputs described above with reference to FIGS. 6A-6T (e.g., user inputs 616, 620, 630, 638, 650, 670, 680, 686, and 692) are detected via one or more intensity-sensitive surfaces or regions that include one or more intensity sensors (e.g., one or more contact intensity sensors 165), via one or more capacitive sensors, and/or via one or more other types of input sensors.

Figure 7A:
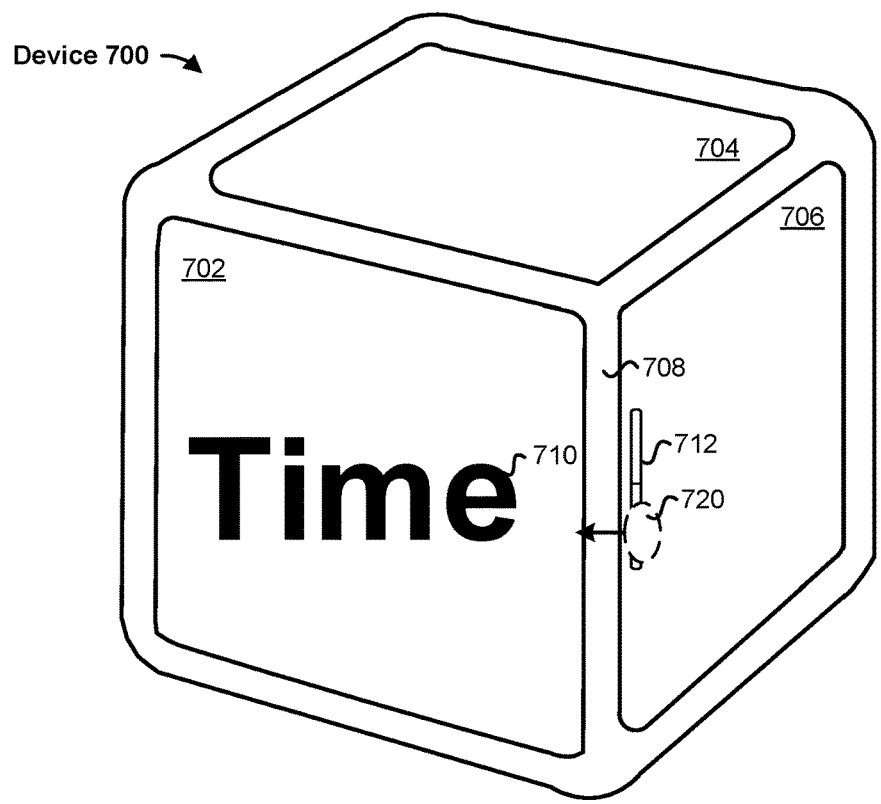
FIGS. 7A-7B illustrate example user interfaces and user interactions for a device in accordance with some embodiments.
Figure 7B:
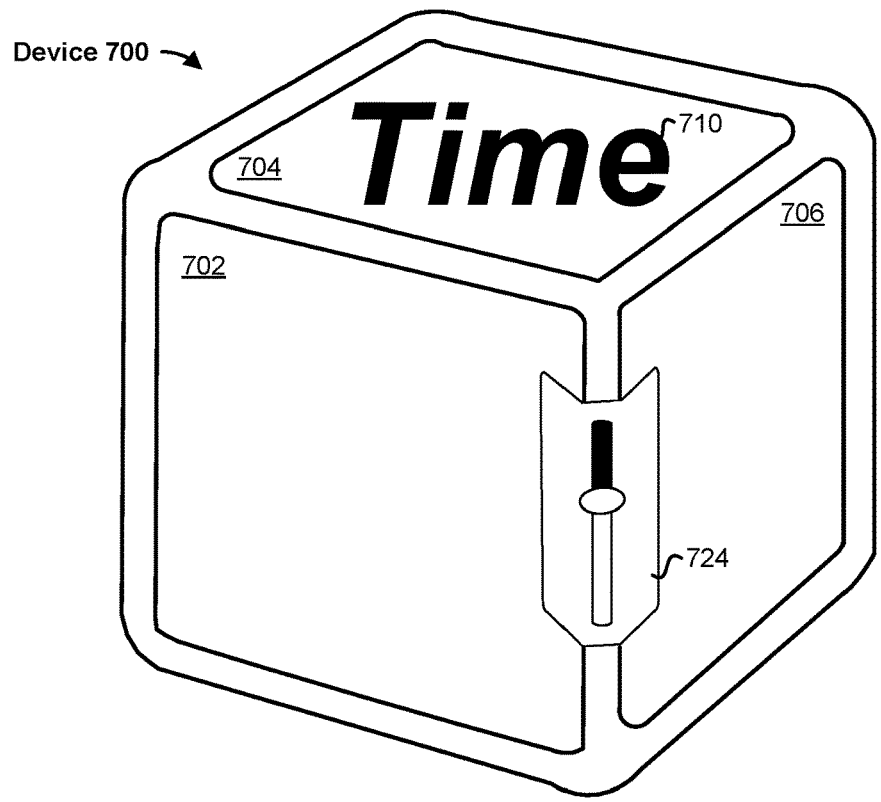

FIGS. 7A-7B illustrate example user interfaces and user interactions for a device in accordance with some embodiments. FIG. 7A shows device 700 (e.g., an instance of multifunction device 100) that includes displays 702, 704, and 706. In some embodiments, device 700 has at least a portion of the functionality described previously with respect to multifunction device 100 and/or device 600. In some embodiments, one or more of displays 702, 704, and 706 is a touch screen. In some embodiments, device 700 includes a display on each side. In some embodiments, device 700 includes a display on five sides (e.g., each side except a bottom side). In some embodiments, device 700 includes curved edge portions, such as curved edge portion 708. In some embodiments, one or more of the curved edge portions includes a display (e.g., a touch-sensitive display or a touch-insensitive display). In some embodiments, two or more of displays 702, 704, and 706 are portions of a single continuous display that extends across one or more curved edge portions. Display 702 in FIG. 7A includes display of time element 710 and display 706 in FIG. 7A includes display of volume control element 712. FIG. 7A also shows user input 720 (e.g., a swipe or drag gesture) at a location corresponding to volume control element 712 on display 706. User input 720 has a movement component toward display 702 (e.g., user input 720 includes movement into curved edge portion 708).

FIG. 7B illustrates a transition from FIG. 7A. FIG. 7B shows device 700 with volume control element 724 displayed on displays 702, 706, and a portion of curved edge portion 708. Volume control element 724 in FIG. 7B is displayed in response to user input 720 in FIG. 7A. In accordance with some embodiments, a display location of volume control element 724 corresponds to an input location of user input 720 and/or a display location of volume control element 712. In the example of FIGS. 7A-7B, display of volume control element 724 in response to user input 720 includes moving display of time element 710 from display 702 in FIG. 7A to display 704 in FIG. 7B. In the example of FIGS. 7A-7B, display of volume control element 724 includes ceasing to display volume control element 712 (e.g., display of volume control element 712 is replaced with display of volume control element 724).

The dimensions of device 700 in FIGS. 7A-7B are merely an example, and one of ordinary skill in the art will recognize that device 700 can have other shapes, dimensions, and/or form factors. For example, device 700 may have a shape, dimensions, and/or form factor similar to those of multifunction device 100 or device 800. In some embodiments, device 700 has the form factor of a phone, tablet, or other portable electronic device. In some embodiments, device 700 is a wearable device, such as a smartwatch, wristband, or other wearable. In some embodiments, device 700 has a display that extends from a front face of the device to a rear face of the device. In some embodiments, device 700 is a phone or tablet device, e.g., with a curved edge along a peripheral side curving from a front face of the device to a back face of the device.

In some embodiments, user input 720 described above with reference to FIGS. 7A-7B is detected via one or more intensity-sensitive surfaces or regions that include one or more intensity sensors (e.g., one or more contact intensity sensors 165), via one or more capacitive sensors, and/or via one or more other types of input sensors.

Figure 8A:
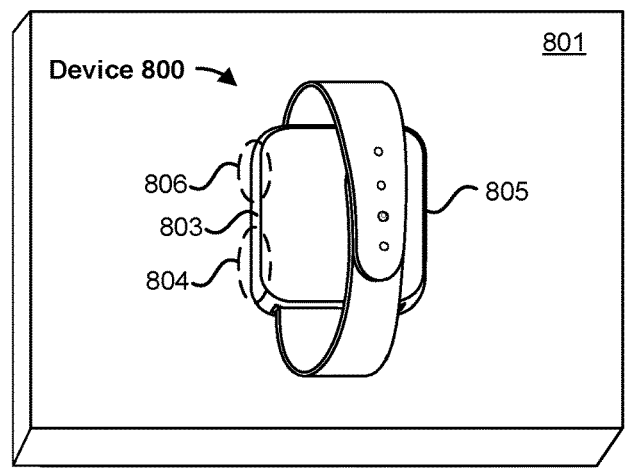
FIGS. 8A-8J illustrate example user interfaces and user interactions for a device in accordance with some embodiments.

FIGS. 8A-8J illustrate example user interfaces and user interactions for a device in accordance with some embodiments. FIG. 8A shows device 800 (e.g., a smartwatch or other wearable device) that includes edges 803 and 805. In FIG. 8A, device 800 is oriented display-side down (e.g., face down) on surface 801. In some embodiments, device 800 is instance an of multifunction device 100. In some embodiments, device 800 has at least a portion of the functionality described previously with respect to multifunction device 100. In some embodiments, one or more of edges 803 and 805 are curved edges. Edge 803 in FIG. 8A includes portion 804 and portion 806.

Figure 8B:
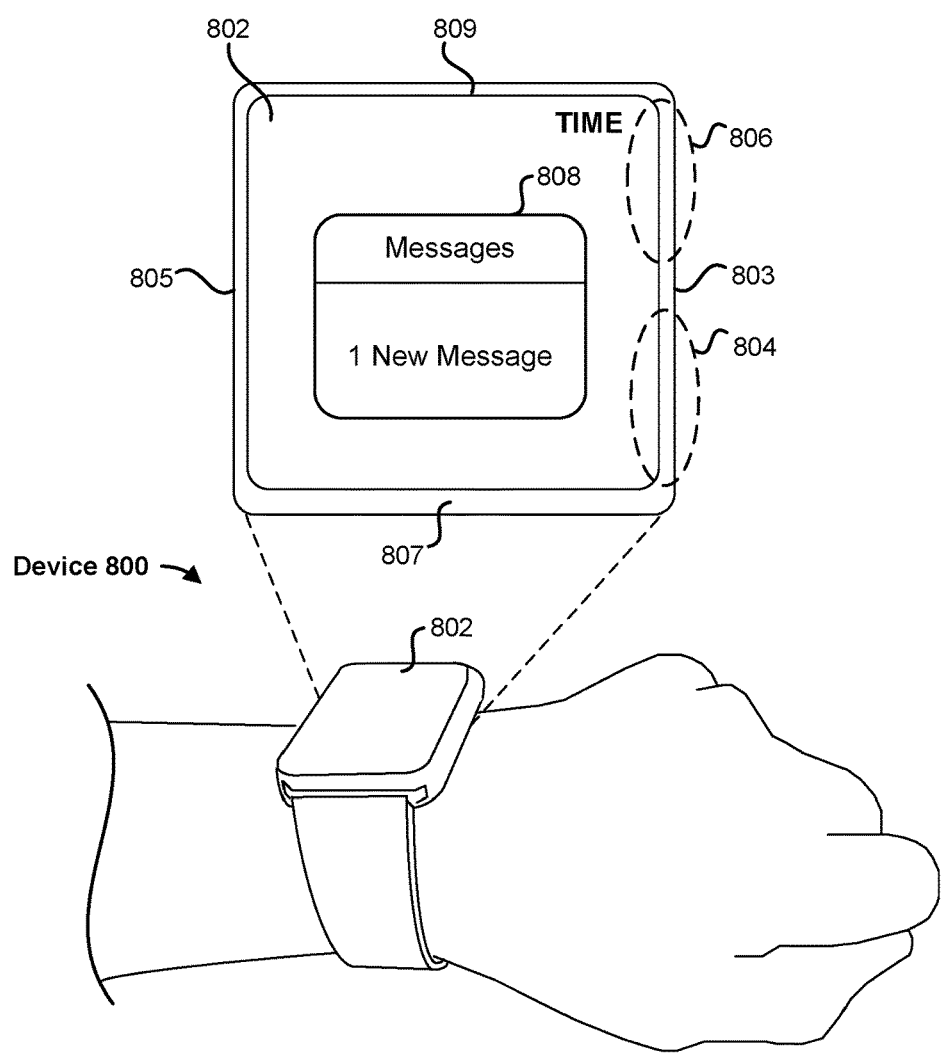

FIG. 8B shows device 800 being worn by a user in accordance with some embodiments. Device 800 in FIG. 8B includes display 802 displaying message notification 808. In some embodiments, one or more of edges 803, 805, 807, and 809 are curved edges. In some embodiments, display 802 extends to one or more of edges 803, 805, 807, and 809 (e.g., display 802 is a curved and/or waterfall display). Message notification 808 indicates that device 800 has received one incoming message (e.g., a text message, a short message service (SMS) message, or other type of message). In some embodiments, device 800 causes illumination at edge portion 804 in response to receiving an incoming message. In some embodiments, device 800 causes illumination at edge portion 804 and does not cause illumination at edge portion 806 in response to receiving the incoming message. In some embodiments, the illumination includes one or more colors and/or one or more patterns. In some embodiments, device 800 causes illumination at at least a portion of one or more of edges 805, 807, 809 in response to receiving the incoming message. In some embodiments, the illumination indicates the type of incoming message and/or the application associated with the incoming message. For example, the illumination has a first luminosity, color, and/or pattern for incoming SMS messages and a second luminosity, color, and/or pattern for incoming multimedia messaging service (MMS) messages. In some embodiments, the illumination indicates the sender of the incoming message. For example, the illumination has a first luminosity, color, and/or pattern for messages from a first sender (or type of sender) and a second luminosity, color, and/or pattern for incoming messages from a second sender (or type of sender). As a specific example, messages from someone in the user's contact list cause blue illumination and messages from someone not in the user's contact list cause yellow illumination.

Figure 8C:
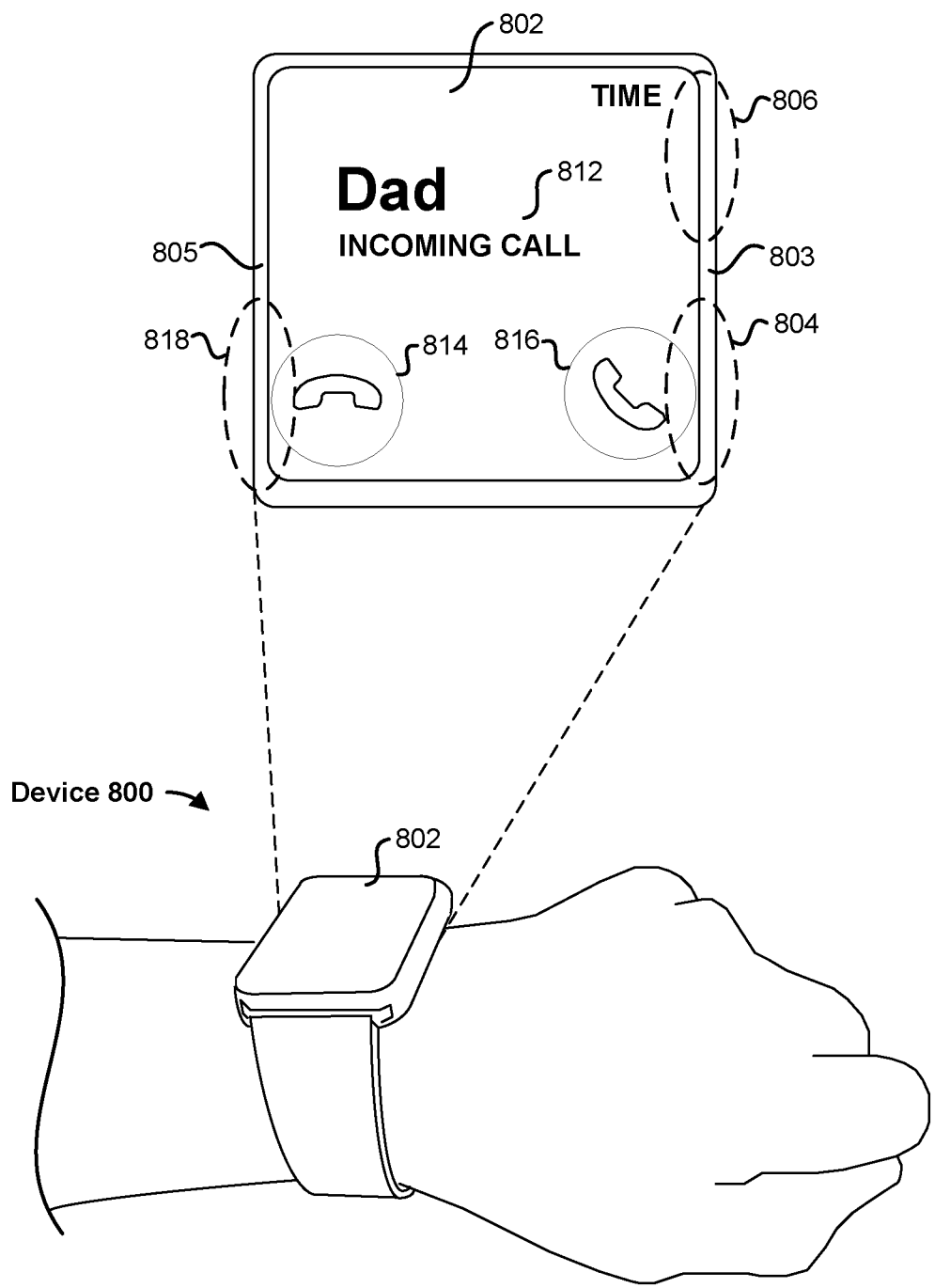

FIG. 8C shows device 800 being worn by a user in accordance with some embodiments. Device 800 in FIG. 8C includes display 802 displaying incoming call notification 812 (e.g., from a caller designated as "dad"). In some embodiments, device 800 causes illumination at edge portion 804 in response to receiving an incoming call. In some embodiments, device 800 causes illumination at edge portion 804 and does not cause illumination at edge portion 806 in response to receiving the incoming call. In some embodiments, the illumination includes one or more colors and/or one or more patterns. In some embodiments, device 800 causes illumination at portion 818 of edge 805 in response to receiving the incoming call. In some embodiments, device 800 causes illumination of at least a portion of one or more of edges 807 and 809 in response to receiving the incoming call. In some embodiments, the illumination indicates the type of incoming call and/or the application associated with the incoming call. For example, the illumination has a first luminosity, color, and/or pattern for incoming video calls and a second luminosity, color, and/or pattern for incoming audio calls. In some embodiments, the illumination indicates the identity or type of the caller. For example, the illumination has a first luminosity, color, and/or pattern for calls from a first caller and a second luminosity, color, and/or pattern for incoming calls from a second caller. As a specific example, calls from someone in the user's contact list cause blue illumination and calls from someone not in the user's contact list cause yellow illumination. In some embodiments, the illumination at portion 804 corresponds to selectable element 816 for answering the incoming call. For example, the illumination at portion 804 includes green light to indicate accepting the incoming call. In some embodiments, the illumination at portion 818 corresponds to selectable element 814 for declining the incoming call. For example, the illumination at portion 818 includes red light to indicate declining the incoming call. In some embodiments, device 800 causes non-selectable portions of edges 803, 805, 807, and/or 809 to have other types of illumination (e.g., white, blue, or other colors of light) in response to receiving the incoming call.

Figure 8D:
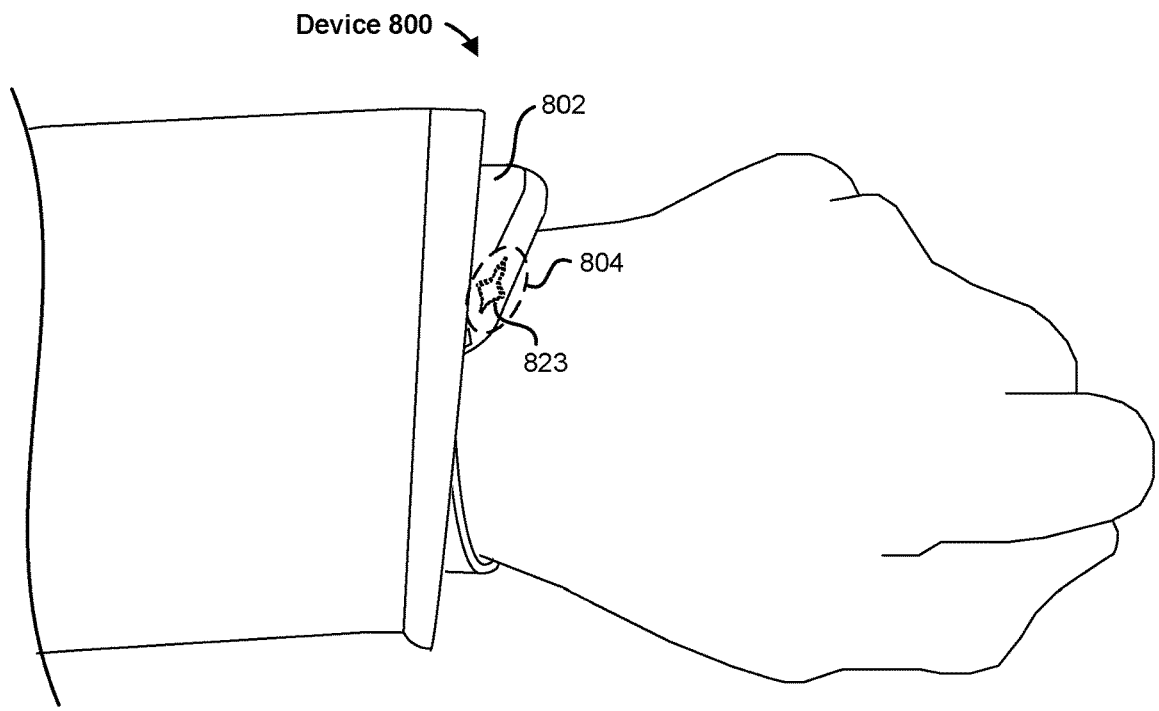

FIG. 8D shows device 800 being worn by a user with a portion of display 802 obscured by a sleeve of the user's shirt in accordance with some embodiments. Device 800 in FIG. 8D causes illumination 823 at edge portion 804 in accordance with outputting audio. For example, the output audio corresponds to a digital assistant application of device 800 giving information to, or requesting instructions, from a user of device 800. In some embodiments, device 800 causes edge illumination, such as illumination 823, in accordance with a determination that at least a portion of display 802 is obscured from a user's view. For example, a proximity sensor (e.g., an ambient light sensor) corresponding to display 802 indicates that an object is obscuring at least a portion of display 802. In some embodiments, illumination 823 is an animated illumination that changes during output of audio. In some embodiments, illumination 823 changes in accordance with one or more properties of the output audio (e.g., frequency and/or amplitude of the output audio).

Figure 8E:
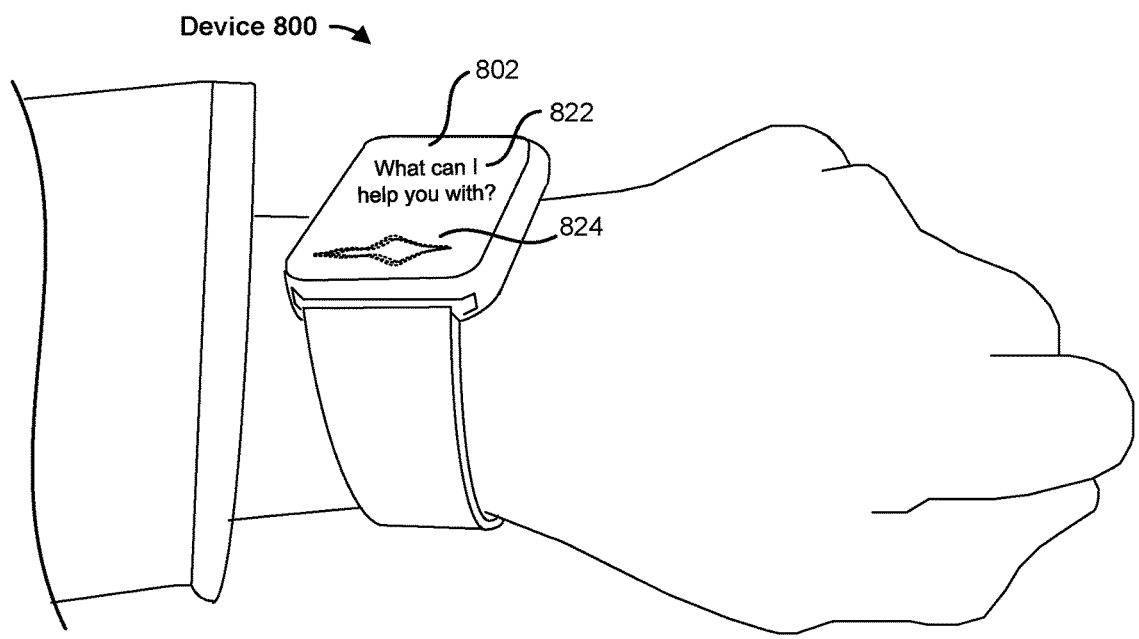

FIG. 8E shows device 800 being worn by a user with display 802 unobscured by the user's sleeve in accordance with some embodiments. Display 802 in FIG. 8E includes message 822 and illumination 824 (e.g., corresponding to the user interacting with a digital assistant application). Device 800 in FIG. 8E forgoes causing illumination at edge portion 804 while outputting audio in accordance with a determination that display 802 is unobscured. In some embodiments, device 800 causes illumination on a front side, such as illumination 824, in accordance with a determination that display 802 is unobscured. In some embodiments, illumination 824 is an animated illumination that changes in accordance with one or more properties of the output audio (e.g., frequency and/or amplitude of the output audio). In the example of FIGS. 8D-8E, a device selectively causes illumination at an edge portion in accordance with a determination that a front side of the device (e.g., display 802) is at least partly obscured. For example, in accordance with a determination that the device is display-side down on a surface (as illustrated in FIG. 8A), the device causes illumination at the edge portion, and, in accordance with a determination that the device is display-side up and unobscured (as illustrated in FIG. 8E), the device forgoes causing illumination at the edge portion.

Figure 8F:
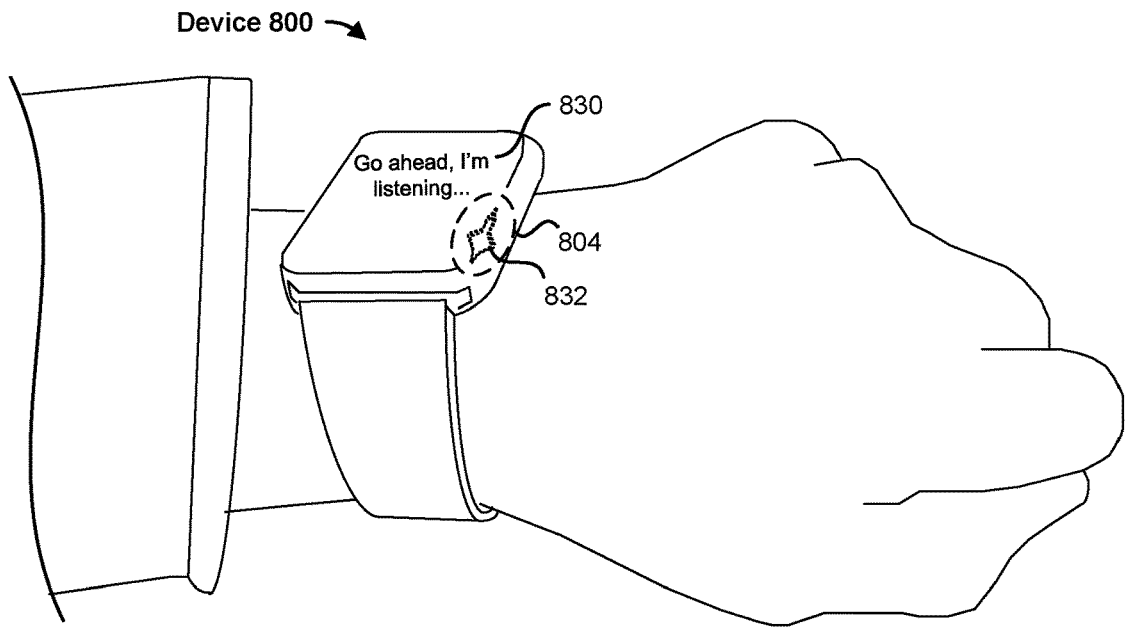

FIG. 8F shows device 800 being worn by a user with display 802 unobscured by the user's sleeve at a first time in accordance with some embodiments. Display 802 in FIG. 8F includes message 830 and illumination 832 at edge portion 804 corresponding to the user interacting with a digital assistant application. Device 800 in FIG. 8F causes illumination 832 at edge portion 804 in accordance with receiving incoming audio. For example, the received audio corresponds to a user interacting with a digital assistant application of device 800 (e.g., giving instructions and/or requesting information).

Figure 8G:
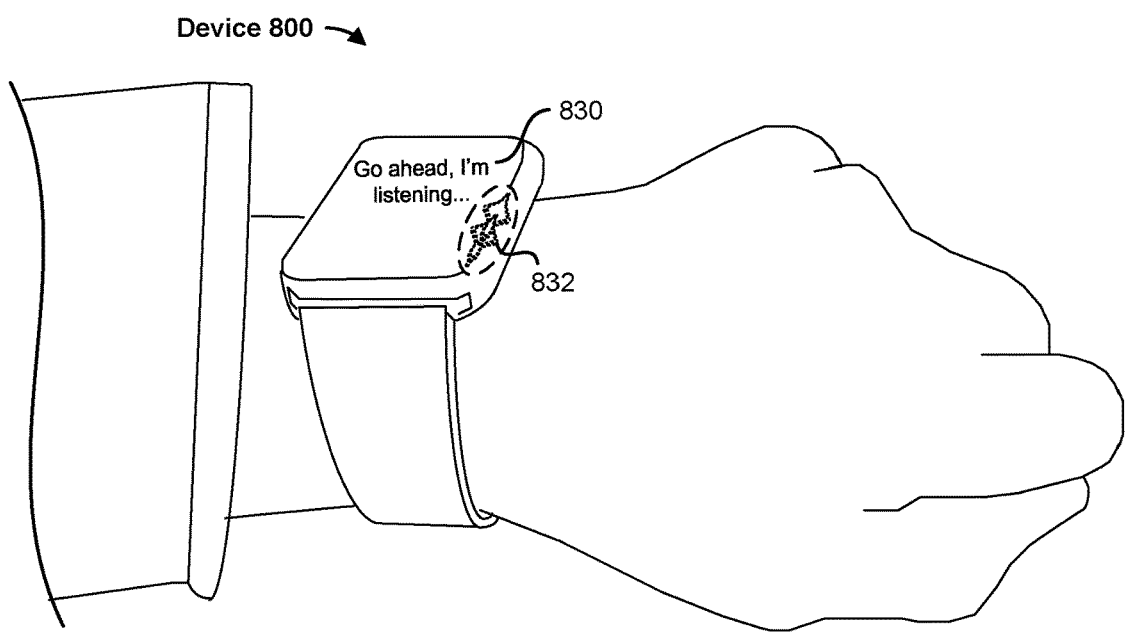

FIG. 8G shows device 800 being worn by a user with display 802 unobscured by the user's sleeve at a second time, subsequent to the first time, in accordance with some embodiments. Display 802 in FIG. 8G includes message 830 and illumination 832 at edge portion 804 corresponding to the user interacting with a digital assistant application. Illumination 832 in FIG. 8G has a pattern that is different from a pattern of illumination 832 in FIG. 8F. In some embodiments, illumination 832 is an animated illumination that changes during receipt of incoming audio (e.g., from a user and/or nearby person), as illustrated in FIGS. 8F-8G. In some embodiments, illumination 832 changes in accordance with one or more properties of the received audio (e.g., frequency and/or amplitude of the received audio).

Figure 8H:
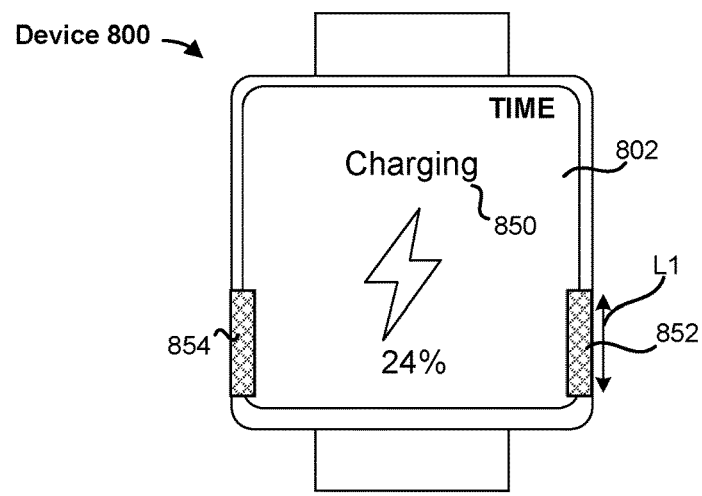
Figure 8I:
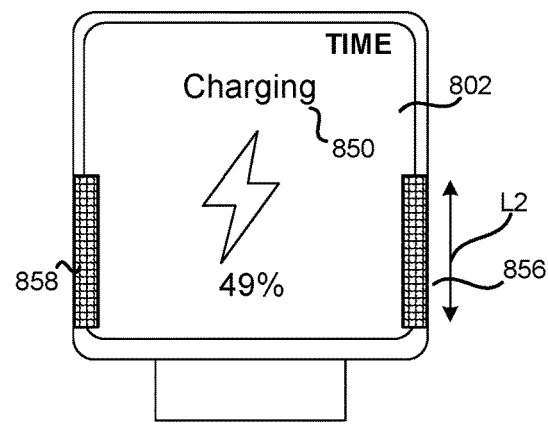
Figure 8J:
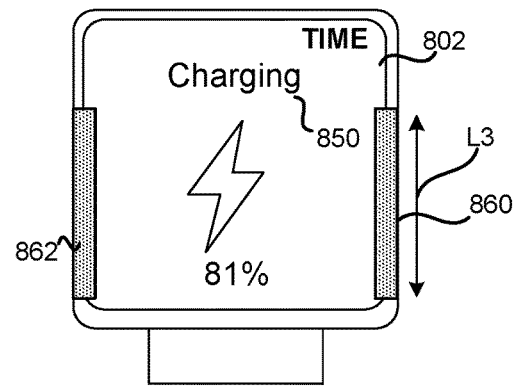

FIGS. 8H-8J show device 800 with display 802 displaying charging interface 850 and edge illuminations in accordance with some embodiments. In FIG. 8H device 800 includes edge illumination 852 and 854 indicating that device 800 is charging. In some embodiments, edge illumination 852 has the same properties as edge illumination 854 (e.g., luminosity, color, size, and/or pattern). In some embodiments, edge illumination 852 has one or more different properties than edge illumination 854. In some embodiments, a color of edge illumination 852 and/or 854 is based on a charge state of device 800 (e.g., edge illumination 852 and/or 854 has a red color while device 800 has a charge state of 30%, 25%, 10%, 5%, 1%, or less). In some embodiments, a pattern of edge illumination 852 and/or 854 is based on a charge state of device 800 (e.g., edge illumination 852 and/or 854 has a hexagonal pattern while device 800 has a charge state of 30%, 25%, 10%, 5%, 1%, or less). In some embodiments, a size of edge illumination 852 and/or 854 is based on a charge state of device 800. In some embodiments, a length of edge illumination 852 and/or 854 is proportional to a charge percentage of device 800. For example, the length L1 of edge illumination 852 corresponds to a charge percentage of 24% for device 800.

In FIG. 8I device 800 includes edge illumination 856 and 858 indicating that device 800 is charging. In some embodiments, edge illumination 856 has the same properties as edge illumination 858 (e.g., luminosity, color, size, and/or pattern). In some embodiments, edge illumination 856 has one or more different properties than edge illumination 858. In some embodiments, a color of edge illumination 856 and/or 858 is based on a charge state of device 800 (e.g., edge illumination 856 and/or 858 has a yellow and/or orange color while device 800 has a charge state between 25% and 50%). In some embodiments, a pattern of edge illumination 856 and/or 858 is based on a charge state of device 800 (e.g., edge illumination 856 and/or 858 has a square and/or rectangular pattern while device 800 has a charge state between 25% and 50%). In some embodiments, a size of edge illumination 856 and/or 858 is based on a charge state of device 800. In some embodiments, a length of edge illumination 856 and/or 858 is proportional to a charge percentage of device 800. For example, the length L2 of edge illumination 856 corresponds to a charge percentage of 49% for device 800.

In FIG. 8J device 800 includes edge illumination 860 and 862 indicating that device 800 is charging. In some embodiments, edge illumination 860 has the same properties as edge illumination 862 (e.g., luminosity, color, size, and/or pattern). In some embodiments, edge illumination 860 has one or more different properties than edge illumination 862. In some embodiments, a color of edge illumination 860 and/or 862 is based on a charge state of device 800 (e.g., edge illumination 860 and/or 862 has a green and/or blue color while device 800 has a charge state above a threshold (e.g., 70%, 75%, or 80%)). In some embodiments, a pattern of edge illumination 860 and/or 862 is based on a charge state of device 800 (e.g., edge illumination 860 and/or 862 has a dot pattern while device 800 has a charge state above a threshold (e.g., 70%, 75%, or 80%)). In some embodiments, a size of edge illumination 860 and/or 862 is based on a charge state of device 800. In some embodiments, a length of edge illumination 860 and/or 862 is proportional to a charge percentage of device 800. For example, the length L3 of edge illumination 860 corresponds to a charge percentage of 81% for device 800.

The dimensions of device 800 in FIGS. 8A-8J are merely an example, and one of ordinary skill in the art will recognize that device 800 can have other shapes, dimensions, and/or form factors. For example, device 800 may have a shape, dimensions, and/or form factor similar to those of multifunction device 100 or device 700. In some embodiments, device 800 has the form factor of a phone, tablet, or other portable electronic device. In some embodiments, device 800 has a display that extends from a front face of the device to a rear face of the device. In some embodiments, device 800 is a phone or tablet device, e.g., with a curved edge along a peripheral side curving from a front face of the device to a back face of the device.

Figure 9A:
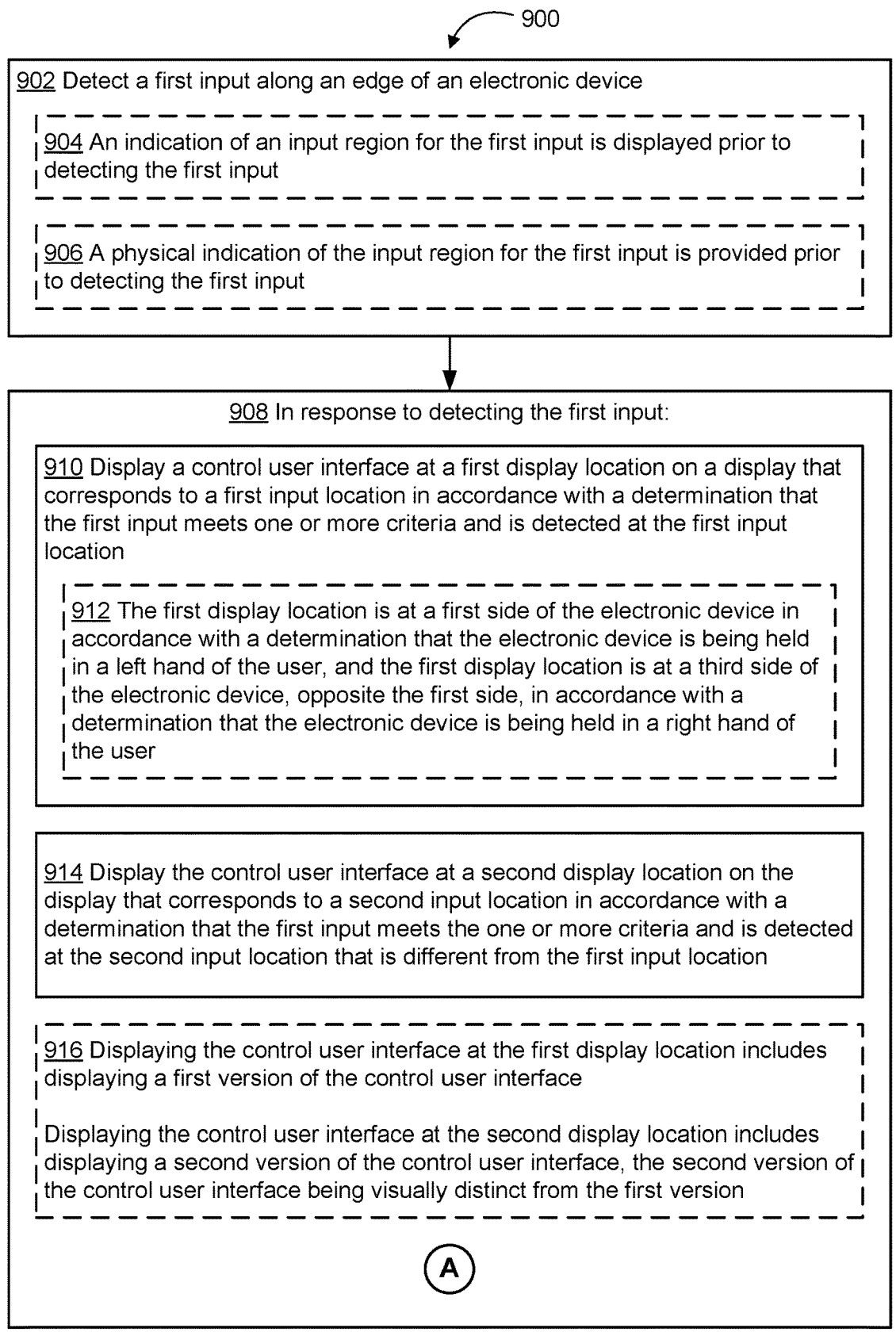

FIGS. 9A-9C are flow diagrams illustrating method 900 for user interaction with an electronic device in accordance with some embodiments. Method 900 is performed at an electronic device (e.g., multifunction device 100, device 300, device 600, device 700, or device 800) including, or in communication with, a display generation component and, optionally, a touch-sensitive and/or intensity-sensitive surface or region. In some embodiments, the electronic device is a desktop computer, a laptop computer, a tablet, a smartphone, a smart watch, or other computing device. In some embodiments, the display generation component is a touch-screen display. In some embodiments, the display is separate from a touch-sensitive and/or intensity-sensitive surface or region. Some operations in method 900 are, optionally, combined and/or the order of some operations is, optionally, changed.

In some embodiments, the display is arranged at a first (e.g., a front) side of the electronic device and inputs (e.g., touch and/or intensity inputs) are detected at a periphery of the first side. In some embodiments, the display is arranged at the first side of the electronic device and the inputs are detected at a lateral side, adjacent to the first side.

In some embodiments, only a portion of the edge of the electronic device is responsive to particular types of inputs (e.g., only the portion of the edge is capable of detecting touch and/or intensity inputs). For example, a top portion of the edge is responsive to a first type of input (e.g., touch and/or intensity inputs) and a bottom portion of the edge is not responsive to the first type of input. In some embodiments, a portion of the edge of the electronic device is not responsive to inputs (e.g., a bottom portion of the left edge of the device). In some embodiments, one or more edges of the electronic device are responsive to touch and/or intensity inputs and one or more other edges of the electronic device are not responsive to touch and/or intensity inputs.

In some embodiments, the electronic device includes one or more first sensors (e.g., contact intensity sensor(s) 165) to detect presence and/or intensities of contacts with the display of the device (e.g., capacitive and/or resistive sensors to detect intensities of a contact on the touch-screen display), and one or more second sensors to detect presence and/or intensities of contacts along the edge. In some embodiments, the direction and/or magnitude of the adjustment is determined based on a direction, duration, magnitude of movement, and/or intensity of the input. In some embodiments, the device further includes one or more tactile output generators (e.g., tactile output generator(s) 167) for generating tactile outputs (e.g., localized tactile outputs at the input locations and/or one or more internal actuators for generating whole-device tactile outputs).

As described below, method 900 provides an improved interface for controlling a device function and/or parameter in response to a particular type of gesture. This reduces the number of inputs needed to adjust the parameter/function and alleviates the requirement that the user input the gesture at a specific location. Thereby providing an improved human-machine interface by reducing the number of inputs needed for the user to control the device and enhancing the operability of the device and making the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

The device detects (902) a first input (e.g., a touch and/or intensity input) (e.g., user input 502) along an edge of an electronic device. In some embodiments, the display is a touch-sensitive and/or intensity-sensitive display. For example, a touch-sensitive and/or intensity-sensitive surface or region along the edge of the device implemented with capacitive and/or resistive sensing technology. In some embodiments, the display is disposed on a front side of the device and/or a lateral (peripheral) side of the device. In some embodiments, the first input is detected along a first edge of the electronic device, where the electronic device includes at least four distinct edges, a respective one of which is the first edge. In some embodiments, the edge of the electronic device has a normal vector that is not parallel (e.g., is perpendicular to) to a normal vector of the front side of the device. In some embodiments, the first input is detected via a touch screen (e.g., the input is detected on a side display and/or an edge portion of a front display). In some embodiments, the first input is detected on a curved edge of a display.

In some embodiments, one or more corner regions of the device are touch-sensitive and/or intensity-sensitive. In some embodiments, a user input at a first corner region (e.g., a top-left corner) causes performance of a media rewind function (e.g., if the user input is detected while a media application is active and/or has focus). For example, a tap gesture at the first corner region causes media being played back to rewind 10 seconds, 15 seconds, or 30 seconds. In some embodiments, a user input at a second corner region (e.g., a top right corner) causes performance of a media skip-ahead function (e.g., if the user input is detected while a media application is active and/or has focus). For example, a tap gesture at the second corner region causes media being played back to skip-ahead 10 seconds, 15 seconds, or 30 seconds. In some embodiments, a gesture detected in the first corner region and/or second corner region causes display of a corresponding media playback interface element. In some embodiments, a swipe gesture at the first corner region causes performance of a volume adjustment function (e.g., if the swipe gesture is detected while a media application is active and/or has focus). For example, a rightward or clockwise swipe at the first corner region causes an output volume of the device to increase and a leftward or counter-clockwise swipe at the first corner region causes an output volume of the device to decrease.

In some embodiments, in response to detecting a first type of gesture (e.g., a light press gesture) while a camera application is active, a focus function is performed. In some embodiments, in response to detecting a second type of gesture (e.g., a deep press gesture) while a camera application is active, an image capture function is performed. In some embodiments, a swipe gesture at a corner region while a camera application is active causes performance of a zoom function. For example, a rightward or clockwise swipe at the corner region causes a camera of the device to zoom in (increase magnification) and a leftward or counter-clockwise swipe at the corner region causes the camera to zoom out (decrease magnification).

In some embodiments, in response to detecting a first type of gesture (e.g., a light press gesture) at a corner region, a control user interface (e.g., a control center UI) is displayed. In some embodiments, the control user interface is displayed in response to detecting the first type of gesture in accordance with a determination a home screen or desktop screen was active when the gesture was detected.

In some embodiments, the display extends from a first side of the electronic device to the edge of the electronic device. In some embodiments, the display extends from a first edge across the first side to a second edge. For example, the device has curved edges and the display is a waterfall display. In some embodiments, the display extends from the first side of the electronic device to an adjacent side of the electronic device. Extending the display to the edge of the device increases area on the device for providing visual feedback about a state of the device and, in the case where the display is touch-sensitive and/or intensity-sensitive, increases the area on the device where a user can input commands, which enhances the operability of the device and makes the user-device interface more efficient.

In some embodiments, the display is a first display arranged on a first side of the electronic device (e.g., a primary display of the electronic device), the electronic device includes a second display arranged on a second side of the electronic device, the second side being adjacent to the first side, and the first input is detected at a location on the second display. Providing a second display increases area on the device for providing visual feedback about a state of the device and, in the case where the second display is touch-sensitive and/or intensity-sensitive, increases the area on the device where a user can input commands, which enhances the operability of the device and makes the user-device interface more efficient.

In some embodiments, an indication of an input region for the first input is (904) displayed prior to detecting the first input. For example, FIG. 5AC shows input location indicator 592 corresponding to input location 506 in FIG. 5A. In some embodiments, prior to detecting the first input, the device displays an indication of an input region for the first input (e.g., input location indicator 592). For example, a volume control indicator, a shutter button indicator, and/or a media playback button indicator is displayed to indicate one or more input regions. In some embodiments, the indication is based on an active application executing on the electronic device. In some embodiments, the indication is displayed on a side display and/or a curved edge display (e.g., a curved edge portion of touch screen 112).

In some embodiments, a physical indication of the input region for the first input is (906) provided prior to detecting the first input. For example, FIG. 5A shows physical indicator 504 corresponding to input location 506. In some embodiments, prior to detecting the first input, the device provides a physical indication of an input region for the first touch and/or intensity input. For example, the physical indication can be one or more indentations, one or more bumps, and/or one or more ridges. In another example, the physical indication is a location-specific tactile output that indicates a location of the input region for the first input. In some embodiments, the physical indication includes a protrusion in a middle of the input region. In some embodiments, the physical indication includes indicators at opposing ends of the input region.

In some embodiments, the electronic device includes a housing with one or more physically distinguished portions corresponding to the first input location and/or the second input location. In some embodiments, portions of the edge that are responsive to a first type of input (e.g., touch and/or intensity inputs) are physically distinguished from portions of the edge that are not responsive to the first type of input. For example, the responsive portions are indicated by a surface texture at a top, bottom, middle, and/or along a length of the portion. In some embodiments, the physically distinguished portion(s) include one or more bumps and/or one or more indentations.

Providing indication of input region(s) via physical and/or software indicators provides improved feedback to the user, which enhances the operability of the device and makes the user-device interface more efficient (e.g., by helping the user to achieve an intended outcome and reducing user mistakes when operating/interacting with the devices), which, additionally, reduces power usage and improves battery life of the device by enabling the user to use the device more quickly and efficiently.

In response (908) to detecting the first input, the device displays (910) a control user interface (e.g., volume control element 510) at a first display location (e.g., display location 510-a) on a display that corresponds to a first input location (e.g., input location 506) in accordance with a determination that the first input meets one or more criteria and is detected at the first input location. For example, the control user interface is a volume user interface or a control center user interface. In some embodiments, the control user interface includes one or more audio controls, one or more brightness controls, one or more security controls, and/or one or more connectivity controls. In some embodiments, a vertical position of the first display location is based on a vertical position of the first input location.

In some embodiments, the first display location is (912) at a first side (e.g., a left side) of the electronic device in accordance with a determination that the electronic device is being held in a left hand of the user, and the first display location is at a third side (e.g., a right side) of the electronic device, opposite the first side, in accordance with a determination that the electronic device is being held in a right hand of the user. In some embodiments, the device has a right-handed user interface setting and a left-handed user interface setting (e.g., that are separately activated in accordance with a handedness determination for the user). In some embodiments, the first display location is at a side closest to the thumb of the hand with which the user is holding the electronic device. For example, a volume control is displayed a side closest to the thumb of the hand with which the user is holding the electronic device. In some embodiments, the first display location is at a side closest to the index finger of the hand with which the user is holding the electronic device. For example, a volume control is displayed a side closest to the index finger of the hand with which the user is holding the electronic device.

In some embodiments, the device detects a thumb contact at the electronic device (e.g., user input 574 in FIG. 5S); where the first display location is at the first side of the electronic device in accordance with a determination that the thumb contact is at the second side of the electronic device; and where the first display location is at the second side of the electronic device in accordance with a determination that the thumb contact is at the first side of the electronic device. In some embodiments, in accordance with the determination that the contact corresponds to the electronic device being held in a left hand of the user, including a first criterion in the one or more criteria. In some embodiments, in accordance with the determination that the contact corresponds to the electronic device being held in a right hand of the user, including a second criterion in the one or more criteria (e.g., in addition to, or alternatively to, including the first criterion).

Displaying the control user interface at different locations based on handedness and/or thumb position of the user provides improved control options for the user (an improved human-machine interface) without cluttering the display with additional/multiple displayed controls.

In response (908) to detecting the first input, the device displays (914) the control user interface at a second display location (e.g., display location 510-b) on the display that corresponds to a second input location (e.g., input location 524) in accordance with a determination that the first input meets the one or more criteria and is detected at the second input location that is different from the first input location. In some embodiments, a vertical position of the second display location is based on a vertical position of the second input location.

In some embodiments, the one or more criteria include an input location criterion; and, in accordance with a determination that the first input does not meet the input location criterion, the device forgoes displaying the control user interface. For example, FIGS. 5Q-5R show multifunction device 100 forgoing displaying a volume control element in response to user input 566 being detected at input location 568. In some embodiments, in accordance with the determination that the first touch and/or intensity input does not meet the input location criterion, a second user interface that is different than the control user interface is displayed. For example, the input location criteria distinguish between touch and/or intensity inputs at a top edge and touch and/or intensity inputs at a lateral edge. In some embodiments, in accordance with the determination that the first input does not meet the input location criterion, a different version of the control user interface is displayed (e.g., having a different shape, dimensions, colors, and/or arrangements of elements). Forgoing displaying a user interface element in response to user inputs that do not meet location-based criteria prevents errant, unintended inputs from affecting operation of the device, thereby improving the human-machine interface.

In some embodiments, the one or more criteria include an intensity-based criterion; and, in accordance with a determination that the first input does not meet the intensity-based criterion, the device forgoes displaying the control user interface. For example, FIGS. 5C-5D show multifunction device 100 forgoing displaying a volume control element in response to user input 514 having an intensity above intensity threshold $IT_D$. As another example, FIGS. 5AK-5AL show multifunction device 100 forgoing displaying a volume control element in response to user input 5120 having an intensity below intensity threshold $IT_L$. In some embodiments, the intensity-based criterion is an intensity threshold, and the touch-sensitive and/or intensity-sensitive display includes one or more intensity sensors. In some embodiments, in accordance with the determination that the first input does not meet the intensity-based criterion, a second user interface that is different than the control user interface is displayed. In some embodiments, in accordance with the determination that the first input does not meet the intensity-based criterion, a different version of the control user interface is displayed (e.g., having a different shape, dimensions, colors, and/or arrangements of elements). Forgoing displaying a user interface element in response to user inputs that do not meet intensity-based criteria prevents errant, unintended inputs from affecting operation of the device, thereby improving the human-machine interface.

In some embodiments, the one or more criteria include a criterion based on how the electronic device is being held by the user; and, in accordance with a determination that the first input does not meet the criterion based on how the electronic device is being held by the user, the device forgoes displaying the control user interface. For example, FIGS. 5S-5T show multifunction device 100 forgoing displaying a volume control element in response to user input 574 applied by thumb 572 of the user. In some embodiments, the electronic device determines which of the user's hands is holding the device (e.g., right-handed or left-handed) and adjusts the criteria accordingly. For example, a particular edge of the device is only responsive to a first type of input (e.g., touch and/or intensity inputs) when the device is held in a particular manner (e.g., to avoid inadvertent activation by a user's thumb or palm while holding the device). In some embodiments, in accordance with the determination that the first input does not meet the criterion based on how the electronic device is being held by the user, a second user interface that is different than the control user interface is displayed. In some embodiments, in accordance with the determination that the first input does not meet the criterion based on how the electronic device is being held by the user, a different version of the control user interface is displayed (e.g., having a different shape, dimensions, colors, and/or arrangements of elements). Forgoing displaying a user interface element in response to user inputs that do not meet criteria based on how the device is being held prevents errant, unintended inputs from affecting operation of the device, thereby improving the human-machine interface.

In some embodiments, the one or more criteria include an orientation-based criterion; and, in accordance with a determination that the first input does not meet the orientation-based criterion, the device forgoes displaying the control user interface. For example, FIGS. 5Y-5Z show multifunction device 100 forgoing displaying a volume control element in response to user input 590 at input location 506 in accordance with multifunction device 100 being in a landscape orientation. In some embodiments, the one or more criteria include a criterion based on an orientation of the device (e.g., whether the device is being held in a landscape or portrait orientation, and/or whether the device is tilted more than a threshold amount). For example, the first input at the first input location causes presentation of the control user interface if the electronic device is in a portrait orientation and the first touch and/or intensity input at the first input location causes performance of a system operation (e.g., a wake and/or lock operation) if the electronic device is in a landscape orientation. In some embodiments, in accordance with the determination that the first input does not meet the orientation-based criterion, a second user interface that is different than the control user interface is displayed. In some embodiments, in accordance with the determination that the first input does not meet the orientation-based criterion, a different version of the control user interface is displayed (e.g., having a different shape, dimensions, colors, and/or arrangements of elements). Forgoing displaying a user interface element in response to user inputs that do not meet orientation-based criteria prevents errant, unintended inputs from affecting operation of the device, thereby improving the human-machine interface.

In some embodiments, the one or more criteria include a duration-based criterion; and, in accordance with a determination that the first input does not meet the duration-based criterion, the device forgoes displaying the control user interface. For example, FIGS. 5AC-5AD show multifunction device 100 forgoing displaying a volume control element in response to user input 596 having a duration less than duration threshold 599. In some embodiments, the first criteria are met when the device detects a finger contact for a threshold amount of time without substantial movement (e.g., a touch-hold input). For example, the first criteria are not met in response to detecting a tap input which includes touch-down and lift-off of the contact that occur within a threshold amount of time of each other. In some embodiments, in accordance with the determination that the first input does not meet the duration-based criterion, a second user interface that is different than the control user interface is displayed. In some embodiments, in accordance with the determination that the first input does not meet the duration-based criterion, a different version of the control user interface is displayed (e.g., having a different shape, dimensions, colors, and/or arrangements of elements). For example, in accordance with a light press a first portion of the control user interface is displayed and in accordance with a deep press a second portion, greater than the first portion, is displayed. Forgoing displaying a user interface element in response to user inputs that do not meet duration-based criteria prevents errant, unintended inputs from affecting operation of the device, thereby improving the human-machine interface.

In some embodiments, the one or more criteria include a criterion corresponding to an operating state of the electronic device; and, in accordance with a determination that the first input does not meet the criterion corresponding to the operating state of the electronic device, the device forgoes displaying the control user interface. For example, FIGS. 5AI-5AJ show multifunction device 100 as being in a locked state and multifunction device 100 forgoing displaying a volume control element in response to user input 5114. As an example, the criterion is based on whether an application is active (e.g., an application that causes an output audio at the device). As another example, the criterion is based on a type of application that is active. As another example, a first user interface is displayed in response to the first input in accordance with a first application being active and a second user interface is displayed in response to the first input in accordance with a second application being active. In some embodiments, in accordance with the determination that the first input does not meet the criterion corresponding to the operating state of the electronic device, a second user interface that is different than the control user interface is displayed. In some embodiments, in accordance with the determination that the first input does not meet the criterion corresponding to the operating state of the electronic device, a different version of the control user interface is displayed (e.g., having a different shape, dimensions, colors, and/or arrangements of elements). Forgoing displaying a user interface element in response to user inputs that do not meet operating state criteria prevents errant, unintended inputs from affecting operation of the device, thereby improving the human-machine interface.

In some embodiments, displaying the control user interface at the first display location includes (916) displaying a first version of the control user interface; and displaying the control user interface at the second display location includes displaying a second version of the control user interface, the second version of the control user interface being visually distinct from the first version. For example, FIG. 5B shows volume control element 510 (e.g., a first version of the control user interface) at display location 510-a and FIG. 5P shows volume control element 564 (e.g., a second version of the control user interface) at a corner display location, where volume control element 510 and volume control element 564 are visually distinct. In some embodiments, the first version is visually different than the second version (e.g., has a different shape, dimensions, colors, and/or arrangement of elements). In some embodiments, the first version includes an element not included in the second version or vice versa. Displaying different versions of the control user interface at different locations provides improved control options for the user (an improved human-machine interface) without cluttering the display with additional/multiple displayed controls.

In some embodiments, the control user interface has (918) a first appearance in accordance with the first input location being at a corner region of the electronic device; and the control user interface has a second appearance in accordance with the first input location being at a non-corner region of the electronic device, the second appearance being different than the first appearance. For example, FIG. 5B shows volume control element 510 (e.g., a second appearance the control user interface) at display location 510-*a* and FIG. 5P shows volume control element 564 (e.g., a first appearance of the control user interface) at a corner display location, where volume control element 510 and volume control element 564 are visually distinct. In some embodiments, the first appearance is a corner user interface (UI), e.g., shaped in accordance with the shape of the corner. For example, the first appearance of the UI is semi-circular, and the second version is rectangular (e.g., with sharp or rounded corners). In some embodiments, the first appearance includes one or more interface elements not included in the second appearance (or vice versa). In some embodiments, the first appearance is visually different than the second appearance (e.g., different shape, dimensions, colors, and/or arrangement of elements). Displaying the control user interface with a different appearance at different locations provides improved control options for the user (an improved human-machine interface) without cluttering the display with additional/multiple displayed controls.

In some embodiments, prior to detecting the first input, a user interface element is (920) displayed at the first display location, and displaying the control user interface at the first display location includes replacing display of the user interface element with display of the control user interface element. For example, volume control element 564 in FIG. 5P replaces display of time element 560 in FIG. 5O. Replacing display of a user interface element in response to a user input provides improved control options for the user (an improved human-machine interface) without cluttering the display with additional displayed controls.

In some embodiments, prior to detecting the first input, the control user interface is (922) displayed at a third display location on the display, the third display location being different than the first display location, and displaying the control user interface at the first display location includes ceasing to display the control user interface at the third display location. As an example, FIG. 6A shows volume control element 614 displayed at display location 614-*a* on display 606 and FIG. 6B shows volume control element 614 displayed at display location 614-*b* on display 606 in response to user input 616. For example, the control user interface moves from the third display location to the first display location (e.g., with an animated movement). Displaying the control user interface at different locations based on a user input provides improved control options for the user (an improved human-machine interface) without cluttering the display with additional/multiple displayed controls.

In some embodiments, the device forgoes (924) displaying the control user interface in accordance with a determination that the first input does not meet the one or more criteria (e.g., time, location, and/or intensity criteria). For example, the criteria include an intensity criterion and inputs not meeting the intensity criterion do not cause presentation of the control user interface. In some embodiments, the electronic device forgoes responding to inputs that do not meet the one or more criteria. In some embodiments, the electronic device forgoes displaying and/or changing a user interface in response to inputs not meeting the one or more criteria. For example, FIG. 5AD shows device 100 not displaying a control user interface in accordance with user input 596 in FIG. 5AC having a corresponding duration 598 that is less than duration threshold 599. Forgoing displaying the control user interface when an input does not meet one or more criteria prevents errant, unintended inputs from affecting operation of the device, thereby improving the human-machine interface.

The device detects (926) a second input (e.g., a touch and/or intensity input) while the control user interface is displayed. For example, multifunction device 100 in FIG. 5I detects user input 544 while volume control element 510 is displayed. As another example, multifunction device 100 in FIG. 5K detects user input 550 while volume control element 510 is displayed. As another example, device 600 in FIG. 6G detects user input 638 while volume control element 632 is displayed.

The device adjusts (928) a parameter for a function represented in the control user interface in accordance with the second input in response to detecting the second input. For example, multifunction device 100 in FIG. 5J mutes an output volume in accordance with user input 544 in FIG. 5I. As another example, device 600 in FIG. 6H decreases an output volume in accordance with user input 638 in FIG. 6G.

In some embodiments, the parameter is one of: a level of zoom of a camera of the electronic device, a volume of audio output of the electronic device, a playback location for media content output by the electronic device, and a speed of playback for the media content output by the electronic device. In some embodiments, the parameter is associated with a different aspect of the control user interface, such as display brightness or sizing of the user interface and/or icons on the display. In some embodiments, the parameter corresponds to whether a feature is enabled or disabled (e.g., a flashlight function, a casting function, a connectivity function, and/or other device feature). In some embodiments, the parameter is adjusted in accordance with direction and/or magnitude of movement of the second input.

In some embodiments, the device performs (930) a second function of the electronic device in accordance with a determination that the first input meets the one or more criteria and is detected at a third input location that is different from the first and second input locations, the second function being different than the function represented in the control user interface. In some embodiments, a first type of input (e.g., a touch and/or intensity input) at a first portion of the electronic device causes execution of a first function and the first type of input at a second portion does not cause execution of the first function. For example, a touch and/or intensity input on a top edge causes execution of a sleep/wake function for the electronic device and a touch and/or intensity input on a left edge causes execution of a volume control function for the electronic device. In some embodiments, an input causes execution of a first function when detected at a first portion of the device (e.g., a top edge and/or a top half of a lateral edge) and causes execution of a second function when detected at a second portion of the device (e.g., a bottom half of a lateral edge). For example, FIGS. 5Q-5R show user input 566 at input location 568 causing display of brightness control element 570 (e.g., a first function) and FIGS. 5E-5F show user input 522 at input location 524 causing display of volume control element 510 (e.g., a second function). Performing different functions based on inputs at different locations on the device provides improved control options for the user (an improved human-machine interface) without cluttering the display with additional/multiple displayed controls.

In some embodiments, the parameter is (932) adjusted in accordance with the second input being a first type input (e.g., a first type of touch and/or intensity input) (e.g., a swipe or drag gesture); and a third input (e.g., a touch and/or intensity input) is detected while the control user interface is displayed, and, in response to detecting the third input, a third function represented in the control user interface is performed in accordance with the third input being a second type of input (e.g., a tap, double tap, or deep press gesture). For example, FIGS. 5I-5J show a mute function being performed in accordance with user input 544 (e.g., a tap gesture) and FIGS. 5K-5L show a volume increase function being performed in accordance with user input 550 (e.g., a swipe or drag gesture). Performing different functions based on different types of inputs provides improved control options for the user (an improved human-machine interface) without cluttering the display with additional/multiple displayed controls. In some embodiments, in response to detecting the third input, a second parameter for the function represented in the control user interface is adjusted.

In some embodiments, the control user interface is (934) displayed in accordance with the first input being a first type of input (e.g., a first type of touch and/or intensity input) (e.g., a tap or tap-and-hold gesture), and, in accordance with a determination that the first input is a second type of input (e.g., a deep press, squeeze, or double tap gesture), different than the first type, a third function of the electronic device is performed, the third function being different than the function represented in the control user interface. For example, FIGS. 5E-5F show volume control element 510 being displayed in accordance with user input 522 (e.g., a tap gesture) and FIGS. 5G-5H show menu 532 being displayed in accordance with user input 530 (e.g., a double tap gesture). In some embodiments, the electronic device is not responsive to a third type of input (e.g., a squeeze or holding gesture). In some embodiments, the second function corresponds to a system operation (e.g., a lock/unlock operation or a screenshot operation). For example, a tap gesture causes execution of a lock/unlock function, and a squeeze gesture causes execution of a screenshot function. In some embodiments, prior to detecting the first input, the device detects a third input along the edge of the electronic device, and in accordance with the third input being a second type of input distinct from the first type of input, the device performs a second function of the electronic device, the second function different than the function represented in the control user interface. In some embodiments, performing the second function includes displaying a locking user interface at the display (e.g., as illustrated in FIGS. 5AI-5AJ). In some embodiments, a pinch gesture performed at an edge of the device causes performance of a screenshot function (e.g., a pinch gesture starting at opposing edges of the device). In some embodiments, a first type of squeeze gesture (e.g., a light squeeze) causes a first user interface element (e.g., including one or more selectable controls) to be displayed. In some embodiments, a second type of squeeze gesture (e.g., a deep squeeze) causes a second user interface element to be displayed (e.g., including one or more selectable controls). In some embodiments, the second user interface element includes a superset or subset of the selectable controls included in the first user interface element. Performing different functions based on different types of inputs provides improved control options for the user (an improved human-machine interface) without cluttering the display with additional/multiple displayed controls.

In some embodiments, the function is (936) identified in accordance with an operating state of the electronic device. For example, FIGS. 5AG-5AH show a media playback application being active and user input 5106 causing display of volume control element 510, and FIGS. 5AI-5AJ show the device being in a locked state and user input 5114 causing display of unlock element 5116. In some embodiments, the operating state includes whether the device is locked or unlocked. In some embodiments, the operating state includes which application(s) are active and/or have focus. In some embodiments, the function is identified in accordance with the operating state of the electronic device and one or more aspects of the second input (e.g., location, direction of movement, intensity, duration, and/or other touch properties). Identifying which function to activate in accordance with an operating state of the device provides improved control options for the user (an improved human-machine interface) without cluttering the display with additional/multiple displayed controls.

In some embodiments, the device detects (938) a fourth input (e.g., a touch and/or intensity input) (e.g., a tap, double tap, or deep press gesture) at the first input location along the edge of the electronic device; displays the control user interface at the first display location in response to detecting the fourth input (e.g., in response to detecting a touch-down of a contact) and in accordance with a determination that the fourth input meets the one or more criteria; and, subsequent to displaying the control user interface, adjusts the parameter in accordance with movement of the fourth input. In some embodiments, in response to detecting the fourth input, a second parameter for the function represented in the control user interface is adjusted. For example, FIGS. 5U-5X illustrate displaying volume control element 510 in response to detecting of user input 580 and adjustment of volume control element 510 in response to movement of user input 584 (e.g., user input 584 is a continuation of user input 580). Displaying and adjusting a control UI in response to a single gesture provides improved control options for the user (a simplified human-machine interface) without cluttering the display with additional/multiple displayed controls.

In some embodiments, the device detects (940) a fifth input (e.g., a touch and/or intensity input) at an input location on a front side of the electronic device; and displays a third version of the control user interface in response to detecting the fifth input, the third version of the control user interface being visually distinct from the first version of the control user interface. For example, FIGS. 5A-5B show volume control element 510 being displayed in response to user input 502 on an edge of the device, and FIGS. 5AO-5AP show volume control element 5134 being displayed in response to user input 5132 on a front side of the device, where volume control element 510 and volume control element 5134 are visually different. As an example, a first portion of the first version of the control user interface may be displayed on an edge and/or lateral side of the device and a second portion of the first version of the control user interface may be displayed on the front side of the electronic device. In this example, the second version of the control user interface may be displayed only on the front side of the device (e.g., no portion of the second version is displayed on the edge or lateral side of the device. In some embodiments, the first version includes one or more interface elements not included in the second version (or vice versa). In some embodiments, the first version is visually different than the second version (e.g., different shape, dimensions, colors, and/or arrangement of elements).

In some embodiments, displaying the control user interface at the first display location includes displaying a first version of the control user interface; and displaying the control user interface at the second display location includes displaying a second version of the control user interface, the second version of the control user interface being visually distinct from the first version. For example, FIG. 5B shows volume control element 510 (e.g., a first version the control user interface) at display location 510-*a* and FIG. 5P shows volume control element 564 (e.g., a second version of the control user interface) at a corner display location, where volume control element 510 and volume control element 564 are visually distinct. As an example, the control user interface is displayed differently if the input location is at a corner than if the input location is along an edge. For example, if the first display location is in a corner region, the first version of the control user interface can have a semicircular shape with radially arranged icons. In this example, if the second display location is in a non-corner region, the second version of the control user interface can have a rectangular shape (e.g., with rounded corners) with icons arranged in horizontal and/or vertical lines. In some embodiments, the first version includes one or more interface elements not included in the second version (or vice versa). In some embodiments, the first version is visually different than the second version (e.g., different shape, dimensions, colors, and/or arrangement of elements).

Displaying different versions of the control user interface in response to user inputs at different locations provides improved control options for the user (an improved human-machine interface) without cluttering the display with additional/multiple displayed controls.

In some embodiments, the first input has a first portion and a second portion; and, in accordance with a determination that an intensity of the first portion does not meet one or more intensity criteria, displaying a first portion of the control user interface and forgoing displaying a second portion of the control user interface; where displaying the control user interface at the first input location includes displaying the first portion of the control user interface and the second portion of the control user interface in accordance with a determination that the intensity of the second portion meets the one or more intensity criteria. For example, FIGS. 5AK-5AN show user input 5120 having a first portion as shown in FIG. 5AK with an intensity below $IT_L$ and a second portion as shown in FIG. 5AM with an intensity above $IT_L$. FIGS. 5AK-5AN further show volume element 5124 (e.g., a first portion of a UI) displayed in response to the first portion of user input 5120 and volume control element 510 displayed in response to the second portion of user input 5120.

As an example, an expanded control center user interface is displayed in response to a hard press (intensity above a threshold) and a partial control center user interface is displayed in response to a light press (intensity below a threshold). In some embodiments, in response to the first input, the first portion is displayed in accordance with a determination that an intensity of the first input is below a threshold and, in response to a sixth input (e.g., a touch and/or intensity input), the first and second portions of the control user interface is displayed in accordance with a determination that an intensity of the sixth input is above the threshold.

Providing dynamic visual feedback that changes in accordance an intensity of the input before the input enhances the operability of the device and makes the user-device interface more efficient (e.g., by providing improved feedback to help the user provide required inputs to achieve an intended outcome, and reducing user mistakes when operating/interacting with the device), which, additionally, reduces power usage and improves battery life of the device by enabling the user to use the device more quickly and efficiently.

In some embodiments, the control user interface is displayed within a status region that displays information about one or more operations currently being performed by the device. In some embodiments, the status region (sometimes referred to as a dynamic window) has a size (e.g., a length and/or width) that is adjusted based on content presented within the window (e.g., content of the control user interface). In some embodiments, a location of the status region is adjusted in accordance with input locations. For example, the status region is displayed at the first display location in response to the first input and is displayed at the second display location in response to the second input. In some embodiments, a location of the status region is adjustable via inputs (e.g., touch and/or intensity inputs) (e.g., drag and/or swipe inputs) at a display location of the status region. Changing which information is displayed in the status region in response to a user input reduces the number of inputs needed to view different application user interfaces, without displaying additional controls, and causes the device to automatically reallocate available space in the status region, thereby providing improved feedback about a state of the device.

It should be understood that the particular order in which the operations in FIGS. 9A-9C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1000 and 1100) are also applicable in an analogous manner to method 900 described above with respect to FIGS. 9A-9C. For example, the inputs, gestures, functions, and feedback described above with reference to method 900 optionally have one or more of the characteristics of the inputs, gestures, functions, and feedback described herein with reference to other methods described herein (e.g., methods 1000 and 1100). For brevity, these details are not repeated here.

Figure 10A:
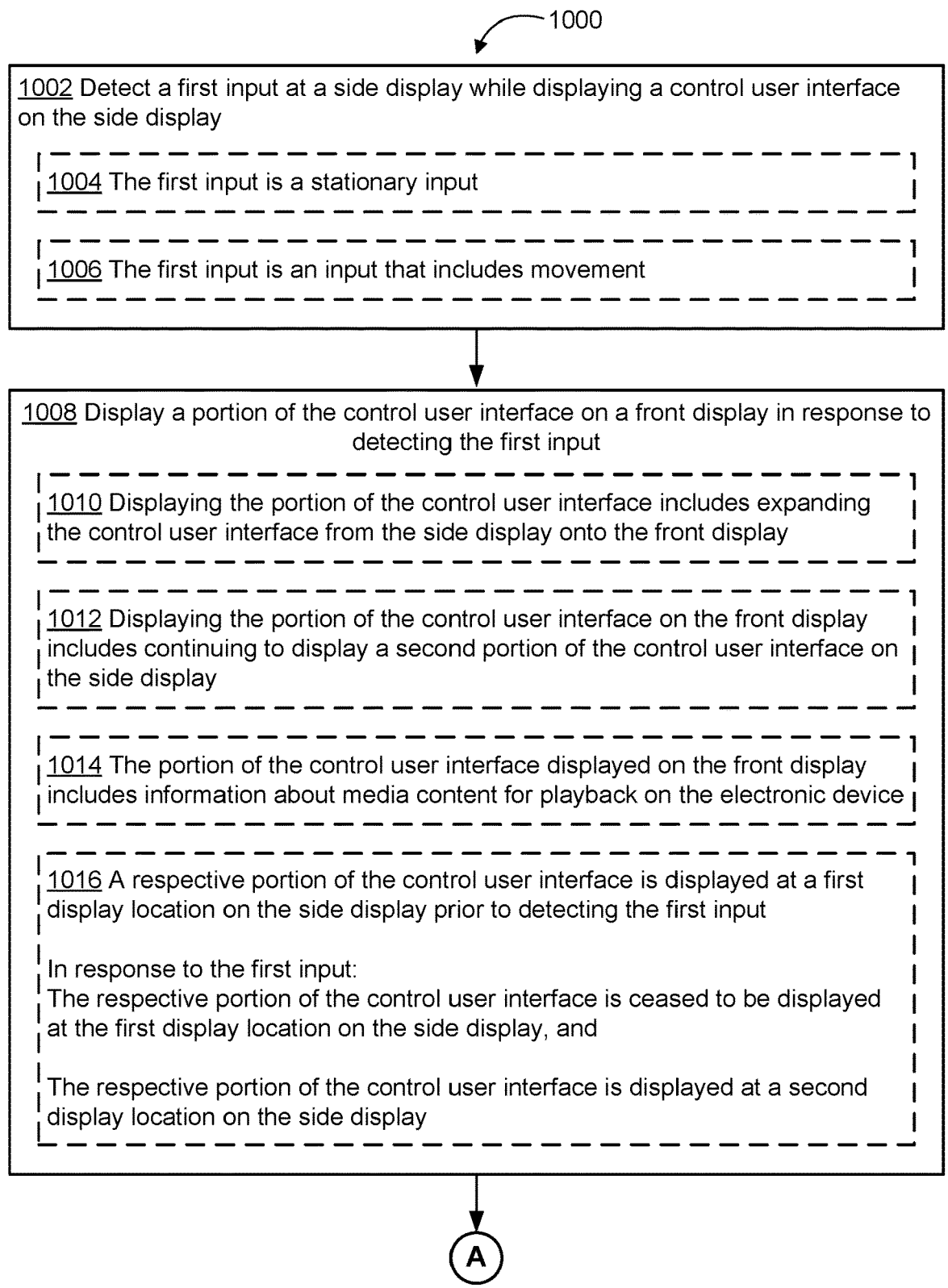
Figure 10B:
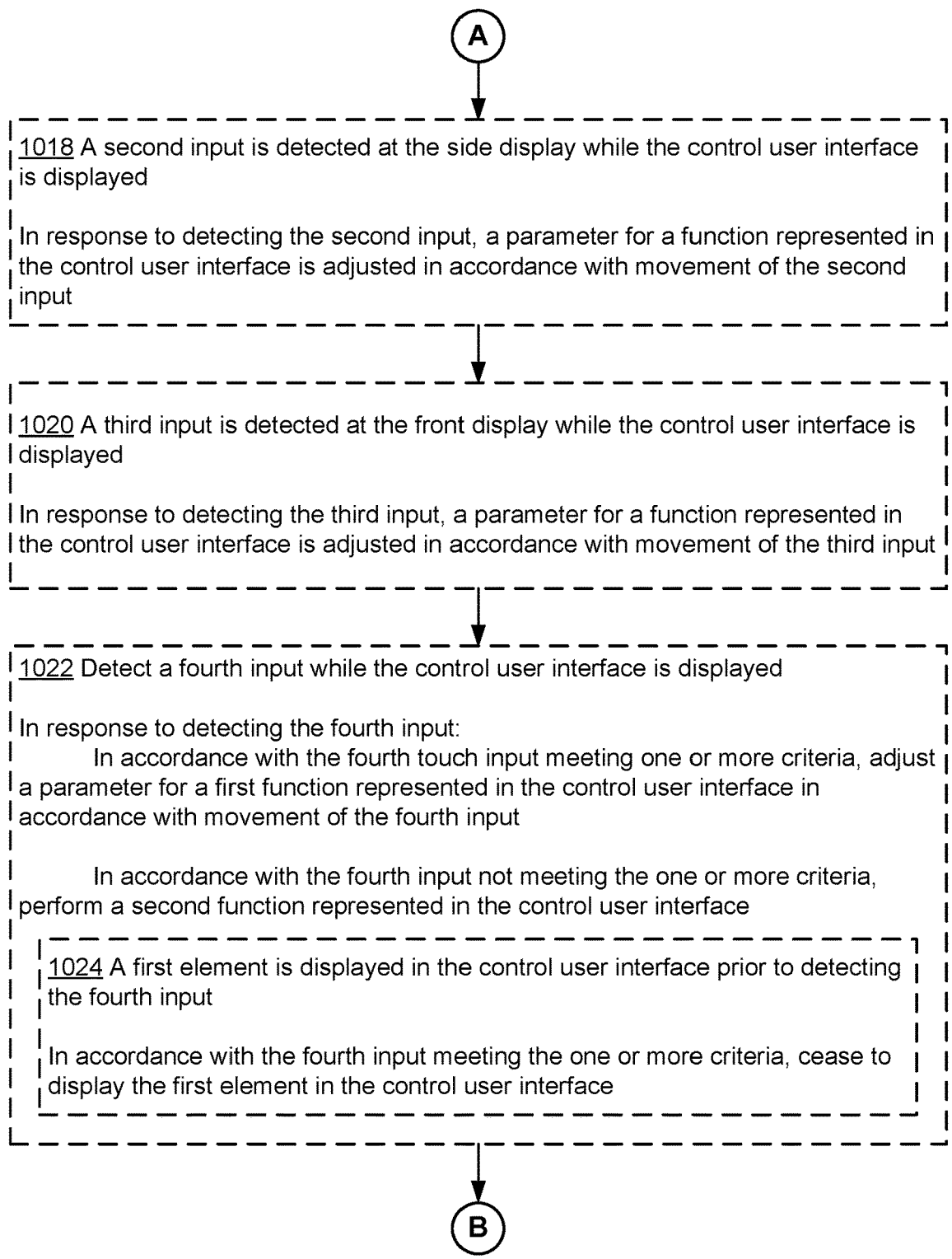

FIGS. 10A-10C are flow diagrams illustrating method 1000 for user interaction with an electronic device in accordance with some embodiments. Method 1000 is performed at an electronic device (e.g., multifunction device 100, device 300, device 600, device 700, or device 800) including, or in communication with, a display generation component and, optionally, a touch-sensitive and/or intensity-sensitive surface or region. In some embodiments, the electronic device is a desktop computer, a laptop computer, a tablet, a smartphone, a smart watch, or other computing device. In some embodiments, the display generation component is a touch-screen display. In some embodiments, the display is separate from a touch-sensitive and/or intensity-sensitive surface or region. Some operations in method 1000 are, optionally, combined and/or the order of some operations is, optionally, changed.

As described below, method 1000 provides an improved interface for controlling a device function and/or parameter in response to a particular type of gesture. This reduces the number of inputs needed to adjust the parameter/function and alleviates the requirement that the user input the gesture at a specific location. The method thereby provides an improved human-machine interface by reducing the number of inputs needed for the user to control the device and enhancing the operability of the device and making the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

The device detects (1002) a first input (e.g., a touch and/or intensity input) (e.g., user input 620) at a side display (e.g., display 606) while displaying a control user interface (e.g., volume control element 614) on the side display. In some embodiments, the device includes a front display (e.g., a touch-sensitive and/or intensity-sensitive display) and the side display (e.g., a display on a first side (e.g., a lateral/peripheral side) of the device, where the device includes at least three distinct sides, including the first side, a back side, and a lateral side. In some embodiments, the side display has a normal vector that is not parallel to (e.g., is perpendicular to) a normal vector of the front display. In some embodiments, the side display is a touch-sensitive and/or intensity-sensitive display.

In some embodiments, the first input is (1004) a stationary input, such as a tap or tap-and-hold gesture (e.g., user input 620). In some embodiments, the first input is (1006) an input that includes movement, such as a drag or swipe gesture (e.g., user input 650).

The device displays (1008) a portion of the control user interface (e.g., media playback portion 655) on a front display (e.g., display 602) in response to detecting the first input. For example, the control user interface is only displayed on the side display prior to detecting the first input. In some embodiments, the device includes a front side, a back side, and a peripheral side where the peripheral side has a normal vector that is not parallel to a normal vector of the front side or the back side. In some embodiments, the front display and the side display are portions of a same contiguous display. For example, a display of the device wraps from the front side around a side of the device and the portion of the display on the front side is referred to as the front display while the portion of the display on the side is referred to as the side display. In some embodiments, the device has curved edges and the display curves from the front side to the edge. In some embodiments, the side display includes at least left and right portions, and optionally includes top, bottom, left and right portions positioned above, below, to the left and to the right of the front display.

In some embodiments, displaying the portion of the control user interface includes (1010) expanding the control user interface from the side display onto the front display. For example, FIGS. 6C-6D show volume control element 614 expanding into volume control element 626 (with portion 624 on display 606 and portion 625 on display 602) in response to user input 620. Expanding the control user interface from a side display to a front display provides improved visual feedback to the user, which enhances the operability of the device and makes the user-device interface more efficient (e.g., by helping the user to achieve an intended outcome and reducing user mistakes when operating/interacting with the devices), which, additionally, reduces power usage and improves battery life of the device by enabling the user to use the device more quickly and efficiently.

In some embodiments, displaying the portion of the control user interface on the front display includes (1012) continuing to display a second portion of the control user interface on the side display. For example, FIGS. 6I-6J show control element 654 with media playback portion 655 on display 602 and volume control portion 660 on display 606. Displaying the control user interface on a side display and a front display provides improved visual feedback to the user, which enhances the operability of the device and makes the user-device interface more efficient (e.g., by helping the user to achieve an intended outcome and reducing user mistakes when operating/interacting with the devices), which, additionally, reduces power usage and improves battery life of the device by enabling the user to use the device more quickly and efficiently.

In some embodiments, the portion of the control user interface displayed on the front display includes (1014) information about media content for playback (e.g., media playback portion 655) on the electronic device. For example, the information includes a title, a preview, album art, artist, performer, duration, current playback location, and/or other media content information. In some embodiments, the media content includes one or more playback controls. Displaying media content for playback provides feedback about a state of the device.

In some embodiments, a respective portion of the control user interface is (1016) displayed at a first display location on the side display prior to detecting the first input; and in response to the first input: the respective portion of the control user interface is ceased to be displayed at the first display location on the side display, and the respective portion of the control user interface is displayed at a second display location on the side display. For example, FIGS. 6A-6B show volume control element 614 at display location 614-a before detection of user input 616 and volume control element 614 at display location 614-b after detection of user input 616. As an example, the respective portion of the control user interface moves from the first display location to the second display location (e.g., with an animated movement). Displaying the control user interface at different locations based on a user input provides improved control options for the user (an improved human-machine interface) without cluttering the display with additional/multiple displayed controls.

In some embodiments, a second input (e.g., a touch and/or intensity input) (e.g., user input 670) is (1018) detected at the side display while the control user interface is displayed; and, in response to detecting the second input, a parameter for a function (e.g., volume) represented in the control user interface is adjusted in accordance with movement of the second input. For example, FIGS. 6J-6L show volume slider element 662 moving from position 662-a in FIG. 6J to position 662-b in FIG. 6L in response to user input 670 (in FIG. 6I). In some embodiments, the parameter is adjusted based on direction and/or magnitude of the movement. For example, the parameter changes in a first manner (e.g., increases) when an input moves in a first direction and changes in a second manner (e.g., decreases) when the input moves in a second direction. As another example, the parameter changes by a first amount when the input has a first magnitude of movement (e.g., distance traveled) and changes by a second amount when the input has a second magnitude of movement. As another specific example when the parameter corresponds to an output volume, an input (e.g., a touch and/or intensity input) moving in a first direction (e.g., towards a top of the device) causes an increase in volume and an input moving in a second direction (e.g., towards a bottom of the device) causes a decrease in volume. As another specific example when the parameter corresponds to an output volume, an input (e.g., a touch and/or intensity input) having a magnitude of movement of 1 unit causes an increase in volume of 1 unit and an input having a magnitude of movement of 2 units causes an increase in volume of 2 units. Identifying which function to activate in accordance with a particular user input provides improved control options for the user (an improved human-machine interface) without cluttering the display with additional/multiple displayed controls.

In some embodiments, a third input (e.g., a touch and/or intensity input) (e.g., a swipe or drag gesture) is (1020) detected at the front display (e.g., at a location that corresponds to the portion of the control user interface) while the control user interface is displayed; and, in response to detecting the third input, a parameter for a function represented in the control user interface is adjusted in accordance with movement of the third input. For example, FIGS. 6F-6H show volume slider element 634 moving from position 634-a in FIG. 6F to position 634-b in FIG. 6H in response to user input 638 (in FIG. 6G). As another example, the parameter is adjusted based on direction and/or magnitude of the movement. Detecting inputs on multiple displays and identifying corresponding functions provides improved control options for the user (an improved human-machine interface) without cluttering the display with additional/multiple displayed controls.

In some embodiments, the device detects (1022) a fourth input (e.g., a touch and/or intensity input) (e.g., a swipe or drag gesture at a location that corresponds to the control user interface) while the control user interface is displayed; and, in response to detecting the fourth input: in accordance with the fourth input meeting one or more criteria, adjusts a parameter for a first function represented in the control user interface in accordance with movement of the fourth input; and, in accordance with the fourth input not meeting the one or more criteria, performs a second function represented in the control user interface. For example, FIGS. 5I-5L show user inputs 544 and 550 at volume control element 510. User input 544 (in FIG. 5I) causes performance of a mute function (shown in FIG. 5J) and user input 550 (in FIG. 5K) causes performance of a volume adjust function (shown in FIG. 5L). As an example, a swipe gesture adjusts a volume slider if the magnitude is below a threshold. If the magnitude is above the threshold, the swipe gesture activates a mute function. Identifying which function to activate in accordance with particular user input types provides improved control options for the user (an improved human-machine interface) without cluttering the display with additional/multiple displayed controls and reduces the number of inputs needed to activate different functions.

In some embodiments, prior to detecting the second input, a first element is displayed (1024) in the control user interface; and, in accordance with the second input meeting the one or more criteria, the device ceases to display the first element in the control user interface. For example, FIGS. 6I-6J show media playback element 612 ceasing to be displayed in accordance with detection of user input 650. As an example, in response to the first input a volume control slider is displayed in the control user interface; and in response to the second input the volume control slider ceases to be displayed in the control user interface (e.g., is replaced with a mute/unmute element). Replacing display of a user interface element in response to a user input provides improved control options for the user (an improved human-machine interface) without cluttering the display with additional displayed controls.

In some embodiments, the first input is (1026) a first type of gesture and is detected at a first location on the side display; a fifth input (e.g., a touch and/or intensity input) is detected at a second location on the side display, the fifth input being the first type of gesture and the second location being different than the first location; and, in response to detecting the fifth input, a second function of the electronic device is performed. For example, FIGS. 6A-6B show user input 616 at a location different than display location 614-a of volume control element 614 and, in response, volume control element 614 is displayed at display location 614-b. Movement of volume control element 614 corresponds to a different function than display of volume control element 626 (as shown in FIGS. 6C-6D). In some embodiments, the device detects a second input at a second location on the side display, the second gesture being the first type of gesture and the second location being different than the first location; and, in response to detecting the second input, the device performs a function of the electronic device. In some embodiments, an input (e.g., a touch and/or intensity input) at a first portion of the electronic device causes performance of a first function and a touch and/or intensity input at a second portion does not cause performance of the first function. For example, an input (e.g., a touch and/or intensity input) on a top edge causes performance of a sleep/wake function for the electronic device. In some embodiments, an input (e.g., a touch and/or intensity input) causes performance of a first function when detected at a first portion of the device (e.g., a top edge and/or a top half of a lateral edge) and causes performance of a second function when detected at a second portion of the device (e.g., a bottom half of a lateral edge). Performing different functions based on inputs at different locations on the device provides improved control options for the user (an improved human-machine interface) without cluttering the display with additional/multiple displayed controls.

In some embodiments, the control user interface or a respective portion of the control user interface is (1028) displayed on the side display in accordance with the electronic device being in a first state (e.g., as shown in FIG. 6D); and, in accordance with the electronic device being in a second state, the device forgoes displaying the control user interface or the respective portion of the control user interface on the side display (e.g., as shown in FIG. 6F). As an example, the control user interface or the respective portion of the control center interface is a volume or playback control and is only displayed while a media application is active and/or media is being played back. Forgoing displaying a user interface element in response to user inputs based on device state prevents errant, unintended inputs from affecting operation of the device, thereby improving the human-machine interface.

In some embodiments, the control user interface or a respective portion of the control user interface is (1030) displayed at a location on the side display in accordance with the electronic device having a first orientation; and, in accordance with the electronic device having a second orientation distinct from the first orientation, the control user interface is displayed at a third location. For example, FIGS. 6S-6T show volume control element 614 displayed at display location 614-a on display 606 while device 600 is in a landscape orientation (FIG. 6S) and volume control element 614 displayed at display location 614-c on display 604 while device 600 is in a portrait orientation. As an example, the control user interface is displayed on a first side display when the electronic device is in a portrait orientation and is displayed on a second side display when the electronic device is in a landscape orientation. As another example, the control user interface is displayed on a lefthand side based on gravity. Displaying a user interface at different locations based on device orientation (e.g., a same relative position such as on the left side of a display) enhances the operability of the device and makes the user-device interface more efficient (e.g., by helping the user to achieve an intended outcome and reducing user mistakes when operating/interacting with the devices), which, additionally, reduces power usage and improves battery life of the device by enabling the user to use the device more quickly and efficiently.

In some embodiments, the device detects (1032) a sixth input (e.g., a touch and/or intensity input) at a first input location; in response to detecting the sixth input, displays the control user interface at a third display location that corresponds to the first input location; detects a seventh input (e.g., a touch and/or intensity input) at a second input location, different than the first input location; and, in response to detecting the seventh input, displays the control user interface at a fourth display location that corresponds to the second input location. For example, FIGS. 6A-6B show user input 616 at a location different than display location 614-a of volume control element 614 and, in response, volume control element 614 is displayed at display location 614-b. For example, the location of the control user interface is adjusted (e.g., moved up or down the side of the device) to appear at the location of an input. Displaying the control user interface at different locations based on a user input provides improved control options for the user (an improved human-machine interface) without cluttering the display with additional/multiple displayed controls.

It should be understood that the particular order in which the operations in FIGS. 10A-10C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900 and 1100) are also applicable in an analogous manner to method 1000 described above with respect to FIGS. 10A-10C. For example, the inputs, gestures, functions, and feedback described above with reference to method 1000 optionally have one or more of the characteristics of the inputs, gestures, functions, and feedback described herein with reference to other methods described herein (e.g., methods 900 and 1100). For brevity, these details are not repeated here.

Figure 11A:
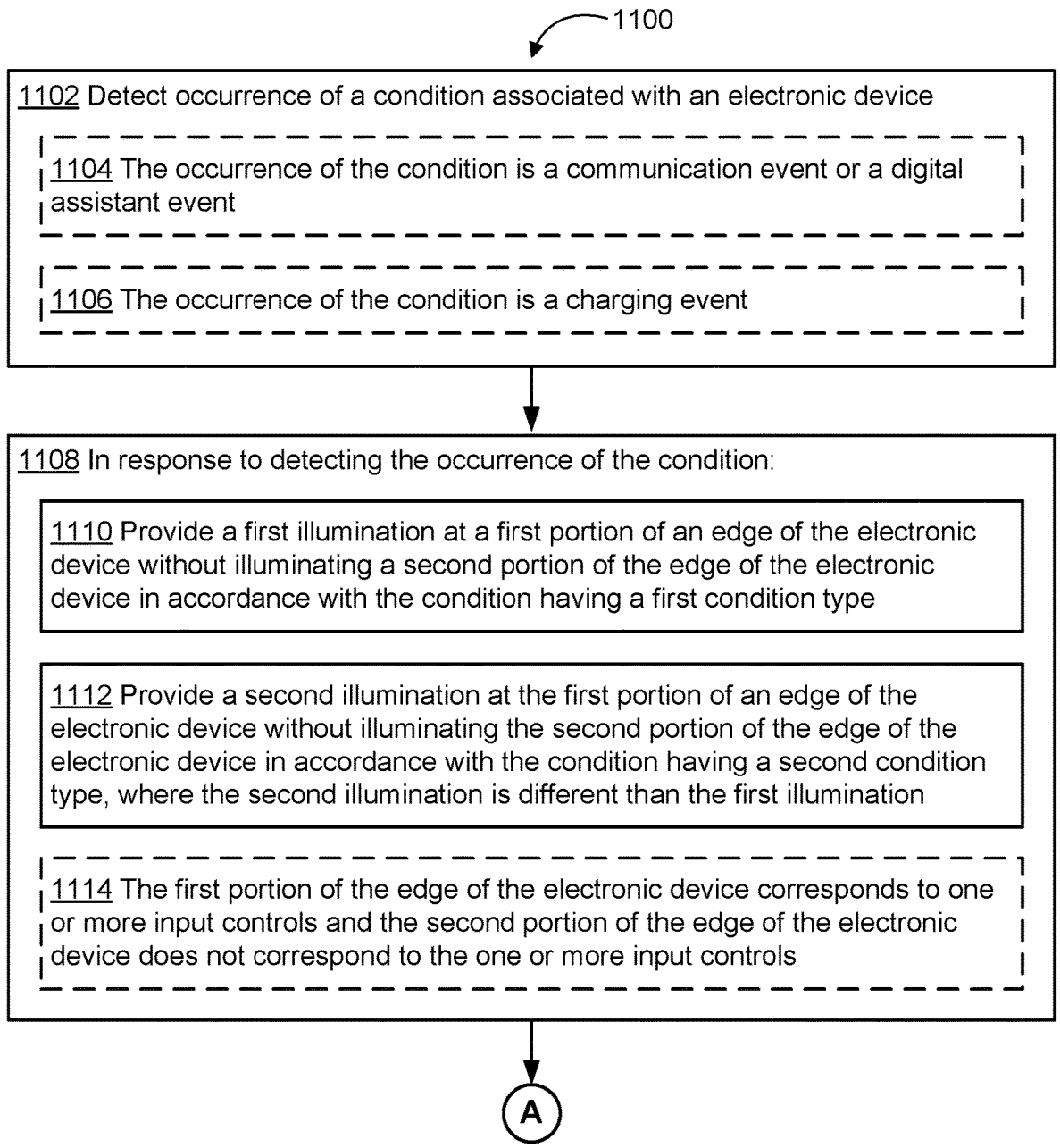
FIGS. 11A-11B are flow diagrams of an example process for user interaction with an electronic device in accordance with some embodiments.
Figure 11B:
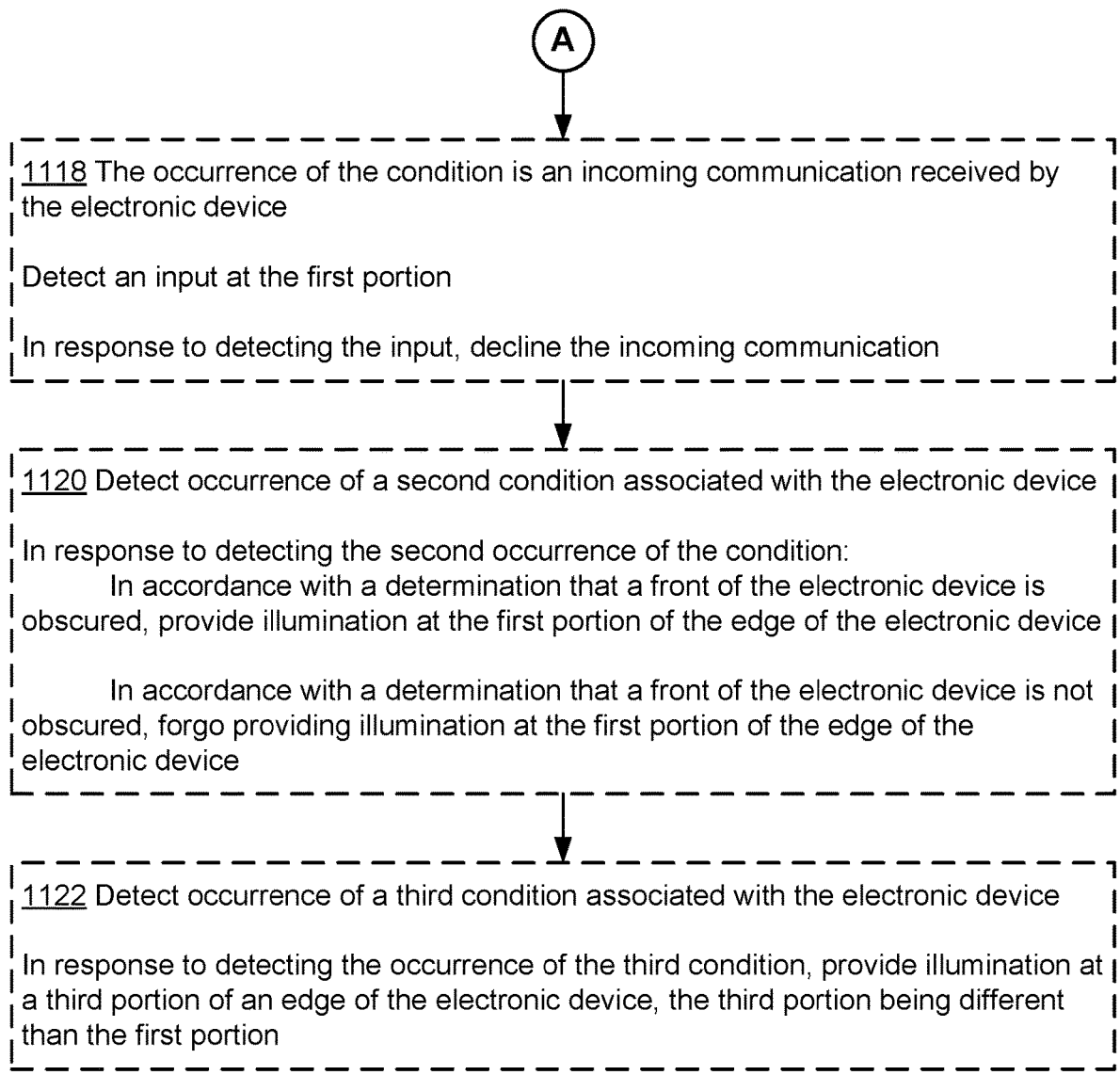

FIGS. 11A-11B are flow diagrams illustrating method 1100 for user interaction with an electronic device in accordance with some embodiments. Method 1100 is performed at an electronic device (e.g., multifunction device 100, device 300, device 600, device 700, or device 800) including, or in communication with, a display generation component and, optionally, a touch-sensitive and/or intensity-sensitive surface. In some embodiments, the electronic device is a desktop computer, a laptop computer, a tablet, a smartphone, a smart watch, or other computing device. In some embodiments, the display generation component is a touch-screen display. In some embodiments, the display is separate from a touch-sensitive and/or intensity-sensitive surface. Some operations in method 1100 are, optionally, combined and/or the order of some operations is, optionally, changed.

As described below, method 1100 provides improved feedback to the user. Thereby enhancing the operability of the device and making the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

The device detects (1102) occurrence of a condition associated with an electronic device. For example, in FIG. 8B device 800 detects a received message as indicated by message notification 808. In some embodiments, the device include a display (e.g., a touch-sensitive and/or intensity-sensitive display disposed on a front side of the device and/or a lateral (peripheral) side of the device).

In some embodiments, the occurrence of the condition is (1104) a communication event or a digital assistant event. For example, the occurrence of the condition is a received message (e.g., as shown in FIG. 8B) or an incoming call (e.g., as shown in FIG. 8C). As another example, the occurrence of the condition is a digital assistant in a speaking mode (e.g., as shown in FIGS. 8D-8E) or a listening mode (e.g., as shown in FIGS. 8F-8G). Examples communication events, each of which may correspond to the first condition type or second condition type, include telephone calls, voice-over-IP calls, video conferencing events, instant messages, and text messages. Example digital assistant events include an audio input state during which the user can issue commands and other inputs, an audio output state where audio is output to the user, and a processing state where the digital assistant is processing a user input. In some embodiments, the condition is a communication event, the first condition type corresponds to receiving an incoming communication, and the second condition type corresponds to sending an outgoing communication. In some embodiments, the condition is a digital assistant event, the first condition type corresponds to a listening mode of the digital assistant, and the second condition type corresponds to an output mode of the digital assistant. Providing edge illumination in response to communication and/or digital assistant events provides feedback about a state of the device (without requiring any further user inputs).

In some embodiments, the occurrence of the condition is (1106) a charging event (e.g., as shown in FIGS. 8H-8J). For example, an ongoing charging event optionally corresponds to the first condition type or second condition type, while a completed charging event corresponds to a different one of the first condition type and second condition type. As another example, initiating charging corresponds to the first condition type and stopping charging corresponds to the second condition type. Providing edge illumination in response to a charging event provides feedback about a state of the device (without requiring any further user inputs).

In some embodiments, the occurrence of the condition comprises an incoming communication from a remote device (e.g., an incoming call as illustrated in FIG. 8C). In some embodiments, the device provides a first illumination in accordance with a determination that the incoming communication is sent from a first contact and provides a second illumination in accordance with a determination that the incoming communication is not sent from the first contact.

In response to detecting (1108) the occurrence of the condition, the device provides (1110) a first illumination at a first portion of an edge (e.g., an illumination in portion 804) of the electronic device without illuminating a second portion of the edge (e.g., portion 806) of the electronic device in accordance with the condition having a first condition type.

In response to detecting (1108) the occurrence of the condition, the device provides (1112) a second illumination at the first portion of an edge of the electronic device without illuminating the second portion of the edge of the electronic device in accordance with the condition having a second condition type, where the second illumination is different than the first illumination. For example, a charging start event causes a first type of illumination and a charging ending event causes a second type of illumination, different than the first type of illumination. In some embodiments, the first and second illuminations have different colors, patterns, animations, and/or luminosities.

In some embodiments, the first illumination includes a first color, and the second illumination does not include the first color. For example, the condition having the first condition type causes a red illumination, and the condition having the second condition type causes a blue illumination.

In some embodiments, the first illumination includes a first set of colors, and the second illumination includes a second set of colors different from the first set of colors. For example, the condition having the first condition type causes an illumination with blue and green coloring and the condition having the second condition type causes an illumination with red and yellow coloring. In some embodiments, the first illumination and the second illumination have different patterns and/or arrangements of colors.

In some embodiments, the first illumination indicates a charge state of the electronic device. For example, edge illuminations 852, 854, 856, 858, 860, and 862 in FIGS. 8H-8J indicate the charge state of device 800. For example, the first illumination has a pattern, arrangement of colors, and/or luminosity that indicates the condition (charging state). Providing different colored illumination for different condition types provides improved feedback about a state of the device.

In some embodiments, a size of the first portion corresponds to the charge state of the electronic device. For example, the lengths L1, L2, and L3 in FIGS. 8H-8J corresponds to the charge state of device 800. In some embodiments, the size of the first portion corresponds to an amount of charge of the device. For example, when the device has 25% charge, the first portion is 25% of a length of the device. In this example, when the device has 30% charge, the first portion is 30% of the length of the device. In some embodiments, the size of the first portion changes in accordance with changes in the charge state of the device. Providing different sized illumination for different condition types provides improved feedback about a state of the device.

In some embodiments, a color of the first illumination indicates the charge state of the electronic device. For example, edge illuminations 852, 854, 856, 858, 860, and 862 in FIGS. 8H-8J indicate the charge state of device 800. For example, if the electronic device has less than 25% charge the color is red, if the device has between 25% and 50% charge the color is orange, if the device has between 50% and 75% charge the color is green, and if the device has more than 75% charge the color is blue. Providing colored illumination for different charge states provides improved feedback about a state of the device.

In some embodiments, the first illumination is an animated illumination. In some embodiments, the illumination is animated to indicate a state of the electronic device. For example, FIGS. 8H-8J illustrate animated edge illumination in accordance with a charging state of device 800. As another example, the illumination is animated in a first manner to indicate confirmation of receipt of an input and is animated in a second manner to indicate processing of an input. In some embodiments, the animated illumination sequentially indicates processing and confirmation of an input. In some embodiments, the first illumination changes over time (e.g., changes color, size, and/or location along the edge of the device). Providing animated illuminations provides improved feedback about a state of the device.

In some embodiments, the first illumination is animated in accordance with audio output by the device during the first illumination. For example, FIG. 8D illustrates illumination 823 (e.g., an animated edge illumination) provided in accordance with audio output by device 800. As an example, the first illumination may have colors, arrangements, patterns, and/or luminosities that change in accordance with changes in frequency, tempo, genre and/or sound intensity of the audio output. As a specific example, the first illumination includes blue wave patterns animated in accordance with output audio.

In some embodiments, the first illumination is animated in accordance with audio received by the device during the first illumination. For example, FIGS. 8F-8G illustrate illumination 832 (e.g., an animated edge illumination) provided in accordance with audio received by device 800. As an example, the first illumination may have colors, arrangements, patterns, and/or luminosities that change in accordance with changes in frequency, tempo and/or sound intensity of audio captured by a microphone of the device (e.g., words spoken by a user, musical input, ambient noise, or "silence" (audio input having an amplitude less than a predefined threshold). As a specific example, the first illumination includes blue wave patterns animated in accordance with received speech from a user. Providing animated illuminations in accordance with input/output audio provides improved feedback about a state of the device.

In some embodiments, the first portion of the edge of the electronic device corresponds (1114) to one or more input controls and the second portion of the edge of the electronic device does not correspond to the one or more input controls. For example, FIG. 8C shows edge portion 804 corresponding to selectable element 816 (e.g., an input control) and edge portion 806 that does not correspond to a selectable element. In some embodiments, the second portion of the edge does not correspond to any input control. In some embodiments, the second portion of the edge corresponds to a second input control, different from the one or more input controls. For example, an input (e.g., a touch and/or intensity input) at the first portion causes adjustment of a parameter (e.g., volume and/or brightness) and/or performance of a function (e.g., a playback function and/or a lock/unlock function) of the electronic device. Providing illuminations for one or more input controls provides improved feedback about a state of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, the occurrence of the condition is (1118) an incoming communication received by the electronic device; the device detects an input (e.g., a touch and/or intensity input) at the first portion; and, in response to detecting the input, declines the incoming communication. For example, first portion may be portion 818 in FIG. 8C and an input (e.g., a touch and/or intensity input) at portion 818 activates selectable element 814 to decline the incoming communication. For example, the incoming communication is a voice communication (e.g., a telephone call, a videoconference request, or an audio chatting application request) and the first portion corresponds to a button that functions to decline the communication. In some embodiments, the first illumination emphasizes (e.g., outlines and/ or highlights) an affordance that functions to decline the communication. For example, a red outline for a decline button. In some embodiments, in response to receiving the input at the first portion, the incoming communication is accepted. In some embodiments, the first portion is responsive to inputs to decline communications and is illuminated in red and a third portion is responsive to inputs to accept communications and is illuminated in green. Providing illuminations in accordance with incoming communications provides improved feedback about a state of the device.

In some embodiments, the device detects (1120) occurrence of a second condition associated with the electronic device; and, in response to detecting the second occurrence of the condition: in accordance with a determination that a front of the electronic device is obscured (e.g., the device is face down on a surface or an object is obscuring the front), provides illumination at the first portion of the edge of the electronic device; and, in accordance with a determination that a front of the electronic device is not obscured, forgoes providing illumination at the first portion of the edge of the electronic device. For example, FIGS. 8D-8E show device 800 selectively providing illumination 823 depending on whether display 802 is unobscured. Selectively providing edge illumination, such as when a front/main display is obscured, reduces power usage and improves battery life of the device by enabling the user to use the device more quickly and efficiently.

In some embodiments, the device detects (1122) occurrence of a third condition associated with the electronic device; and, in response to detecting the occurrence of the third condition, provide illumination at a third portion of an edge of the electronic device, the third portion being different than the first portion. For example, illumination may be provided in portion 804 in response to an incoming message (e.g., as shown in FIG. 8B) and illumination may be provided in portion 818 in response to an incoming call (e.g., as shown in FIG. 8C). As another example, a top portion of the device is illuminated in response to a charging event and a side portion of the device is illuminated in response to a communication event. Providing different illuminations in accordance with different conditions provides feedback about a state of the device.

It should be understood that the particular order in which the operations in FIGS. 11A-11B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900 and 1000) are also applicable in an analogous manner to method 900 described above with respect to FIGS. 11A-11B. For example, the inputs, gestures, functions, and feedback described above with reference to method 1100 optionally have one or more of the characteristics of the inputs, gestures, functions, and feedback described herein with reference to other methods described herein (e.g., methods 900 and 1000). For brevity, these details are not repeated here.

The operations described above with reference to FIGS. 9A-9C, 10A-10C, and 11A-11B are, optionally, implemented by components depicted in FIGS. 1A-1B and 3. For example, detection operations 902, 1002, 1102, display operations 910 and 1008, and illumination operation 1112 are, optionally, implemented by event sorter 170, event recognizer 180, and event handler 190. Event monitor 171 in event sorter 170 detects a contact on touch-sensitive and/or intensity-sensitive display system 112, and event dispatcher module 174 delivers the event information to application 136-1. A respective event recognizer 180 of application 136-1 compares the event information to respective event definitions 186, and determines whether a first contact at a first location on the touch-sensitive and/or intensity-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B and 3.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
   at an electronic device with a display:
      while displaying a control a user interface at a first display location on the display, detecting a first input along an edge of the electronic device;
      in response to detecting the first input:
         in accordance with a determination that the first input meets one or more criteria and is detected at a first input location along the edge of the electronic device, displaying the control user interface at a second display location on the display that corresponds to the first input location, the second display location being different than the first display location, wherein displaying the control user interface at the second display location comprises ceasing to display the control user interface at the first display location;

in accordance with a determination that the first input meets the one or more criteria and is detected at a second input location, along the edge of the electronic device, that is different from the first input location, displaying the control user interface at a third display location on the display that corresponds to the second input location, the third display location being different than the first display location and the second display location, wherein displaying the control user interface at the third display location comprises ceasing to display the control user interface at the first display location;

while the control user interface is displayed, detecting a second input; and in response to detecting the second input, adjusting a parameter for a function represented in the control user interface in accordance with the second input.

2. The method of claim 1, wherein:
in accordance with the first input location being at a corner region of the electronic device, the control user interface has a first appearance; and
in accordance with the first input location being at a non-corner region of the electronic device, the control user interface has a second appearance, the second appearance being different than the first appearance.

3. The method of claim 1, wherein the one or more criteria include an input location criterion; and
the method further comprises, in accordance with a determination that the first input does not meet the input location criterion, forgoing responding to the first input.

4. The method of claim 1, wherein the one or more criteria include an intensity-based criterion; and
the method further comprises, in accordance with a determination that the first input does not meet the intensity-based criterion, forgoing responding to the first input.

5. The method of claim 1, wherein the one or more criteria include a criterion based on how the electronic device is being held by a user; and
the method further comprises, in accordance with a determination that the first input does not meet the criterion based on how the electronic device is being held by the user, forgoing responding to the first input.

6. The method of claim 1, wherein the one or more criteria include an orientation-based criterion; and
the method further comprises, in accordance with a determination that the first input does not meet the orientation-based criterion, forgoing responding to the first input.

7. The method of claim 1, wherein the one or more criteria include a duration-based criterion; and
the method further comprises, in accordance with a determination that the first input does not meet the duration-based criterion, forgoing responding to the first input.

8. The method of claim 1, wherein the one or more criteria include a criterion corresponding to an operating state of the electronic device; and
the method further comprises, in accordance with a determination that the first input does not meet the criterion corresponding to the operating state of the electronic device, forgoing responding to the first input.

9. The method of claim 1, wherein the parameter is one of:
a level of zoom of a camera of the electronic device,
a volume of audio output of the electronic device,
a playback location for media content output by the electronic device, and
a speed of playback for the media content output by the electronic device.

10. The method of claim 1, wherein the parameter is adjusted in accordance with direction and/or magnitude of movement of the second input.

11. The method of claim 1, wherein the electronic device includes a housing with one or more physically distinguished portions corresponding to the first input location and/or the second input location.

12. The method of claim 1, wherein the function is identified in accordance with an operating state of the electronic device.

13. The method of claim 1, further comprising, prior to detecting the first input, displaying a user interface element at the first display location; and
wherein displaying the control user interface at the first display location comprises replacing display of the user interface element with display of the control user interface.

14. The method of claim 1, wherein the control user interface is displayed within a status region that displays information about one or more operations currently being performed by the electronic device.

15. The method of claim 1, wherein the control user interface is displayed in accordance with the first input being a first type of input; and
the method further comprises, in accordance with a determination that the first input is a second type of input, different than the first type, performing a second function of the electronic device, the second function different than the function represented in the control user interface.

16. The method of claim 15, wherein performing the second function includes displaying a locking user interface at the display.

17. The method of claim 1, further comprising, in response to detecting the first input:
in accordance with a determination that the first input meets the one or more criteria and is detected at a third input location that is different from the first and second input locations, performing a third function of the electronic device, the third function different than the function represented in the control user interface.

18. The method of claim 1, wherein:
the display is a first display arranged on a first side of the electronic device;
the electronic device includes a second display arranged on a second side of the electronic device, the second side being adjacent to the first side; and
the first input is detected at a location on the second display.

19. The method of claim 1, wherein the display extends from a first side of the electronic device to the edge of the electronic device.

20. The method of claim 1, further comprising:
in response to detecting the first input:
in accordance with a determination that the first input does not meet the one or more criteria, forgoing responding to the first input.

21. The method of claim 1, wherein:
the first display location is at a first side of the electronic device in accordance with a determination that the electronic device is being held in a left hand of a user; and
the first display location is at a third side of the electronic device, opposite the first side, in accordance with a determination that the electronic device is being held in a right hand of the user.

22. The method of claim 21, further comprising detecting a thumb contact at the electronic device;
wherein the second display location is at the first side of the electronic device in accordance with a determination that the thumb contact is at the third side of the electronic device; and
wherein the second display location is at the third side of the electronic device in accordance with a determination that the thumb contact is at the first side of the electronic device.

23. The method of claim 1, wherein the first input has a first portion and a second portion;
the method further comprises, in accordance with a determination that an intensity of the first portion does not meet one or more intensity criteria, displaying a first section of the control user interface and forgoing displaying a second section of the control user interface; and
wherein displaying the control user interface at the first input location comprises displaying the first section of the control user interface and the second section of the control user interface in accordance with a determination that the intensity of the second portion meets the one or more intensity criteria.

24. The method of claim 1, further comprising, prior to detecting the first input, displaying an indication of an input region for the first input.

25. The method of claim 1, further comprising, prior to detecting the first input, providing a physical indication of an input region for the first input.

26. The method of claim 1, wherein the parameter is adjusted in accordance with the second input being a first type of input, and the method further comprises:
while the control user interface is displayed, detecting a fourth input; and
in response to detecting the fourth input, performing a fourth function represented in the control user interface in accordance with the fourth input being a second type of input.

27. The method of claim 1, further comprising:
detecting a fifth input at the first input location along the edge of the electronic device; and
in response to detecting the fifth input:
in accordance with a determination that the fifth input meets the one or more criteria, displaying the control user interface at the second display location; and
subsequent to displaying the control user interface at the second display location, adjusting the parameter in accordance with movement of the fifth input.

28. The method of claim 1, wherein:
displaying the control user interface at the second display location comprises displaying a first version of the control user interface; and
displaying the control user interface at the third display location comprises displaying a second version of the control user interface, the second version of the control user interface being visually distinct from the first version.

29. The method of claim 1, wherein displaying the control user interface at the second display location comprises displaying a first version of the control user interface; and
the method further comprising:
detecting a sixth input at an input location on a front side of the electronic device; and
in response to detecting the sixth input, displaying a third version of the control user interface, the third version of the control user interface being visually distinct from the first version.

30. A non-transitory computer readable storage medium storing one or more programs, the one or more programs comprising instructions, which when executed by an electronic device with a display, one or more processors, and memory, cause the electronic device to:
while displaying a control user interface at a first display location on the display, detect a first input along an edge of the electronic device;
in response to detecting the first input:
in accordance with a determination that the first input meets one or more criteria and is detected at a first input location along the edge of the electronic device, display the control user interface at a second display location on the display that corresponds to the first input location, the second display location being different than the first display location, wherein displaying the control user interface at the second display location comprises ceasing to display the control user interface at the first display location;
in accordance with a determination that the first input meets the one or more criteria and is detected at a second input location, along the edge of the electronic device, that is different from the first input location, display the control user interface at a third display location on the display that corresponds to the second input location, the third display location being different than the first display location and the second display location, wherein displaying the control user interface at the third display location comprises ceasing to display the control user interface at the first display location;
while the control user interface is displayed, detect a second input; and
in response to detecting the second input, adjust a parameter for a function represented in the control user interface in accordance with the second input.

31. The non-transitory computer readable storage medium of claim 30, wherein:
in accordance with the first input location being at a corner region of the electronic device, the control user interface has a first appearance; and
in accordance with the first input location being at a non-corner region of the electronic device, the control user interface has a second appearance, the second appearance being different than the first appearance.

32. The non-transitory computer readable storage medium of claim 30, wherein the one or more criteria include an input location criterion; and
the one or more programs further comprise instructions for, in accordance with a determination that the first input does not meet the input location criterion, forgoing responding to the first input.

33. The non-transitory computer readable storage medium of claim 30, wherein the one or more criteria include an intensity-based criterion; and
the one or more programs further comprise instructions for, in accordance with a determination that the first input does not meet the intensity-based criterion, forgoing responding to the first input.

34. The non-transitory computer readable storage medium of claim 30, wherein the one or more criteria include a criterion based on how the electronic device is being held by a user; and the one or more programs further comprise instructions for, in accordance with a determination that the first input does not meet the criterion based on how the electronic device is being held by the user, forgoing responding to the first input.

35. The non-transitory computer readable storage medium of claim 30, wherein the one or more criteria include an orientation-based criterion; and the one or more programs further comprise instructions for, in accordance with a determination that the first input does not meet the orientation-based criterion, forgoing responding to the first input.

36. The non-transitory computer readable storage medium of claim 30, wherein the one or more criteria include a duration-based criterion; and the one or more programs further comprise instructions for, in accordance with a determination that the first input does not meet the duration-based criterion, forgoing responding to the first input.

37. The non-transitory computer readable storage medium of claim 30, wherein the one or more criteria include a criterion corresponding to an operating state of the electronic device; and the one or more programs further comprise instructions for, in accordance with a determination that the first input does not meet the criterion corresponding to the operating state of the electronic device, forgoing responding to the first input.

38. The non-transitory computer readable storage medium of claim 30, wherein the parameter is one of:
a level of zoom of a camera of the electronic device,
a volume of audio output of the electronic device,
a playback location for media content output by the electronic device, and
a speed of playback for the media content output by the electronic device.

39. The non-transitory computer readable storage medium of claim 30, wherein the parameter is adjusted in accordance with direction and/or magnitude of movement of the second input.

40. The non-transitory computer readable storage medium of claim 30, wherein the electronic device includes a housing with one or more physically distinguished portions corresponding to the first input location and/or the second input location.

41. The non-transitory computer readable storage medium of claim 30, wherein the function is identified in accordance with an operating state of the electronic device.

42. The non-transitory computer readable storage medium of claim 30, wherein the one or more programs further comprise instructions for, prior to detecting the first input, displaying a user interface element at the first display location; and wherein displaying the control user interface at the first display location comprises replacing display of the user interface element with display of the control user interface.

43. The non-transitory computer readable storage medium of claim 30, wherein the control user interface is displayed within a status region that displays information about one or more operations currently being performed by the electronic device.

44. The non-transitory computer readable storage medium of claim 30, wherein the control user interface is displayed in accordance with the first input being a first type of input; and the one or more programs further comprise instructions for, in accordance with a determination that the first input is a second type of input, different than the first type, performing a second function of the electronic device, the second function different than the function represented in the control user interface.

45. The non-transitory computer readable storage medium of claim 44, wherein performing the second function includes displaying a locking user interface at the display.

46. The non-transitory computer readable storage medium of claim 30, wherein the one or more programs further comprise instructions for, in response to detecting the first input:

in accordance with a determination that the first input meets the one or more criteria and is detected at a third input location that is different from the first and second input locations, performing a third function of the electronic device, the third function different than the function represented in the control user interface.

47. The non-transitory computer readable storage medium of claim 30, wherein:
the display is a first display arranged on a first side of the electronic device;
the electronic device includes a second display arranged on a second side of the electronic device, the second side being adjacent to the first side; and
the first input is detected at a location on the second display.

48. The non-transitory computer readable storage medium of claim 30, wherein the display extends from a first side of the electronic device to the edge of the electronic device.

49. The non-transitory computer readable storage medium of claim 30, wherein the one or more programs further comprise instructions for, in response to detecting the first input:

in accordance with a determination that the first input does not meet the one or more criteria, forgoing responding to the first input.

50. The non-transitory computer readable storage medium of claim 30, wherein:
the first display location is at a first side of the electronic device in accordance with a determination that the electronic device is being held in a left hand of a user; and
the first display location is at a third side of the electronic device, opposite the first side, in accordance with a determination that the electronic device is being held in a right hand of the user.

51. The non-transitory computer readable storage medium of claim 50, wherein the one or more programs further comprise instructions for detecting a thumb contact at the electronic device;

wherein the second display location is at the first side of the electronic device in accordance with a determination that the thumb contact is at the third side of the electronic device; and wherein the second display location is at the third side of the electronic device in accordance with a determination that the thumb contact is at the first side of the electronic device.

52. The non-transitory computer readable storage medium of claim 30, wherein:
the first input has a first portion and a second portion;
one or more programs further comprise instructions for, in accordance with a determination that an intensity of the first portion does not meet one or more intensity criteria, displaying a first section of the control user interface and forgoing displaying a second section of the control user interface; and
displaying the control user interface at the first input location comprises displaying the first section of the control user interface and the second section of the control user interface in accordance with a determination that the intensity of the second portion meets the one or more intensity criteria.

53. The non-transitory computer readable storage medium of claim 30, wherein the one or more programs further comprise instructions for, prior to detecting the first input, displaying an indication of an input region for the first input.

54. The non-transitory computer readable storage medium of claim 30, wherein the one or more programs further comprise instructions for, prior to detecting the first input, providing a physical indication of an input region for the first input.

55. The non-transitory computer readable storage medium of claim 30, wherein the parameter is adjusted in accordance with the second input being a first type of input, and the one or more programs further comprise instructions for:
while the control user interface is displayed, detecting a fourth input; and
in response to detecting the fourth input, performing a fourth function represented in the control user interface in accordance with the fourth input being a second type of input.

56. The non-transitory computer readable storage medium of claim 30, wherein the one or more programs further comprise instructions for:
detecting a fifth input at the first input location along the edge of the electronic device; and
in response to detecting the fifth input:
in accordance with a determination that the fifth input meets the one or more criteria, displaying the control user interface at the second display location; and
subsequent to displaying the control user interface at the second display location, adjusting the parameter in accordance with movement of the fifth input.

57. The non-transitory computer readable storage medium of claim 30, wherein:
displaying the control user interface at the second display location comprises displaying a first version of the control user interface; and
displaying the control user interface at the third display location comprises displaying a second version of the control user interface, the second version of the control user interface being visually distinct from the first version.

58. The non-transitory computer readable storage medium of claim 30, wherein displaying the control user interface at the second display location comprises displaying a first version of the control user interface; and
the one or more programs further comprise instructions for:
detecting a sixth input at an input location on a front side of the electronic device; and
in response to detecting the sixth input, displaying a third version of the control user interface, the third version of the control user interface being visually distinct from the first version.

59. An electronic device, comprising:
a display;
one or more processors;
memory; and
one or more programs, wherein the one or more programs are stored in the memory and configured to be executed by the one or more processors, the one or more programs including instructions for:
while displaying a control user interface at a first display location on the display, detecting a first input along an edge of the electronic device;
in response to detecting the first input:
in accordance with a determination that the first input meets one or more criteria and is detected at a first input location along the edge of the electronic device, displaying the control user interface at a second display location on the display that corresponds to the first input location, the second display location being different than the first display location, wherein displaying the control user interface at the second display location comprises ceasing to display the control user interface at the first display location;
in accordance with a determination that the first input meets the one or more criteria and is detected at a second input location, along the edge of the electronic device, that is different from the first input location, displaying the control user interface at a third display location on the display that corresponds to the second input location, the third display location being different than the first display location and the second display location, wherein displaying the control user interface at the third display location comprises ceasing to display the control user interface at the first display location;
while the control user interface is displayed, detecting a second input; and
in response to detecting the second input, adjusting a parameter for a function represented in the control user interface in accordance with the second input.

60. The electronic device of claim 59, wherein:
in accordance with the first input location being at a corner region of the electronic device, the control user interface has a first appearance; and
in accordance with the first input location being at a non-corner region of the electronic device, the control user interface has a second appearance, the second appearance being different than the first appearance.

61. The electronic device of claim 59, wherein the one or more criteria include an input location criterion; and
the one or more programs further comprise instructions for, in accordance with a determination that the first input does not meet the input location criterion, forgoing responding to the first input.

62. The electronic device of claim 59, wherein the one or more criteria include an intensity-based criterion; and
the one or more programs further comprise instructions for, in accordance with a determination that the first input does not meet the intensity-based criterion, forgoing responding to the first input.

63. The electronic device of claim 59, wherein the one or more criteria include a criterion based on how the electronic device is being held by a user; and the one or more programs further comprise instructions for, in accordance with a determination that the first input does not meet the criterion based on how the electronic device is being held by the user, forgoing responding to the first input.

64. The electronic device of claim 59, wherein the one or more criteria include an orientation-based criterion; and
the one or more programs further comprise instructions for, in accordance with a determination that the first input does not meet the orientation-based criterion, forgoing responding to the first input.

65. The electronic device of claim 59, wherein the one or more criteria include a duration-based criterion; and
the one or more programs further comprise instructions for, in accordance with a determination that the first input does not meet the duration-based criterion, forgoing responding to the first input.

66. The electronic device of claim 59, wherein the one or more criteria include a criterion corresponding to an operating state of the electronic device; and
the one or more programs further comprise instructions for, in accordance with a determination that the first input does not meet the criterion corresponding to the operating state of the electronic device, forgoing responding to the first input.

67. The electronic device of claim 59, wherein the parameter is one of:
a level of zoom of a camera of the electronic device,
a volume of audio output of the electronic device,
a playback location for media content output by the electronic device, and
a speed of playback for the media content output by the electronic device.

68. The electronic device of claim 59, wherein the parameter is adjusted in accordance with direction and/or magnitude of movement of the second input.

69. The electronic device of claim 59, wherein the electronic device includes a housing with one or more physically distinguished portions corresponding to the first input location and/or the second input location.

70. The electronic device of claim 59, wherein the function is identified in accordance with an operating state of the electronic device.

71. The electronic device of claim 59, wherein the one or more programs further comprise instructions for, prior to detecting the first input, displaying a user interface element at the first display location; and
wherein displaying the control user interface at the first display location comprises replacing display of the user interface element with display of the control user interface.

72. The electronic device of claim 59, wherein the control user interface is displayed within a status region that displays information about one or more operations currently being performed by the electronic device.

73. The electronic device of claim 59, wherein the control user interface is displayed in accordance with the first input being a first type of input; and
the one or more programs further comprise instructions for, in accordance with a determination that the first input is a second type of input, different than the first type, performing a second function of the electronic device, the second function different than the function represented in the control user interface.

74. The electronic device of claim 73, wherein performing the second function includes displaying a locking user interface at the display.

75. The electronic device of claim 59, wherein the one or more programs further comprise instructions for, in response to detecting the first input:
in accordance with a determination that the first input meets the one or more criteria and is detected at a third input location that is different from the first and second input locations, performing a third function of the electronic device, the third function different than the function represented in the control user interface.

76. The electronic device of claim 59, wherein:
the display is a first display arranged on a first side of the electronic device;
the electronic device includes a second display arranged on a second side of the electronic device, the second side being adjacent to the first side; and
the first input is detected at a location on the second display.

77. The electronic device of claim 59, wherein the display extends from a first side of the electronic device to the edge of the electronic device.

78. The electronic device of claim 59, wherein the one or more programs further comprise instructions for, in response to detecting the first input:
in accordance with a determination that the first input does not meet the one or more criteria, forgoing responding to the first input.

79. The electronic device of claim 59, wherein:
the first display location is at a first side of the electronic device in accordance with a determination that the electronic device is being held in a left hand of a user; and
the first display location is at a third side of the electronic device, opposite the first side, in accordance with a determination that the electronic device is being held in a right hand of the user.

80. The electronic device of claim 79, wherein the one or more programs further comprise instructions for detecting a thumb contact at the electronic device;
wherein the second display location is at the first side of the electronic device in accordance with a determination that the thumb contact is at the third side of the electronic device; and
wherein the second display location is at the third side of the electronic device in accordance with a determination that the thumb contact is at the first side of the electronic device.

81. The electronic device of claim 59, wherein:
the first input has a first portion and a second portion;
the one or more programs further comprise instructions for, in accordance with a determination that an intensity of the first portion does not meet one or more intensity criteria, displaying a first section of the control user interface and forgoing displaying a second section of the control user interface; and
displaying the control user interface at the first input location comprises displaying the first section of the control user interface and the second section of the control user interface in accordance with a determination that the intensity of the second portion meets the one or more intensity criteria.

82. The electronic device of claim 59, wherein the one or more programs further comprise instructions for, prior to detecting the first input, displaying an indication of an input region for the first input.

83. The electronic device of claim 59, wherein the one or more programs further comprise instructions for, prior to detecting the first input, providing a physical indication of an input region for the first input.

84. The electronic device of claim 59, wherein the parameter is adjusted in accordance with the second input being a first type of input, and the one or more programs further comprise instructions for:
- while the control user interface is displayed, detecting a fourth input; and
- in response to detecting the fourth input, performing a fourth function represented in the control user interface in accordance with the fourth input being a second type of input.

85. The electronic device of claim 59, wherein the one or more programs further comprise instructions for:
- detecting a fifth input at the first input location along the edge of the electronic device; and
- in response to detecting the fifth input:
  - in accordance with a determination that the fifth input meets the one or more criteria, displaying the control user interface at the second display location; and
  - subsequent to displaying the control user interface at the second display location, adjusting the parameter in accordance with movement of the fifth input.

86. The electronic device of claim 59, wherein:
- displaying the control user interface at the second display location comprises displaying a first version of the control user interface; and
- displaying the control user interface at the third display location comprises displaying a second version of the control user interface, the second version of the control user interface being visually distinct from the first version.

87. The electronic device of claim 59, wherein displaying the control user interface at the second display location comprises displaying a first version of the control user interface; and
- the one or more programs further comprise instructions for:
  - detecting a sixth input at an input location on a front side of the electronic device; and
  - in response to detecting the sixth input, displaying a third version of the control user interface, the third version of the control user interface being visually distinct from the first version.

* * * * *